(12) United States Patent
Radulescu et al.

(10) Patent No.: US 10,694,578 B2
(45) Date of Patent: Jun. 23, 2020

(54) APPARATUS AND METHODS FOR HAND-IN TO A FEMTO NODE

(71) Applicant: QUALCOMM Incorporated, San Diego, CA (US)

(72) Inventors: Andrei Radulescu, San Diego, CA (US); Vinay Chande, San Diego, CA (US); Jen Chen, La Jolla, CA (US); Christophe Chevallier, San Diego, CA (US); Farhad Meshkati, San Diego, CA (US); Sanjiv Nanda, San Diego, CA (US); Damanjit Singh, San Diego, CA (US); Mehmet Yavuz, San Diego, CA (US); Sumeeth Nagaraja, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 15/482,503

(22) Filed: Apr. 7, 2017

(65) Prior Publication Data

US 2017/0215228 A1 Jul. 27, 2017

Related U.S. Application Data

(63) Continuation of application No. 13/308,311, filed on Nov. 30, 2011, now abandoned, which is a
(Continued)

(51) Int. Cl.
*H04W 84/04* (2009.01)
*H04W 36/00* (2009.01)
(Continued)

(52) U.S. Cl.
CPC ......... *H04W 84/045* (2013.01); *H04W 28/18* (2013.01); *H04W 36/0055* (2013.01);
(Continued)

(58) Field of Classification Search
CPC combination set(s) only.
See application file for complete search history.

(56) References Cited

U.S. PATENT DOCUMENTS 8,315,208 B2 11/2012 Cho et al.
8,326,304 B2 12/2012 Kim et al.
(Continued)

FOREIGN PATENT DOCUMENTS

CN 1327346 A 12/2001
CN 101754303 A 6/2010
(Continued)

OTHER PUBLICATIONS

3GPP TS 25.367, "3rd Generation Partnership Project; Technical Specification Group Radio Access Network; Mobility procedures for Home Node B (HNB); Overall description", Stage 2 (Release 9), V9.4.0, Jun. 2010, pp. 1-14.
(Continued)

*Primary Examiner* — Steven S Kelley
(74) *Attorney, Agent, or Firm* — Arent Fox, LLP

(57) ABSTRACT

Methods and apparatuses are provided for causing active hand-in of a device from a macrocell base station to a femto node, which can be an inter-frequency hand-in. The femto node can broadcast a beacon, which can be received and reported by a device to a source base station along with one or more parameters. The source base station can communicate a handover message to the femto node or a related femto gateway along with the one or more parameters. The femto node or femto gateway can disambiguate the intended target femto node based in part on the one or more parameters,
(Continued)

which can include applying one or more filters. Applying the one or more filters may include applying an UL RSSI filter to the one or more femto nodes to determine whether presence of the device causes a rise in UL RSSI measured at the one or more femto nodes.

14 Claims, 26 Drawing Sheets

Related U.S. Application Data continuation-in-part of application No. 13/233,810, filed on Sep. 15, 2011, now Pat. No. 9,137,713.

(60) Provisional application No. 61/418,589, filed on Dec. 1, 2010, provisional application No. 61/422,119, filed on Dec. 10, 2010, provisional application No. 61/383,715, filed on Sep. 16, 2010, provisional application No. 61/384,189, filed on Sep. 17, 2010.

(51) Int. Cl.
*H04W 36/06* (2009.01)
*H04W 36/08* (2009.01)
*H04W 36/14* (2009.01)
*H04W 36/04* (2009.01)
*H04W 84/10* (2009.01)
*H04W 48/08* (2009.01)
*H04W 28/18* (2009.01)
*H04W 92/12* (2009.01)

(52) U.S. Cl.
CPC ........... *H04W 36/04* (2013.01); *H04W 36/06* (2013.01); *H04W 36/08* (2013.01); *H04W 36/14* (2013.01); *H04W 84/105* (2013.01); *H04W 92/12* (2013.01); *H04W 48/08* (2013.01)

(56) References Cited

U.S. PATENT DOCUMENTS

| | | | |
|---|---|---|---|
| 8,725,152 B2 | 5/2014 | Jokinen et al. | |
| 8,923,842 B2* | 12/2014 | Brend | H04W 52/243 455/422.1 |
| 9,137,713 B2 | 9/2015 | Radulescu et al. | |
| 10,045,322 B2* | 8/2018 | Radeluscu | H04W 36/0061 |
| 2003/0007470 A1 | 1/2003 | Grilli et al. | |
| 2003/0147362 A1 | 8/2003 | Dick et al. | |
| 2004/0029587 A1 | 2/2004 | Hulkkonen et al. | |
| 2007/0015511 A1 | 1/2007 | Kwun et al. | |
| 2007/0049324 A1 | 3/2007 | Sambhwani et al. | |
| 2008/0039092 A1 | 2/2008 | Kitazoe | |
| 2008/0132239 A1 | 6/2008 | Khetawat et al. | |
| 2009/0005105 A1 | 1/2009 | Hwang et al. | |
| 2009/0097451 A1 | 4/2009 | Gogic | |
| 2009/0129341 A1 | 5/2009 | Balasubramanian et al. | |
| 2009/0156165 A1 | 6/2009 | Raghothaman et al. | |
| 2009/0163216 A1 | 6/2009 | Hoang et al. | |
| 2009/0213819 A1 | 8/2009 | Kalhan | |
| 2009/0270092 A1 | 10/2009 | Buckley et al. | |
| 2010/0054219 A1 | 3/2010 | Humblet et al. | |
| 2010/0093358 A1 | 4/2010 | Cheong et al. | |
| 2010/0120437 A1 | 5/2010 | Foster et al. | |
| 2010/0124931 A1 | 5/2010 | Eskicioglu et al. | |
| 2010/0150109 A1 | 6/2010 | Bradley et al. | |
| 2010/0166010 A1 | 7/2010 | Ukita et al. | |
| 2010/0173630 A1 | 7/2010 | Han et al. | |
| 2010/0197297 A1 | 8/2010 | Hong et al. | |
| 2010/0197311 A1 | 8/2010 | Walldeen et al. | |
| 2010/0197320 A1 | 8/2010 | Ulrich et al. | |
| 2010/0203890 A1 | 8/2010 | Nagaraja et al. | |
| 2010/0203891 A1 | 8/2010 | Nagaraja et al. | |
| 2010/0222069 A1 | 9/2010 | Abraham et al. | |
| 2010/0234028 A1 | 9/2010 | Narasimha et al. | |
| 2010/0242103 A1 | 9/2010 | Richardson et al. | |
| 2010/0323633 A1 | 12/2010 | Pani et al. | |
| 2011/0065391 A1 | 3/2011 | Shiotsuki et al. | |
| 2011/0070889 A1 | 3/2011 | Li | |
| 2011/0130144 A1 | 6/2011 | Schein et al. | |
| 2011/0294493 A1 | 12/2011 | Nagaraja et al. | |
| 2012/0202505 A1* | 8/2012 | Kondo | H04W 36/08 455/440 |
| 2012/0309394 A1 | 12/2012 | Radulescu et al. | |
| 2013/0210436 A1 | 8/2013 | Srinivasan et al. | |
| 2015/0327210 A1 | 11/2015 | Radeluscu et al. | |

FOREIGN PATENT DOCUMENTS

| | | |
|---|---|---|
| CN | 101772099 A | 7/2010 |
| CN | 101822091 A | 9/2010 |
| EP | 2 200 360 A1 | 6/2010 |
| EP | 2375807 A1 | 10/2011 |
| JP | 2009-253569 A | 10/2009 |
| KR | 20100041236 A | 4/2010 |
| WO | WO-03094540 A1 | 11/2003 |
| WO | WO-2009/001552 A1 | 12/2008 |
| WO | WO-09049032 | 4/2009 |
| WO | WO-2009047972 A1 | 4/2009 |
| WO | WO-09067700 | 5/2009 |
| WO | WO-2009/144930 A1 | 12/2009 |
| WO | WO-2009145302 A1 | 12/2009 |
| WO | 2010005217 A2 | 1/2010 |
| WO | WO-2010022287 A1 | 2/2010 |
| WO | WO-2010066165 A1 | 6/2010 |
| WO | WO-2010093645 | 8/2010 |
| WO | WO-2010093717 A1 | 8/2010 |
| WO | WO-2010098104 A1 | 9/2010 |
| WO | WO-2010105665 A1 | 9/2010 |
| WO | WO-2010110240 A1 | 9/2010 |
| WO | WO-2010135471 A1 | 11/2010 |
| WO | WO-2011066463 A2 | 6/2011 |

OTHER PUBLICATIONS

3GPP TS 25.467, "3rd Generation Partnership Project; Technical Specification Group Radio Access Network; UTRAN architecture for 3G Home Node B (HNB)", Stage 2 (Release 9), V9.3.0, Jun. 2010, pp. 1-34.
"Digital cellular telecommunications system (Phase 2+); Radio network planning aspects (3GPP TR 43.030 version 9.0.0 Release 9)", ETSI TR 143 030 V9.0.0 (Feb. 2010) Part D.12.2, pp. 1-44.
Huawei, Qualcomm Incorporated, Nokia Corporation, Nokia Siemens Networks, Telecom Italia,[Change Request] CR to 25.331 on remaining open issues for support of inbound mobility in UMTS,3GPP TSG-RAN WG2 Meeting #69 R2-101754,Feb. 26, 2010,p. 1-p. 8,URL,http://www.3gpp.org/ftp/tsg_ran/WG2_RL2/TSGR2_69/Docs/R2-101754.zip.
Huawei Technologies Co., Ltd., "Concerns on support inbound handover to CSG cells," 3GPP TSG GERAN Meeting #43 GP-091393,Sep. 4, 2009,p. 1-p. 5,URL,http://www.3gpp.org/ftp/tsg_geran/TSG_GERAN/GERAN_43_Vancouver/Docs/GP-091393.zip.
Huawei, "Support of inbound Handover for Legacy Mobile," 3GPP TSG-RAN WG3 Meeting #64 R3-091086,May 8, 2009,p. 1-p. 3,URL,http://www.3gpp.org/ftp/tsg_ran/WG3_Iu/TSGR3_64/Docs/R3-091086.zip.
International Search Report and Written Opinion—PCT/US2011/051961—ISA/EPO—dated Jan. 26, 2012.
International Search Report and Written Opinion—PCT/US2011/062948—ISA/EPO—dated Mar. 15, 2012.
Lgic : "A Modified Mapping Rule for Multiple-Scrambling Codes," 3GPP TSG-RAN WG1 #7 R1-99b91,< URL: http://www.3gpp.org/ftp/tsg_ran/WG1_RL1/TSGR1_07/Docs/Pdfs/R1-99b91.pdf>, Aug. 30, 1999, 6 Pages.<url:></url:>.
Mitsubishi Electric, "Macro/Femto PCI split," 3GPP TSG-RAN WG3 Meeting #65 R3-091865,Aug. 28, 2009,p. 1-p. 3,URL,http://www.3gpp.org/ftp/tsg_ran/WG3_Iu/TSGR3_65/Docs/R3-091865.zip.

(56) References Cited

OTHER PUBLICATIONS

Nokia Corp., et al.,"Practical Solutions for ANR for UTRAN," 3GPP TSG-RAN WG2 Meeting #70bis, R2-103899, Jun. 28,-Jul. 2, 2010, 10 pages.

Nokia Siemens Networks: "LTE & UMTS CSG mobility service interruption times," 3GPP TSG-RAN WG2 Meeting #66 Los Angeles, U.S.A, R2-093981, URL: http://www.3gpp.org/ftp/tsg_ran/WG2_RL2/TSGR2_66bis/Docs/R2-093981.zip, Jun. 28, 2009, 7 Pages.<url:><url:></url:></url:>.

NTT Docomo : "E-UTRAN handover," 3GPP TSG RAN WG2 adhoc_2005_06_LTE R2-051739, URL: http://www.3gpp.org/ftp/tsg_ran/WG2_RL2/TSGR2_AHs/2005_06_LTE/Docs/R2-051739.zip, Jun. 20, 2005, 27 Pages.<url:></url:>.

Qualcomm Europe: "Considerations on enabling Active hand-in for legacy UEs", 3GPP Draft; R3-090842, 3rd Generation Partnership Project (3GPP), Mobile Competence Centre; 650, Route Des Lucioles; F-06921 Sophia-Antipolis Cedex; France, No Seoul, Korea; Mar. 19, 2009, Mar. 19, 2009 (Mar. 19, 2009), pp. 1-4, XP050341218, [retrieved on Mar. 19, 2009] the whole document.

Qualcomm Europe: "Measurement and mobility issues for home (e)Node Bs" 3GPP Draft; R2-074117, 3rd Generation Partnership Project (3GPP), Mobile Competence Centre ; 650, Route Des Lucioles ; F-06921 Sophia-Antipolis Cedex; France, vol. RAN WG2, No. Shanghai, China; Oct. 8, 2007, Oct. 1, 2007 (Oct. 1, 2007), XP050136747 the whole document.

Qualcomm Europe: "Mechanism for pre-Rel-9 UE inbound mobility," 3GPP TSG-RAN WG3 #65, R3-091870,< URL: http://www.3gpp.org/ftp/tsg_ran/WG3_Iu/TSGR3_65/Docs/R3-091870.zip>, Aug. 24, 2009, 8 Pages.<url:></url:>.

Taiwan Search Report—TW100144239—TIPO—dated Mar. 6, 2014.

Tiedemann E G: "Femtocell Activities in 3GPP2 TSG-C", 3rd Generation Partnership Project (3GPP) ; Technicalspecification Group (TSG) Radio Access Network (RAN) ; Working Group 2 (WG2) , XX, XX Mar. 31, 2009 (Mar. 31, 2009), pp. 1-18, XP002599307, Retrieved from the Internet : URL:fftp://ftp.3gpp2.org/TSGX/Working/2009 /2009-03-New%20rleans/A11%20TSG%20Femto%20Discussion/XS1-20090331-004-TSG-C Femto%200 Overview-090330.p [retrieved on Sep. 2, 2010].

* cited by examiner

APPARATUS AND METHODS FOR HAND-IN TO A FEMTO NODE

CLAIM OF PRIORITY UNDER 35 U.S.C. § 119

Cross-Reference to Related Cases

The present Application for Patent is a continuation of application Ser. No. 13/308,311, entitled "APPARATUS AND METHODS FOR HAND-IN TO A FEMTO NODE" filed Nov. 30, 2011, which claims priority to Provisional Application No. 61/418,589 entitled "APPARATUS AND METHODS FOR HAND-IN TO A FEMTO NODE" filed Dec. 1, 2010 and Provisional Application No. 61/422,119 entitled "APPARATUS AND METHOD FOR PERFORMING HAND-IN TO A FEMTOCELL" filed Dec. 10, 2010, and is a continuation-in-part of application Ser. No. 13/233,810 entitled "APPARATUS AND METHODS OF HAND-IN TO A FEMTO NODE" filed Sep. 15, 2011, which claims priority to Provisional Application No. 61/383,715 entitled "APPARATUS AND METHODS OF HAND-IN TO A FEMTO NODE" filed Sep. 16, 2010, and Provisional Application No. 61/384,189 entitled "APPARATUS AND METHODS OF HAND-IN TO A FEMTO NODE" filed Sep. 17, 2010, all of which are assigned to the assignee hereof and hereby incorporated by reference herein.

BACKGROUND

Field

The following description relates generally to wireless network communications, and more particularly to hand-in of device communications among base stations.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional restricted base stations can be deployed to provide more robust wireless coverage to mobile devices. For example, wireless relay stations and low power base stations (e.g., which can be commonly referred to as Home NodeBs or Home eNBs, collectively referred to as H(e)NBs, femto nodes, pico nodes, etc.) can be deployed for incremental capacity growth, richer user experience, in-building or other specific geographic coverage, and/or the like. In some configurations, such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection.

For example, such low power base stations can support hand-in of a device to/from a conventional base station (e.g., a macrocell base station). In one example, this can include active mode hand-in of a device on an active call. Such hand-in can be encumbered by some challenges. For example, in triggering of active hand-in, especially inter-frequency hand-in, there may not be a reliable trigger to initiate hand-in of the device to a low power base station. In another example, disambiguation of low power base stations can be an issue since a number of available identifiers for the base stations in a particular cell may be less than the number of base stations in the cell. Thus, the identifier alone may not be sufficient to uniquely identify a low power base station that is target of a hand-in attempt.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with disambiguating beacon signals transmitted by various base stations. A device receiving the beacons can report one or more aspects thereof, such as a primary scrambling code (PSC), and a serving base station, target base station, one or more gateway nodes, and/or the like can determine a target base station related to the beacon based on the PSC. In one example, this can include applying one or more filters at the serving base station, gateway node, or target base station to determine the target base station. In another example, a target base station can transmit additional PSCs to assist in disambiguating the target base station identified by a device.

According to an example, a method for wireless communications is provided. The method includes receiving a handover message for a device comprising one or more parameters including a PSC related to a target femto node and applying, to one or more femto nodes that utilize the PSC, one or more filters based in part on the one or more parameters to determine whether at least one femto node of the one or more femto nodes corresponds to the target femto node. The method also includes preparing the at least one femto node to receive hand-in of the device.

In another aspect, an apparatus for disambiguating a target femto node is provided. The apparatus includes at least one processor configured to receive a handover message for a device comprising one or more parameters including a PSC related to a target femto node and apply, to one or more femto nodes that utilize the PSC, one or more filters based in part on the one or more parameters to determine whether at least one femto node of the one or more femto nodes corresponds to the target femto node. The at least one processor is further configured to prepare the at least one femto node to receive hand-in of the device. The apparatus also includes a memory coupled to the at least one processor.

In yet another aspect, an apparatus for disambiguating a target femto node is provided that includes means for receiving a handover message for a device comprising one or more parameters including a PSC related to a target femto node and means for applying, to one or more femto nodes that utilize the PSC, one or more filters based in part on the one or more parameters to determine whether at least one femto node of the one or more femto nodes corresponds to the target femto node. The apparatus further includes means for preparing the at least one femto node to receive hand-in of the device.

Still, in another aspect, a computer-program product for disambiguating a target femto node is provided including a computer-readable medium having code for causing at least one computer to receive a handover message for a device comprising one or more parameters including a PSC related to a target femto node. The computer-readable medium further includes code for causing the at least one computer to apply, to one or more femto nodes that utilize the PSC, one or more filters based in part on the one or more parameters to determine whether at least one femto node of the one or more femto nodes corresponds to the target femto node and code for causing the at least one computer to prepare the at least one femto node to receive hand-in of the device.

Moreover, in an aspect, an apparatus for disambiguating a target femto node is provided that includes a communications component for receiving a handover message for a device comprising one or more parameters including a PSC related to a target femto node and a femto node disambiguating component for applying, to one or more femto nodes that utilize the PSC, one or more filters based in part on the one or more parameters to determine whether at least one femto node of the one or more femto nodes corresponds to the target femto node. The apparatus further includes a component for preparing the at least one femto node to receive hand-in of the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
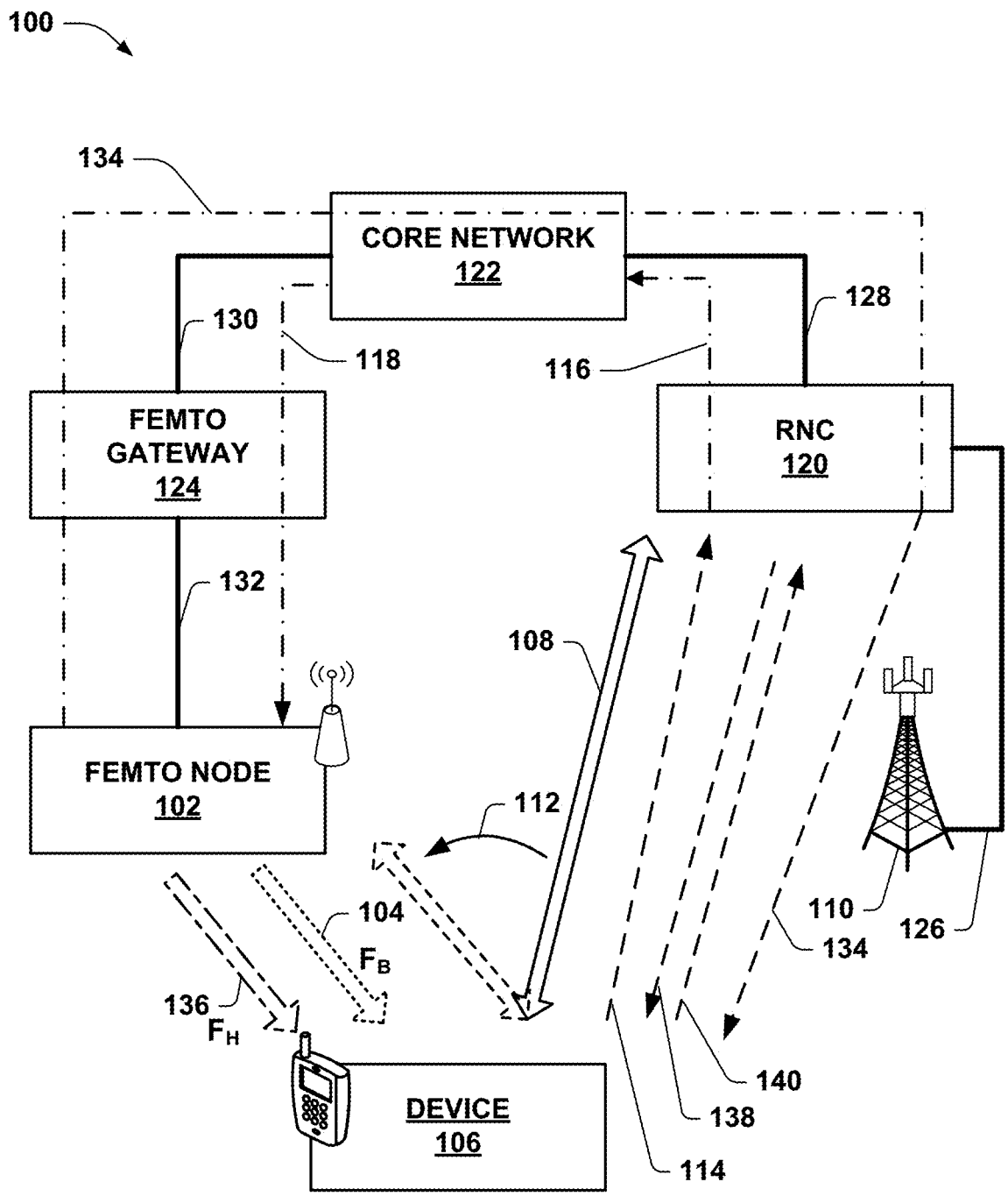
FIG. 1 is a block diagram of an example system for communicating a beacon to cause inter-frequency active hand-in for a device.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, various aspects are presented relating to generating, at a femto node, a beacon that is operable to initiate a hand-in of a device from a macrocell base station. Though described in relation to femto nodes, it is to be appreciated that the concepts herein can be utilized in conjunction with substantially any low power base station, such as a H(e)NB, picocell or microcell nodes, a relay node, etc. In addition, though active mode hand-in is contemplated, additional terms, such as handover, can be utilized herein, and both terms are meant to generally include substantially any hand-in or handover mechanisms in wireless communications. The femto node, in one example, broadcasts the beacon on a given frequency associated with the network of a macrocell base station to assist or initiate hand-in of the device. Further, in an aspect, the network can configure the device to generate a reporting message when the device detects the beacon, and the macrocell base station or corresponding network can use information in the reporting message, or in subsequent network-requested reporting messages, to trigger hand-in of the device to the femto node. Thus, the beacon of the described apparatus and methods enables the device to acquire the pilot signal of the femto node and hand-in the device or related communications (e.g., such as an active call thereof) to the femto node.

For example, in some aspects, the beacon can trigger the device (e.g., and the macrocell base station or corresponding network) to perform hand-in of the device to the inter-frequency femto node. In other aspects, for example, the beacon can trigger the device to report a proximity indication to assist in determining a femto node related to the beacon. In another aspect, for example, the beacon can cause interference to one or more devices, which can cause the network to configure the device to perform measurement reporting. In this case, the network can provide the device with information to help the device recognize a femtocell access point or related beacon, such as ranges for corresponding primary scrambling codes (PSC), so that measurements of the beacon can be reported back to the network. Such measurement reporting can include additional information to aid in handover processing.

Additionally, in further aspects, the described apparatus and methods can enable disambiguation of the femto nodes. For example, in an aspect, the network can use information in the reporting message from the device (e.g., obtained from the beacon), such as a target cell identifier, PSC, etc. to uniquely identify the target femto node. Additionally or alternatively, the network can provide information to the femto node or a related gateway to facilitate identifying the femto node, such as one or more PSCs, a device identity, a measurement report received from the device or one or more parameters thereof, etc. In an example, the target femto node and/or related gateway can apply one or more filters to determine the target femto node based on the one or more PSCs or other received parameters.

In addition, many aspects of the beacon can be configured as described herein, such as an initial, maximum, or current power for transmitting the beacon, a time period for transmitting the beacon, etc., to manage potential interference of the beacon caused to one or more base stations or devices communicating therewith. Moreover, aspects of devices measuring femto nodes transmitting the beacon can be managed, such as compressed mode periods during which the devices can switch to an operating frequency of a femto node to perform and report measurements on the operating frequency. For example, a device can indicate proximity to a femto node, and a serving base station can accordingly schedule compressed mode while the device is within the proximity to conserve radio resources at the device.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 for beacon-driven active hand-in is illustrated. System 100 includes a femto node 102 that transmits a beacon 104 on a macro network frequency, $F_B$. System 100 also includes a device 106, which can be engaged in an active call 108 with a radio network controller (RNC) 120 via a macrocell base station 110 and can detect beacon 104. In an example, device 106 can thus initiate a hand-in 112 of device 106 communications (e.g., including active call 108) to femto node 102. In particular, upon detecting beacon 104, device 106 can generate a reporting message 114 that triggers communication of handover request messages 116 and 118 through one or more network nodes, such as RNC 120, the core network (CN) 122 (e.g., which can represent one or more nodes of a core wireless network, such as gateways, mobility management entities, supporting nodes, etc.), and a femto gateway 124 via communication links 126, 128, 130 and 132, to the femto node 102. In response, for example, femto node 102 generates a handover command message 134 that can be communicated back through the network and received by device 106.

The handover command message 134 enables device 106 to hand-in communications (e.g., including active call 108) to femto node 102. For example, the communications, including active call 108, can be carried on a femto node pilot frequency, $F_H$ 136. For example, femto node pilot frequency, $F_H$, which can be an operating frequency of the femto node 102, can be a different frequency than macro network frequency, $F_B$, used for transmitting beacon 104. Thus, beacon 104 transmitted by femto node 102 drives the hand-in 112 of communications from the macrocell base station 110 to femto node 102, even where femto node 102 operates on different frequency than the macrocell base station 110.

In one example, femto node 102 can generate beacon 104 to be similar to a beacon transmitted by macrocell base station 110 or other base stations related to CN 122. Thus, for example, the beacon 104 can include various channels utilized by beacons of base stations participating in CN 122. In another example, femto node 102 can control power of the beacon 104 to avoid interfering communications of one or more other devices to macrocell base station 110 and/or other femtocell or macrocell base stations. For instance, femto node 102 can attempt to detect such interference caused by beacon 104 and/or can receive an indication of such interference for determining a power to utilize to mitigate the interference.

It should be noted that in some aspects, after reception of message 114 from the device 106, RNC 120 can request that device 106 report additional parameters regarding the femto node 102 or corresponding beacon 104 by communicating one or more messages 138 thereto. Device 106 may then generate one or more additional reporting messages 140 to report the requested information. In one example, device 106 can acquire the additional parameters from the beacon 104 and/or by receiving other signals over an operating frequency of femto node 102. Thus, in one example, the RNC 120 can schedule compressed mode for the device 106 to measure signals from femto node 102. In one example, device 106 can indicate a proximity to femto node 102 to the RNC 120, which can cause the RNC 120 to schedule the compressed mode. For example, device 106 can indicate the proximity explicitly via a proximity message, implicitly via a measurement report message the RNC 120 interprets as proximity, etc.

In system 100, the information from message 114 and/or message(s) 140 can be used to enable identification of the proper femto node 102 detected by device 106 to continue the hand-in. For example, the disambiguation can be performed by the femto node 102, RNC 120, CN 122, femto gateway 124, and/or other components. As discussed further herein, such disambiguation enables a femto node 102 corresponding to the beacon 104 to be identified in areas or cells where re-use of femto node or beacon identifiers occur.

In an example, the femto node 102, RNC 120, CN 122, femto gateway 124, and/or other components can disambiguate the beacon by applying one or more filters, as described further herein. For example, femto gateway 124 can apply a source filter to identify macrocell base station 110, a related cell, RNC 120, etc. This allows the femto node 102 and/or femto gateway 124 to narrow the target femto node down to one or more femto nodes that is within a threshold distance, for example. Other filters can include an observed time difference (OTD) filter that compares timing difference of femto nodes and a source macrocell base station to that reported by the device 106, a PSC filter that determines femto nodes having a specified PSC and operating frequency, which can be obtained in reporting message 114, an access control filter that identifies femto nodes to which the device 106 has access (e.g., in a restricted association implementation), a uplink (UL) received signal strength indicator (RSSI) filter that determines femto nodes having a rise in UL RSSI corresponding device 106 presence, an active hand-in eligibility filter that determines femto nodes that are able to accept hand-in of device 106, a timing filter that determines femto node according to a transmit/receive timing reported by the device 106, and/or the like.

Moreover, in an example, the femto node 102, RNC 120, CN 122, femto gateway 124, and/or other components can disambiguate the beacon by allowing femto node 102 to transmit multiple PSCs, each of which can be received and used to determine the target femto node. In addition, where the beacon cannot be disambiguated, multiple femto nodes 102 can be prepared for handover of device 106. Moreover, the macrocell base station 110 can hold resources used by the device 106 until handover is confirmed to allow device 106 to revert back to macrocell base station 110 where disambiguation is not successfully resolved.

Figure 2:
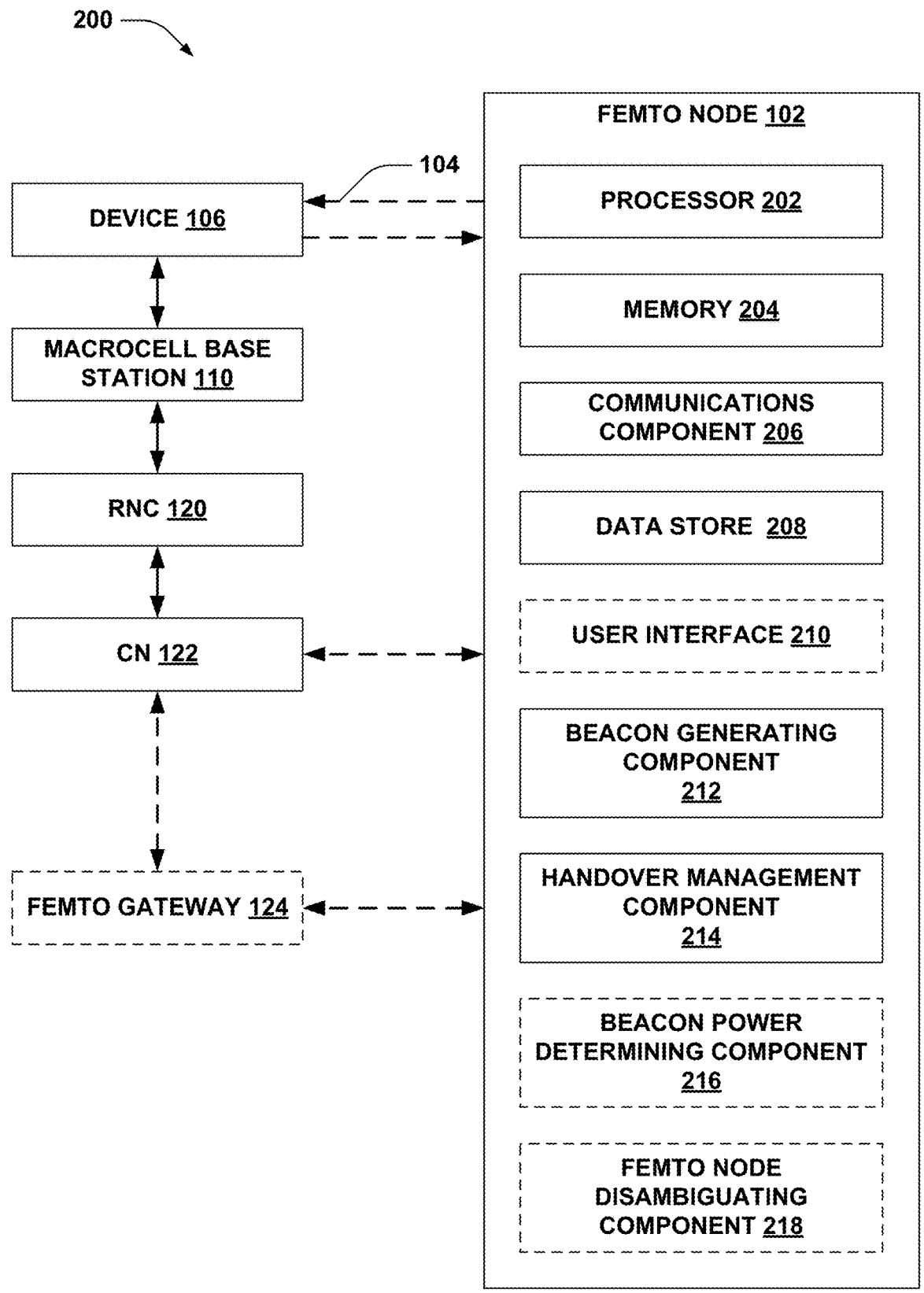
FIG. 2 is a block diagram of an example system for generating and transmitting a beacon over a macrocell frequency.

Referring to FIG. 2, a wireless communication system 200 is illustrated for causing a device to perform active hand-in to a femto node. System 200 includes a femto node 102 that can communicate one or more beacons 104 for causing one or more devices, such as device 106 to hand-in communications to the femto node 102. Device 106 can communicate with macrocell base station 110 that provides access to a CN 122 (e.g., via RNC 120). System 200 can also optionally include a femto gateway 124 that manages one or more parameters of the femto node 102 and one or more other femto nodes (not shown). Femto node 102 can include a processor 202 for carrying out processing associated with one or more of components or functions described herein. Processor 202 can include a single or multiple set of processors or multi-core processors. Moreover, processor 202 can be implemented as an integrated processing system and/or a distributed processing system.

Femto node 102 can further include a memory 204, such as for storing local applications being executed by processor 202, instructions thereof, instructions for performing one or more functions described herein, and/or the like. Memory 204 can include any type of memory usable by a computer, such as random access memory (RAM), read only memory (ROM), tapes, magnetic discs, optical discs, volatile memory, non-volatile memory, and any combination thereof.

Further, femto node 102 can include a communications component 206 that provides for establishing and maintaining communications with one or more other components of system 200, such as femto gateway 124, CN 122 (e.g., via femto gateway 124), and/or the like for example, utilizing hardware, software, and services as described herein. Communications component 206 can carry communications between components on femto node 102, as well as between femto node 102 and external devices, such as devices located across a communications network (e.g., on or more components of CN 122, device 106, etc.) and/or devices serially or locally connected to femto node 102. For example, communications component 206 can include one or more buses, and may further include transmit chain components and receive chain components, respectively including one or more transmitters and receivers, or transceivers, operable for interfacing with external devices, such as device 106.

Additionally, femto node 102 can further include a data store 208, which can be any suitable combination of hardware and/or software, that provides for mass storage of information, databases, and programs employed in connection with aspects described herein. For example, data store 208 may be a data repository for applications not currently being executed by processor 202.

Femto node 102 can optionally include a user interface component 210 operable to receive inputs from a user of femto node 102, and further operable to generate outputs for presentation to the user. User interface component 210 can include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 210 can include one or more output devices, including but not limited to a display, a speaker, a haptic feedback mechanism, a printer, any other mechanism capable of presenting an output to a user, or any combination thereof.

Additionally, femto node 102 can include a beacon generating component 212 for generating one or more beacons 104, and a handover management component 214 for performing active hand-in of a device to femto node 102. Femto node 102 can also optionally include a beacon power determining component 216 for determining and/or adjusting power for transmission of the one or more beacons 104, and/or a femto node disambiguating component 218 for determining whether femto node 102 is an intended target femto node of the device 106.

According to an example, beacon generating component 212 can create a beacon 104, which can emulate downlink transmissions by base stations of CN 122 (e.g., femto node's 102 transmissions over another carrier, such as the operating frequency of femto node 102), and communications component 206 can transmit the beacon 104 over a frequency utilized by macrocell base stations in the CN 122 to cause active hand-in by device 106 or other devices. For example, beacon generating component 212 can include a pilot channel (e.g., a common pilot indicator channel (CPICH) in wideband CDMA (WCDMA)), a synchronization channel (e.g., a primary synchronization channel (PSCH), secondary synchronization channel (SSCH), etc., in WCDMA), a control channel (e.g., primary common control physical channel (P-CCPCH) in WCDMA), and/or the like within beacon 104 to emulate the macrocell base station 110 or similar beacons. In addition, the operating frequency of the macrocell base station 110 can be different from the operating frequency of femto node 102, and thus the beacon 104 transmitted on the operating frequency of macrocell base station 110 can cause an inter-frequency hand-in of device 106 served by macrocell base station 110.

Device 106 can receive beacon 104 over the macrocell base station frequency (e.g., while communicating with a macrocell base station 110), and can report one or more parameters regarding the beacon to RNC 120 in a measurement report. RNC 120, femto gateway 124, and/or one or more components of CN 122, can identify the femto node 102, as described further herein, and cause device 106 to hand-in thereto based on the measurement report. For example, handover management component 214 can obtain a handover message from RNC 120 (e.g., via CN 122 and/or femto gateway 124) that provides information related to handing-in device 106. This can be a radio access network application part (RANAP) relocation request message or similar message. Handover management component 214 can accordingly construct a radio resource control (RRC) handover command to configure device 106 to communicate with femto node 102. For example, this can include configuring the device 106 on the operating frequency of femto node 102 with the corresponding PSC for receiving signal from femto node 102, communicating the command to the device 106 (e.g., via femto gateway 124, CN 122, and/or RNC 120). RNC 120 can accordingly configure the device for handover to femto node 102 via macrocell base station 110.

In specific examples, beacon generating component 212 can broadcast the beacon 104 with a CPICH, which can include another PSC from one or more closed subscriber group (CSG) lists on the frequency of the macrocell base station 110. For example, the femto node 102 can implement restricted association such to allow access to certain devices and/or varying levels of access to certain devices, as described further herein. Beacon generating component 212 can advertise a CSG identifier based on the another PSC utilized to scramble a pilot in the CPICH of the beacon 104. The PSC of the beacon 104 can be different or the same as a PSC used by femto node 102 to communicate on an operating frequency thereof (e.g., as indicated in pilot signals over the operating frequency). In this example, device 106 can identify the CSG based on the PSC used for beacon 104 (and/or the PSC used on the operating frequency where device 106 is able to measure pilot signals on the operating frequency), and/or can include such an identity or the PSC(s) in the measurement report to macrocell base station 110.

For example, the PSC generated in the beacon 104 by femto node 102 and the PSC used by femto node 102 over its operating frequency can be the same or different PSC. In an example, a mapping of the PSC(s) to cell identifier can be stored in RNC 120, CN 122, femto gateway 124, etc., to facilitate at least partially identifying femto node 102 based on one or more of the PSCs. In one example, there can be a one-to-one mapping of PSC of beacon 104 to that of the femto node 102 over the operating frequency, a many-to-one mapping, a one-to-many mapping, etc., each of which can be associated with a cell identity of a femto node 102. Thus, in one example, the PSC for beacon 104 can be assigned (e.g., by femto gateway 124 or CN 122) to create a unique combination of beacon 104 PSC to femto node operating frequency PSC for including in the mapping to subsequently identify femto gateway 124 based on the reported PSCs.

In another specific example, beacon generating component 212 can include a P-CCPCH in the beacon 104 that can provide one or more system information blocks (SIB), master information blocks (MIB), which can include a CSG identifier, cell identifier, etc., which device 106 can utilize to report an identity related to femto node 102 in the measurement report. For example, the reported identifier can be the CSG identifier, cell identifier, etc., and/or an identifier determined based in part on the CSG identifier, cell identifier, etc.

In another example, beacon generating component 212 can control relative power levels of the individual channels (e.g., CPICH, PSCH/SSCH, P-CCPCH, etc.) within beacon 104. For example, beacon generating component 212 can increase power of the P-CCPCH to minimize time required for device 106 to receive system information. In any case, for example, upon receiving a measurement report from device 106 (e.g., via macrocell base station 110), RNC 120 can at least one of cause device 106 to hand-in to femto node 102, configure measurement configuration parameters (e.g., compressed mode parameters) for the device 106 to measure femto node 102 on the operating frequency thereof, and/or the like. Thus, where RNC 120 determines to hand-in device 106, RNC 120 can communicate one or more messages to femto node 102 to prepare for hand-in. Handover management component 214 can receive such messages from RNC 120 (e.g., via one or more components of CN 122, femto gateway 124, and/or the like), and can prepare for hand-in of device 106, as described further herein. In addition, in an example, where RNC 120 is unaware of an operating frequency of femto node 102 or one or more parameters thereof, handover management component 214 can communicate the operating frequency of femto node 102 (e.g., and/or the PSC used over the operating frequency) to RNC 120 to allow RNC 120 to prepare the device to hand-in to femto node 102.

Moreover, in an example, beacon generating component 212 can create the beacon as interference to device 106. In this example, RNC 120 can configure device 106 to generate a measurement report when signal quality of the macrocell base station 110 drops below a threshold level (e.g., similar to event 1f, 2b, 2d, etc. in WCDMA). When generation of the measurement report is triggered, device 106 reports, based on configuration of such measurement by RNC 120, a PSC of femto node 102 or of related beacon 104, as described, as well as additional information, such as chip-level timing information, layer-2 (e.g., media access control (MAC) layer) information like system frame number (SFN)-cell frame number (CFN), cell identity, CSG identity, other restricted association membership information, etc. For example, such information can assist in disambiguating the beacon 104 from that of other femto nodes and/or in determining access rights of the device 106 to the femto node 102.

Furthermore, beacon power determining component 216 can select a transmit power that communications component 206 can use to transmit the beacon 104 in an effort to mitigate interference to one or more devices. For example, beacon power determining component 216 can determine the power based on a received signal strength indicator (RSSI) detected on an uplink carrier before and/or during transmission of beacon 104. For example, beacon power determining component 216 can obtain the RSSI based on uplink signals received by communications component 206. In addition, beacon power determining component 216 can utilize one or more RSSI measurements to detect presence of a device, such as device 106. For example, where the RSSI is over a threshold level and/or a change in the RSSI over a period of time is at least a threshold, beacon power determining component 216 can determine that a device 106 is present. Beacon power determining component 216 can use the detected presence of the device 106 and/or the RSSI level to turn the beacon on or off, and/or to adjust power for transmitting the beacon 104.

In addition, beacon power determining component 216 can determine the threshold RSSI and/or threshold changes in RSSI based at least in part on one or more parameters relating to the macrocell base station 110 (and/or other base stations) to mitigate interference thereto. For example, beacon power determining component 216 can obtain at least one of a pathloss to macrocell base station 110, a noise rise at macrocell base station 110, a maximum downlink pilot channel power allowed at macrocell base station 110, a uplink signal-to-interference ratio (SIR) target for device 106 at macrocell base station 110, etc. Based on at least one of the foregoing, in this example, beacon power determining component 216 can set a RSSI threshold and/or a threshold for a change in RSSI over a period of time relate to adjusting the beacon 104 or turning the beacon 104 on/off to mitigate interference to macrocell base station 110 that may be caused by beacon 104.

Additionally, beacon power determining component 216 can set transmit power of beacon 104 based on one or more other parameters. For example, beacon power determining component 216 can set transmit power based on thresholds or other events configured at macrocell base station 110, such as event 1a, hysteresis, and event 2d for inter-frequency measurements in a specific WCDMA configuration. In another example, beacon power determining component 216 can determine the transmit power based at least in part on a cell individual offset (CIO) corresponding to the beacon 104. For example, beacon power determining component 216 can obtain such parameters from at least one of a measurement configuration at the RNC 120 included in RANAP hand-in or other messaging, a configuration received by one or more components of CN 122 (e.g., an operations, administration, and maintenance (OAM) server, etc.), a backhaul link to macrocell base station 110, communications with one or more devices or other over-the-air (OTA) connection, and/or the like. Moreover, beacon power determining component 216 can set a transmit power based on a type of signal detected from device 106 or one or more other devices.

In another example, beacon power determining component 216 can utilize communications component 206 to measure RSSI on multiple carriers. In this example, beacon power determining component 216 can sense device 106 presence at least in part by detecting a decrease in RSSI over one carrier and a corresponding increase in RSSI over another carrier, which can indicate inter-frequency hand-in of device 106. If the handover is detected to a carrier related to beacon 104 (e.g., RSSI of the carrier increases over a threshold level), beacon power determining component 216 can accordingly turn off and/or reduce power of beacon 104 on that carrier.

In yet another example, beacon power determining component 216 can turn on the beacon 104 and/or select a corresponding transmit power based on detecting presence of device 106. Thus, using one or more sensing mechanisms (e.g., as described above or otherwise), beacon power determining component 216 can detect presence of a device, and can accordingly set the transmit power for beacon 104 as a function of an RSSI, a measured change in RSSI over a period of time, etc. In one example, handover management component 214 can determine whether the device 106 is a member of a CSG related to femto node 102, and if not, beacon power determining component 216 can turn off or reduce the power of the beacon 104. In one example, handover management component 214 can determine such by attempting to authenticate the device 106 based on a received handover request from RNC 120. In another example, handover management component 214 can determine such based on not receiving a handover request message from RNC 120 after a period of time from detecting RSSI or change in RSSI at a threshold. For example, this can indicate that the sensed device 106 is in range of femto node 102 and receiving the beacon 104, but not attempting to hand-in to femto node 102 (e.g., because device 106 determined that it is not in the CSG).

In one example, uplink transmit power at device 106 for a voice call can be lower than that of a packet switched (PS) call or high speed uplink packet access (HSUPA) call, and thus can result in a lower RSSI increase. Thus, a given increase in RSSI detected by beacon power determining component 216 can be caused by a device in a voice call that is close to the femto node 102, or a PS/HSUPA call from a device that is farther away from femto node 102. In this example, beacon power determining component 216 can reduce power of beacon 104 by a relatively small amount such that an approaching device 106 can trigger active hand-in when at a threshold distance from femto node 102. In one example, this can result in inter-frequency hand-in attempt to another non-femto carrier by device, but can alternatively result in an active hand-in attempt by device 106 to femto node 102.

Beacon power determining component 216 can set the beacon 104 power in an attempt to at least one of mitigate interference caused by the beacon 104, maintain quality of the beacon 104, create conditions for triggering events at device 106, such as event 1a in WCDMA, or other hand-in events. Additionally, beacon power determining component 216 can configure a maximum power for beacon 104, which can be based on at least one of maintaining a desired signal strength of the beacon 104 to a certain level at a desired distance or desired pathloss. For example, beacon power determining component 216 can determine such according to parameters of nearby base stations—e.g., by measuring signal strength of nearby base stations, such as macrocell base station 110, using a network listening module (NLM), by receiving SIB parameters therefrom, and/or the like. In this regard, beacon power determining component 216 can determine different transmit powers for beacon 104 where femto node 102 is located at different positions with respect to macrocell base station 110 (e.g., such as at cell edge or cell site).

Though described in terms of sensing a device 106 based on uplink power measurements, it is to be appreciated that beacon power determining component 216 can also detect presence of a device 106 based on receiving a RANAP relocation request message therefor. In addition, though described above with respect to a beacon 104 transmitted over an operating frequency of macrocell base station 110, it is to be appreciated that communications component 206 can transmit beacon 104 and/or other beacons over additional frequencies, which can correspond to operating frequencies of other base stations associated with CN 122. Communications component 206 can perform frequency hopping of the beacon 104 to hop the beacon 104 over different frequencies in different time periods. In this example, beacon power determining component 216 can also perform uplink sensing of devices over the multiple operating frequencies according to aspects described above. In one example, beacon generating component 212 can generate the beacon to cycle through frequencies in given time periods. For example, the cycle can be based at least in part on the uplink sensing performed by beacon power determining component 216, such that a frequency carrier with a low RSSI or other measurement can be selected for the beacon to mitigate interference caused to other devices. In another example, beacon generating component 212 can select a frequency carrier where an increase of RSSI is observed for the beacon, so as to trigger hand-in for a device causing the increase in RSSI on that carrier. In addition, transmission of beacon 104 can be performed periodically or aperiodically, according to one or more configurations, etc.

In addition, in one example, upon receiving a handover message from femto gateway 124 or RNC 120 (e.g., via CN 122) related to hand-in of device 106, femto node disambiguating component 218 can determine whether femto node 102 is a candidate for hand-in of device 106. For example, this can be based in part on pathloss to macrocell base station 110 and/or device 106, a received location of device 106 (e.g., as compared to a location of femto node 102), one or more reported PSCs, measuring an RSSI to determine a presence of one or more devices (e.g., as compared to a previous RSSI or otherwise) and/or the like. In another example, determining whether femto node 102 is a candidate can be based at least in part on comparing one or more signal measurements, timing measurements or differences between that of a serving macrocell base station, timing offsets, etc. measured and reported by device 106 to known information of femto node 102, as described further herein.

In one example, the handover message can include information related to a target femto node, which can assist femto node 102 in determining whether it is, in fact, the target femto node 102 detected by device 106. As described, multiple femto nodes can use the same PSC (e.g., due to limited namespace, lack of planned configuration, etc.), and thus femto node disambiguating component 218 can perform one or more functions to identify whether femto node 102 is possibly the target femto node to which reselection is intended by device 106. In one example, the handover message received from the CN 122, femto gateway 124, etc., can include the PSC and/or other parameters reported by the device 106. In another example, femto gateway 124 can add parameters to the handover message as received from the device 106 or otherwise determined based on parameters from the device 106. In any case, the femto node disambiguating component 218 can apply one or more filters to determine whether femto node 102 is the target femto node intended by device 106 based in part on the PSC and/or other parameters.

As described above and further herein, for example, femto node disambiguating component 218 can apply a source filter to identify macrocell base station 110, a related cell, RNC 120, etc. This allows the femto node disambiguating component 218 to narrow the target femto node down to one or more femto nodes that is within a threshold distance of RNC 120, for example. Other filters can include an OTD filter that compares timing difference related to femto node 102 to that reported by the device 106, a PSC filter that compares a PSC and operating frequency of femto node 102 to that reported by device 106 (e.g., in a measurement report or other reporting message), an access control filter that identifies whether the device 106 can access femto node 102 (e.g., where femto node 102 correlates to a restricted association, such as a closed subscriber group (CSG)), a UL RSSI filter that determines whether a noise rise experienced by femto node 102 (if any) corresponds to a presence of a device, an active hand-in eligibility filter that determines whether femto node 102 is able to accept hand-in of device 106, a timing filter that compares a timing of femto node 102 to that reported by the device 106, and/or the like.

Where femto node disambiguating component 218 determines that femto node 102 is the target femto node, handover management component 214 can accept hand-in of the device 106. In one example, this can include communicating a handover message (e.g., RANAP relocation response message) to the femto gateway 124, CN 122, etc. for communicating to RNC 120 and/or device 106 to facilitate the hand-in. Where femto node disambiguating component 218 determines that femto node 102 is not the target femto node intended by device 106, handover management component 214 can reject or otherwise deny the hand-in, which can include sending a rejection message (e.g., RANAP relocation failure message) to the femto gateway 124 and/or CN 122. Additionally, in an example, femto node disambiguating component 218 can detect that femto node 102 is oftentimes determined to not be the target femto node though the femto gateway 124 attempts to prepare femto node 102 for hand-in. For example, this can be based on determining such over a threshold number of determinations in a given time period. In this example, beacon generating component 212 can reconfigure one or more aspects of the beacon 104 (e.g., the PSC, subframe offset or other timing offset, etc. used for the beacon 104) to attempt to resolve ambiguity between the femto node 102 and other femto nodes using the same PSC. It is to be appreciated, as described herein, that femto gateway 124 can make a similar determination regarding femto node 102 and can notify femto node 102, which can cause beacon generating component 212 to reconfigure the one or more aspects of the beacon 104. In one example, the femto gateway 124 can determine and present a set of options for reconfiguration (e.g., one or more selectable PSCs, timing offsets, and/or the like) to femto node 102.

In other examples to facilitate disambiguating a target femto node indicated by device 106, beacon generating component 212 can create and transmit multiple beacons 104 in a beacon transmission opportunity for reporting by device 106. In one example, beacon generating component 212 can transmit a plurality of beacons 104 using various PSCs, which can also be offset in time (e.g., using different a subframe offset and/or chip offset). For example, the beacons 104 can thus be code division multiplexed (CDM). In this example, device 106 can receive the plurality of beacons 104 (e.g., two beacons). The measurement report can include information regarding both beacons 104 transmitted by femto node 102, including PSCs, timing information, and/or the like. RNC 120 can determine to pursue hand-in based on a reported signal quality of a femto node related to the PSCs, as described, and can provide the measurement report message or information therefrom to the CN 122, which can provide the information to femto gateway 124 and/or femto node 102. In this example, femto node disambiguating component 218 can obtain the reported PSCs and/or timing information, and can compare to the PSCs and/or timing information (e.g., a difference in the timing) used by beacon generating component 212. Where the PSCs and/or timing information (e.g., or an order of the beacons based on the timing information) are the same or similar, femto node disambiguating component 218 can determine that femto node 102 is the target femto node measured by device 106. In one example, at least a portion of the various PSCs may be the same where the beacon generating component 212 transmits the beacons over difference frequencies.

In one example, however, device 106 may report PSCs of beacons from neighboring femto nodes as well. In this example, femto node disambiguating component 218 can use other parameters to attempt to determine whether femto node 102 is the target femto node, such as using the power level of the reported PSCs to determine beacons that may have originated from the same source (e.g., that have a similar power level). In another example, femto node disambiguating component 218 can calculate a timing difference between reported PSCs to determine beacons that are possibly from the same source based on the timing difference. In one example, ranges of timing differences can be specified as usable or unusable to facilitate determining whether timing differences can be associated with the same source. Upon determining that PSCs correspond to the same source, femto node disambiguating component 218 can determine whether the PSCs correspond to the beacons of femto node 102.

In one example, this can include determining a difference in OTD of the beacons and comparing to the timing used by beacon generating component 212 in transmitting the beacons 104. Where the OTD and timing are at least within a threshold difference, for example, this can indicate femto node 102 is the target femto node. In one example, as described herein, femto node 102 can obtain a timing difference from the femto gateway 124 to maintain with macrocell base station 110, and communications component 206 can ensure the timing of femto node 102 is at the timing difference as compared to macrocell base station 110. For example, this can be based on periodically measuring timing of the macrocell base station 110 using an NLM or other component, analyzing timing reports from one or more devices, and/or the like.

In addition, to minimize interference, in one example, the beacon power determining component 216 can determine or otherwise control a power of one or more of the CDM-ed, as described herein, which can include turning the one or more beacons on or off. For example, this can be based on reported interference of the femto node 102 from one or more other devices communicating with other base stations, such as macrocell base station 110 or another femto node.

In another example, beacon generating component 212 can transmit beacons using alternating PSCs over multiple beacon transmission opportunities. In this example, device 106 can receive each beacon from femto node 102 and report in separate measurement reports. In this example, upon receiving the first measurement report, if femto gateway 124 and/or femto node disambiguating component 218 cannot determine femto node 102 as the target femto node, the hand-in can be rejected, but the reported PSC can be stored. Then, upon receiving the second measurement report, the femto gateway 124 and/or femto node disambiguating component 218 can compare the second reported PSC to the stored PSC to assist in determining whether the femto node 102 is the target femto node (e.g., where the PSCs match those utilized by beacon generating component 212). Moreover in an example, one of the PSCs can be excluded from a neighbor cell list (NCL) at RNC 120. Upon receiving a measurement report from the device 106 that indicates a PSC used by femto node 102, the other PSC can be provided to the RNC 120, and the RNC can disambiguate the target femto node 102 based on receiving another measurement report from the device 106 specifying the other PSC.

In either case, in an example, beacon generating component 212 can select one or more of the PSCs based in part on determining that the PSCs are not utilized by one or more other femto nodes or base stations. For example, this can include selecting PSC(s) that are not in a CELL_INFO_LIST broadcast or configurable by one or more neighboring base stations; in one example, the beacon generating component 212 can receive such lists from the neighboring base stations and select one or more PSCs not present in the lists. In this example, once the beacon generating component 212 selects a PSC, it can assume CIO is zero for generating a beacon and/or performing related computations. In another example, the beacon generating component 212 can select PSC(s) from a configured range of PSCs supplied by femto gateway 124 or other CN component, a range of PSCs not found within a vicinity of the femto node 102 (e.g., determined by receiving signals from other femto nodes via a NLM), and/or the like.

Where, for example, femto node disambiguating component 218 and/or femto gateway 124 cannot determine whether femto node 102 is the target femto node based on other possible femto nodes, handover management component 214 can accept hand-in and prepare femto node 102 for hand-in simultaneously or successively with other femto nodes. In one example, this can include establishing common resources for the device 106 that are reported to the RNC 120 via femto gateway 124. In one example, handover management component 214 can determine whether device 106 is handed-in to femto node 102 or not after a period of time. If not, handover management component 214 can cancel the established resources. Moreover, it is to be appreciated that femto node 102 can participate in establishing resources where device 106 is not permitted to access femto node 102 (e.g., where femto node 102 implements restricted association that excludes device 106), but can provide hybrid access to device 106. Thus, hand-in does not fail for device 106 where femto node 102 is targeted.

In addition, femto node 102 can transmit a pilot signal on its operating frequency as well, and device 106 can tune to the operating frequency of femto node 102 to additionally receive the pilot signal during one or more time periods, as described further below. In one example, communications component 206 can transmit the pilot signal using a different PSC than for beacon 104, using a different transmit power, and/or the like. In one example, a combination of the PSC of the beacon 104 and the PSC used for the pilot can be used to disambiguate femto node 102 from other femto nodes. Thus, in one example, the PSC for the beacon 104 can be assigned by femto gateway 124 or one or more components of CN 122 to facilitate the disambiguation.

Moreover, in an example, femto node 102 can be configured to provide hybrid access such to allow non-member devices to communicate in some capacity therewith. This can allow such devices to avoid interference from transmission of the beacon 104. The configuration, for example, can be based on location (e.g., femto nodes close to an enterprise entrance can be so configured since nodes further within the enterprise may not cause as much beacon interference to non-member devices outside of the enterprise). In addition, in an example, femto node 102 can operate in open access mode by refraining from transmitting a CSG in MIBs in such a case. Further, in an example, femto node 102 can transmit beacon 104 as coexistent with a cell reselection beacon used to direct idle-mode devices to discover femto node 102.

Moreover, beacon generating component 212 can set a duration of the beacon 104 to be a number of milliseconds (ms) and/or based on one or more events. For example, beacon generating component 212 can set a minimum duration as a time to identify a PSC (e.g., 800 ms) plus a time to perform system acquisition (e.g., 790 ms) plus a time to detect an incoming hand-in (e.g., 500 ms), plus an optional time for completing a hand-in, $TO_{HOacc}$. In one example, the minimum duration can be set to 2090 ms+ $TO_{HOacc}$.

Figure 3:
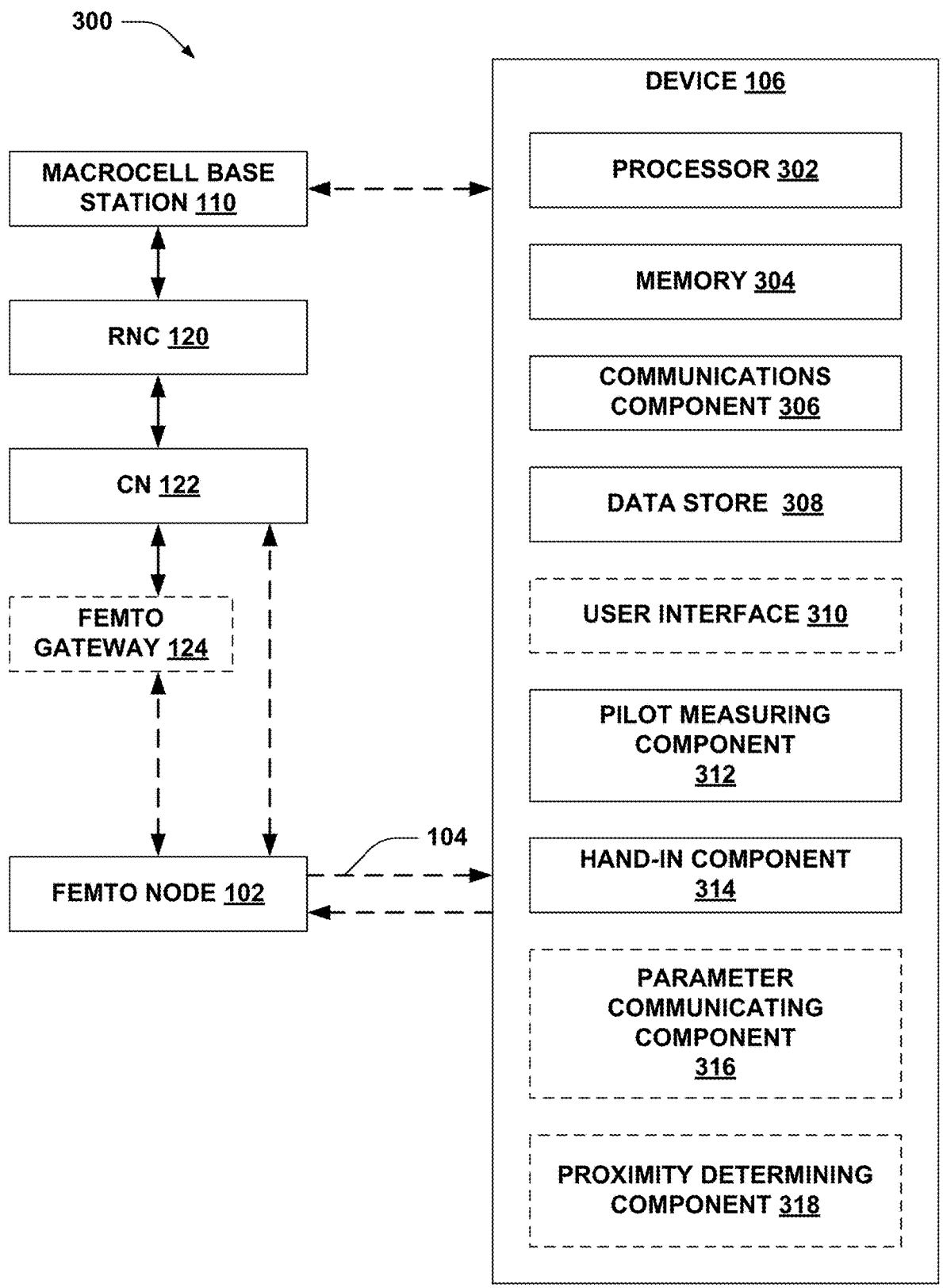
FIG. 3 is a block diagram of an example system for handing-in to a femto node.

Turning to FIG. 3, a wireless communication system 300 is illustrated for causing a device to perform active hand-in to a femto node. System 300 includes a femto node 102 that can communicate one or more beacons 104 for causing one or more devices, such as device 106 to hand-in communications to the femto node 102. Device 106 can communicate with macrocell base station 110 that provides access to a CN 122 (e.g., via RNC 120). System 300 can also optionally include a femto gateway 124 that manages one or more parameters of the femto node 102 and one or more other femto nodes (not shown). Device 106 can include a processor 302, which can be similar to processor 202, a memory 304, which can be similar to memory 204 a communications component 306, which can be similar to communications component 206 provided for establishing and maintaining communications with one or more other components of system 300, such as femto node 102, macrocell base station 110, and/or the like, a data store 308, which can be similar to data store 208, and/or an optional user interface component 310, which can be similar to user interface component 210.

Additionally, device 106 can include a pilot measuring component 312 for performing measurements of one or more pilot signals from one or more base stations, and a hand-in component 314 for reporting the measurements and/or performing one or more functions related to handing-in communications to one or more base stations. Device 106 can also optionally include a parameter communicating component 316 for receiving requests for additional parameters and/or communicating additional parameters to one or more base stations or other network components, and/or a proximity determining component 318 for determining that device 106 is within proximity of one or more femto nodes.

According to an example, communications component 306 can receive a beacon 104 from femto node 102 over a frequency used for receiving signals from macrocell base station 110 and/or other base stations in CN 122. For example, this can be in response to hand-in component 314 determining to measure signals over the frequency for hand-in in a period of time reserved or otherwise indicated by macrocell base station 110 for performing such signal measurements (e.g., based on a RRC measurement control message). Pilot measuring component 312 can perform the measurements, including measurement of beacon 104, which can emulate downlink transmissions of macrocell base station 110 or similar base stations in CN 122, and hand-in component 314 can report the measurements to RNC 120 via macrocell base station 110 (e.g., in a hand-in related measurement report). In this example, RNC 120 and/or femto gateway 124 can identify femto node 102 and/or other femto nodes based on information provided in the measurement report and/or one or more other parameters requested from device 106 (e.g., in a RRC measurement report message). In this example, RNC 120 can communicate handover messages to femto node 102 (e.g., through femto gateway 124 or otherwise), and can command device 106 to perform an inter-frequency hand-in to femto node 102 based on determining an operating frequency thereof. Hand-in component 314 can receive the command, in this example, and can tune communications component 306 to communicate with femto node 102 over the operating frequency thereof.

In another example, where device 106 supports inter-frequency hand-in, pilot measuring component 312 can measure the beacon 104 for use with proximity detection. In this example, proximity determining component 318 can determine proximity to femto node 102, and parameter communicating component 316 can signal the proximity to RNC 120. For example, proximity determining component 318 can determine the proximity based on at least one of recognizing the beacon 104, determining whether the femto node 102 is accessible by the device 106 based on an identifier in the beacon 104 (e.g., whether a CSG identifier advertised in the beacon 104 is in a whitelist of the device 106, whether the femto node 102 provide hybrid access mode), determining a location of the device and a known location of the femto node 102 (e.g., received in a network configuration or otherwise), and/or the like. For example, proximity determining component 318 can determine location of the device 106 using global positioning system (GPS), observed time difference of arrival (OTDOA) based on locations of other base stations and signals received therefrom, etc. In another example, proximity determining component 318 can recognize a cell identity of macrocell base station 110 upon communicating therewith, which can indicate proximity to femto node 102 according to one or more mappings configured in device 106. For example, the mappings can associate macrocell base stations with nearby femto nodes, and can be received from RNC 120, one or more components of CN 122, etc. The mappings can be provided to the device by RNC 120, one or more components of CN 122, based on a hardcoding or other configuration stored in device 106, etc.

While in proximity, parameter communicating component 316 can notify RNC 120 of the proximity, and RNC 120 can configure device 106 with one or more measurement configuration parameters (e.g., and/or can otherwise grant measurement gaps thereto for communicating with femto node 102). If pilot measuring component 312 is unable to detect a pilot or other signals from femto node 102, within a period of time, parameter communicating component 316 can indicate to RNC 120 that device 106 is no longer within proximity of the femto node 102, and the RNC 120 can deconfigure the one or more measurement configuration parameters. For example, this can include indicating that the device 106 is no longer granted the measurement gaps. In this regard, RNC 120 can grant measurement gaps to device 106 when in proximity of a femto node to conserve bandwidth.

In another example, as described, RNC 120 can configure device 106 to perform measurement reports when quality of a source base station drops below a threshold level, which can be based on one or more events (e.g., event 1f, 2b, 2d, etc. in WCDMA). Hand-in component 314 can receive such a configuration, and can accordingly trigger a measurement report where pilot measuring component 312 detects that the quality of a pilot from macrocell base station 110 falls below a threshold level. This can be based on performing a signal-to-noise ratio (SNR) or similar measurement of the pilot or of other signals from macrocell base station 110 received by communications component 306, and/or the like.

In addition, for example, macrocell base station 110 can configure device 106 to report one or more other parameters, such as a PSC, chip-level timing information, layer-2 information (e.g., SFN/CFN), cell or CSG identity, membership information, timing difference with respect to macrocell base station 110, etc. when communicating a measurement report. In this example, parameter communicating component 316 can receive such a configuration request, and can accordingly determine or measure the one or more requested parameters upon hand-in component 314 determining to generate a measurement report. For example, parameter communicating component 316 can determine the one or more parameters from the beacon 104, from system information (e.g., SIB) of the femto node 102, etc. In an example, parameter communicating component 316 can read SIBs or other signals of the femto node 102 from the beacon 104 on the macrocell base station 110 frequency, without need for measurement gaps. It is to be appreciated, however, that parameter communicating component 316 can read SIBs or other signals from femto node 102 during one or more compressed mode or other periods where device 106 can tune away from the macrocell base station 110 frequency to communicate with femto node 102 on the operating frequency thereof in other examples. Thus, in one example, device 106 can determine a PSC of the beacon 104 and a PSC used by femto node 102 for transmitting pilot signals on the operating frequency.

It is to be appreciated, as described further herein, that parameter communicating component 316 can communicate the additional parameters along with or following the measurement report (e.g., in a RRC measurement report message or similar message). Such parameters can be used to disambiguate the beacon 104 from other beacons, as described above and further herein. For example, parameter communicating component 316 can specify one or more parameters for determining an OTD between macrocell base station 110 and femto node 102, one or more determined PSCs or frequencies of the femto node 102, CSG subscription information, whether access is allowed to the femto node 102, a measured subframe or frame timing or timing offset of the femto node 102 or other base stations in an active set, and/or the like. For example, the one or more parameters for determining the OTD between macrocell base station 110 and femto node 102 can include a timing offset, a time at which a signal is received from each of the macrocell base station 110 and femto node 102, etc.

For example, RNC 120 can configure device 106 to report a PSC used by femto node 102 upon detection thereof. For example, this can include RNC 120 transmitting a RRC measurement control message or similar message to device 106, which can include a list of PSCs corresponding to CSGs communicating on the operating frequency of macrocell base station 110 (and can in one example include a PSC utilized for communicating beacon 104, as described). In this example, parameter communicating component 316 can receive the configuration or request for PSCs. Pilot measuring component 312 can measure beacon 104 received over an operating frequency of macrocell base station 110, and can determine a PSC related to beacon 104 is in the list received in the RRC measurement control message. As described, pilot measuring component 312 can determine the PSC as that utilized to scramble beacon 104, or other information from system information related to the beacon 104, etc.

In this example, hand-in component 314 can generate a RRC measurement report message that includes a measurement of the beacon 104 (e.g., a measured SNR), and in one example, parameter communicating component 316 can include the PSC or other measured parameters in the measurement report as well. Hand-in component 314 can communicate the RRC measurement report message to RNC 120. In another example, parameter communicating component 316 can transmit the PSC to the RNC 120 in the RRC measurement report message. RNC 120, femto gateway 124, and/or one or more components of CN 122 can utilize at least the PSC to disambiguate the beacon 104 for associating with femto node 102. For example, a cell identifier, difference in observed timing, etc., of the femto node 102 can additionally or alternatively be used to disambiguate the femto node 102 corresponding to beacon 104.

In one example, femto node 102 can operate intra-frequency with macrocell base station 110. In this example, parameter communicating component 316 can read SIB from femto node 102 to determine one or more parameters thereof before being triggered by RNC 120 or based on proximity. In this example, parameter communicating component 316 can obtain a CSG identifier of femto node 102, which proximity determining component 318 can further utilize to determine whether device 106 is within proximity of femto node 102. For example, if femto node 102 advertises a CSG identifier that is not in a whitelist of device 106, parameter communicating component 316 need not notify of proximity to the femto node 102. If so, parameter communicating component 316 can indicate the proximity, and RNC 120 can trigger intra-frequency hand-in to femto node 102. For example, parameter communicating component 316 can prioritize reading of SIB of multiple femto nodes based at least in part on a cell individual offset and/or power level thereof.

Once a femto node 102 is detected for hand-in, hand-in component 314 can perform WCDMA system information acquisition, in one example, at least in part by at least one of decoding P-CCPCH time transmit intervals (TTI) until SIB3 is detected, decoding SFN, MIB, then SIB3 (e.g., possibly with multiple attempts), and/or continuously decoding P-CCPCH TTIs until MIB and/or SIB1 and/or SIB2 is detected followed by SIB3 at the scheduling interval. Hand-in component 314 can report one or more parameters of at least SIB3 information (e.g., in a measurement report or other message), as described, to RNC 120 for providing to femto node 102 (and/or femto gateway 124) to construct a hand-in command. In this example, hand-in component 314 can receive a hand-in command from the femto node 102 via RNC 120 and/or other components.

Figure 4:
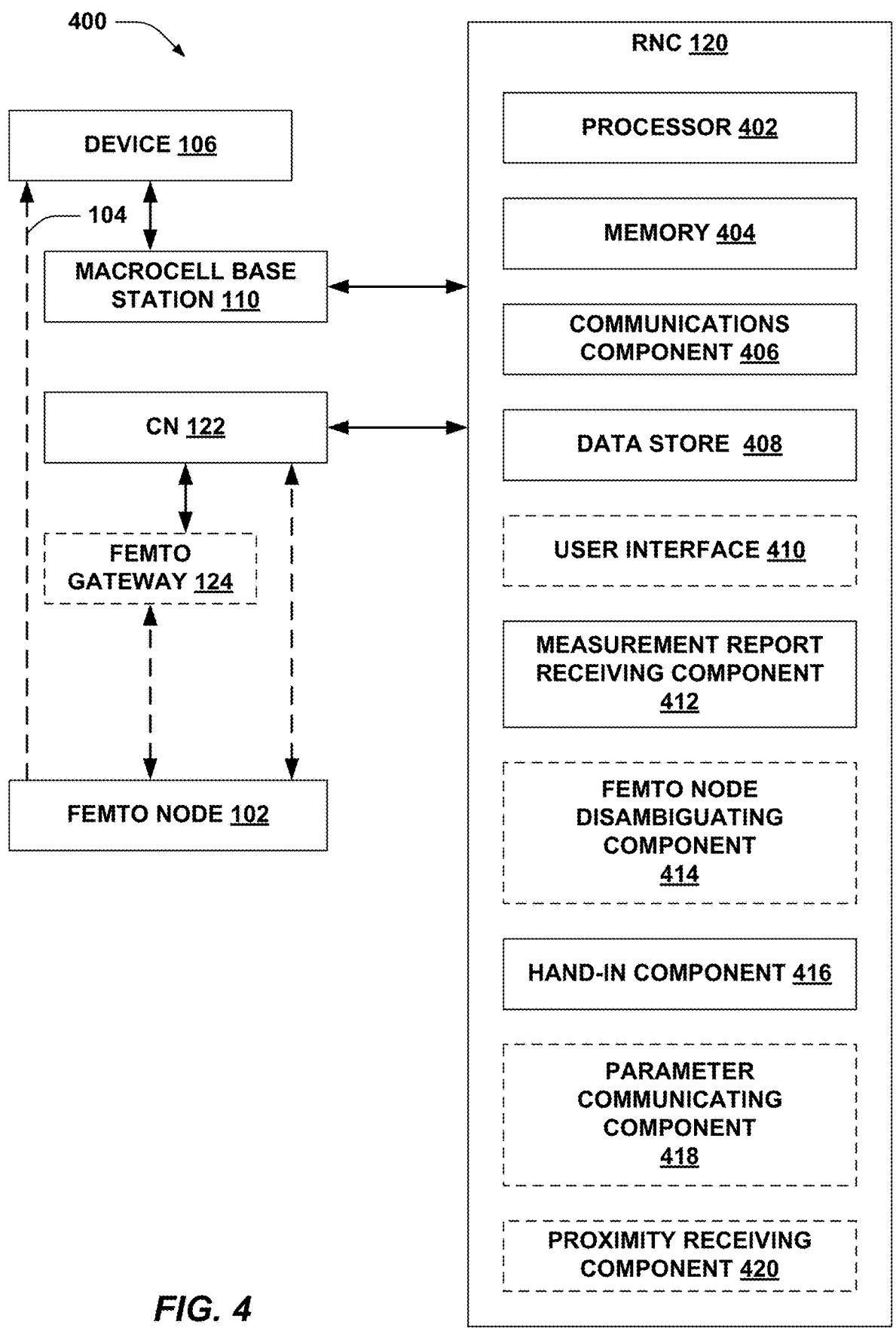
FIG. 4 is a block diagram of an example system for determining a femto node to which to transmit a handover request message.

Referring to FIG. 4, a wireless communication system 400 is illustrated for causing a device to perform active hand-in to a femto node. System 400 includes a femto node 102 that can communicate one or more beacons 104 for causing one or more devices, such as device 106 to hand-in communications to the femto node 102. Device 106 can communicate with macrocell base station 110 that provides access to a CN 122 (e.g., via RNC 120). System 400 can also optionally include a femto gateway 124 that manages one or more parameters of the femto node 102 and one or more other femto nodes (not shown). RNC 120 can include a processor 402, which can be similar to processor 202, a memory 404, which can be similar to memory 204 a communications component 406, which can be similar to communications component 206 provided for establishing and maintaining communications with one or more other components of system 400, such as macrocell base station 110, CN 122, and/or the like, a data store 408, which can be similar to data store 208, and/or an optional user interface component 410, which can be similar to user interface component 210.

Additionally, RNC 120 can include a measurement report receiving component 412 for obtaining a measurement report from device related to hand-in, an optional femto node disambiguating component 414 for identifying or at least assisting in identifying a femto node in the measurement report, and a hand-in component 416 for performing hand-in of the device to one or more femto nodes or other base stations. RNC 120 can optionally include a parameter communicating component 418 for receiving additional parameters from the device for identifying the femto node, and/or a proximity receiving component 420 for obtaining an indication that the device is within proximity of the one or more femto nodes.

According to an example, hand-in component 416 can configure device 106 to report pilot measurements of one or more beacons upon detecting that device 106 is within a threshold proximity of a base station or femto node corresponding to the one or more beacons (e.g., by communicating a corresponding RRC measurement control message thereto). Thus, for example, device 106 can receive beacon 104 from femto node 102 over the operating frequency of macrocell base station 110, measure a pilot signal in the beacon 104, and transmit a measurement report with the measurement and/or one or more other parameters to RNC 120 (e.g., in a RRC measurement report message), as described, based on determining device 106 is within a threshold proximity to femto node 102. For example, this can be based on a quality (e.g., SNR) of the beacon 104. In this example, measurement report receiving component 412 can obtain the measurement report from device 106, and hand-in component 416 can configure one or more measurement configuration parameters for device 106 to allow device 106 to switch frequencies during one or more periods to communicate with femto node 102 (e.g., to perform system information readings of femto node 102). For example, such parameters can include one or more compressed mode parameters specifying at least one or more time intervals during which the device 106 can measure other base stations or femto nodes. In a similar example, hand-in component 416 can configure device 106 to report a proximity indication instead of a measurement report, and can similarly configure compressed mode based on receiving the proximity indication.

In another example, parameter communicating component 418 can configure device 106 to report other parameters related to measured base stations, such as PSC (e.g., used for beacon 104 or one or more measured pilot signals), layer-2 information, such as SFN/CFN, cell or CSG identity, membership information, observed timing difference with respect to macrocell base station 110, and/or the like. In this example, as described, device 106 can receive the configuration, and can accordingly report the one or more parameters along with or subsequent to the measurement report. It is to be appreciated, in one example, that the parameters can be measured by the device 106 based on reading system information of the femto node 102. In either case, parameter communicating component 418 can obtain the one or more parameters, and femto node disambiguating component 414 can utilize the one or more parameters in identifying femto node 102, and/or allowing femto gateway 124 to identify femto node 102, based on the information collected and reported by device 106 from beacon 104. In another example, the parameters can be provided to the femto gateway 124 to identify femto node 102, as described herein.

In one example, device 106 can communicate a cell identity of femto node 102 (e.g., as advertised in beacon 104 or otherwise) to RNC 120 along with a measurement report including signal measurements of femto node 102 (e.g., in a RRC measurement report message). In this example, measurement report receiving component 412 can receive the measurement report and parameter communicating component 418 can receive or otherwise determine the cell identity communicated by device 106. Hand-in component 416 can determine to hand-in device 106 to femto node 102 based on measurements thereof in the measurement report, and can include the cell identity in one or more handover messages to CN 122 and/or femto gateway 124 (e.g., in a RANAP relocation required message). In this regard, one or more components of CN 122 and/or femto gateway 124 can disambiguate the femto node 102, and can communicate the handover messages thereto to facilitate hand-in of device 106 thereto. In another example, parameter communicating component 418 can specify other parameters in the RANAP relocation required message, as described in more detail below, such as an identifier of the source base station of device 106 (e.g., macrocell base station 110), a timing difference, etc. for facilitating femto node disambiguation.

In another example, a PSC of beacon 104 can be mapped to a cell identity of femto node 102, and such a mapping can be received and/or stored by femto node disambiguating component 414. For example, femto node disambiguating component 414 can obtain one or more mappings from one or more components of CN 122, femto gateway 124 that can assign the PSCs, femto node 102, and/or other components. Thus, device 106 can determine and communicate a PSC of beacon 104, as described, parameter communicating component 418 can obtain the PSC from device 106, and femto node disambiguating component 414 can identify femto node 102 using the obtained PSC (e.g., based on the mapping). In another example, parameter communicating component 418 can obtain a PSC of a pilot signal of femto node 102 from device 106. In this example, the PSC of beacon 104 in combination with the PSC of the pilot signal can be used in the mapping to determine a cell identity. For example, the combination can be a Cartesian product of the PSCs, and/or the like. In another example, hand-in component 416 can communicate one or more parameters, such as the one or more PSCs, other parameters received from the device 106 (e.g., timing or timing difference measurement of the femto node 102, etc.) to femto gateway 124 or CN 122 component for determining the cell identifier based on the mapping.

Moreover, in an example, femto node 102 can transmit multiple beacons using multiple PSCs that can be used to disambiguate femto node 102 from other femto nodes. In one example, femto node 102 can transmit multiple beacons using alternating PSCs over beacon transmission opportunities. In this example, femto node disambiguating component 414 can store a NCL of neighboring base stations, femto nodes, etc., or related cells, which can include a PSC of a beacon thereof. Upon receiving a measurement report from device 106 that includes a PSC of a femto node, such as femto node 102, femto node disambiguating component 414 can update the NCL to include a second PSC used by femto node 102. Upon receiving a subsequent measurement report from device 106, femto node disambiguating component 414 can determine whether a PSC matches the second PSC, and can determine to initiate hand-in of device 106 to femto node 102.

In yet another example, parameter communicating component 418 can obtain a measurement report message from the device 106 corresponding to the femto node 102 in a handover message to CN 122 or femto gateway 124. CN 122 or femto gateway 124 can use the measurement report message to similarly attempt to identify femto node 102 based on information regarding the respective beacon 104. In any case, hand-in component 416 can receive an operating frequency of femto node 102 (e.g., and/or a PSC utilized by femto node 102 over the operating frequency), and can accordingly prepare the device 106 for hand-in to the femto node 102 (e.g., by causing device 106 to tune its receiver to the operating frequency for signals using the PSC).

Hand-in component 416 can preserve resources allocated to device 106 for a period of time, in one example, to allow device 106 to revert back to communicating with RNC 120 where hand-in fails. In one example, preparation of the femto node 102 to receive hand-in of the device 106 may fail or otherwise not complete properly, which can cause failure in hand-in of device 106. Thus, until RNC 120 determines device 106 is properly handed-in to femto node 102 and/or until another event or specified period of time, hand-in component 416 can retain resources assigned to device 106 for communicating with RNC 120. This can include retaining radio resources for device 106, retaining resources on CN 122 related to device 106 communications, etc.

In an example, device 106 can indicate proximity to femto node 102 to RNC 120. In this example, proximity receiving component 420 can obtain the indication, and hand-in component 416 can configure one or more measurement configuration parameters for device 106 to allow device 106 to measure femto node 102 during a time period (e.g., in compressed mode). In a similar example, device 106 can indicate leaving proximity of femto node 102 to RNC 120, in which case hand-in component 416 can deconfigure the one or more measurement configuration parameters (e.g., to cease using compressed mode), which can conserve radio resources.

Figure 5:
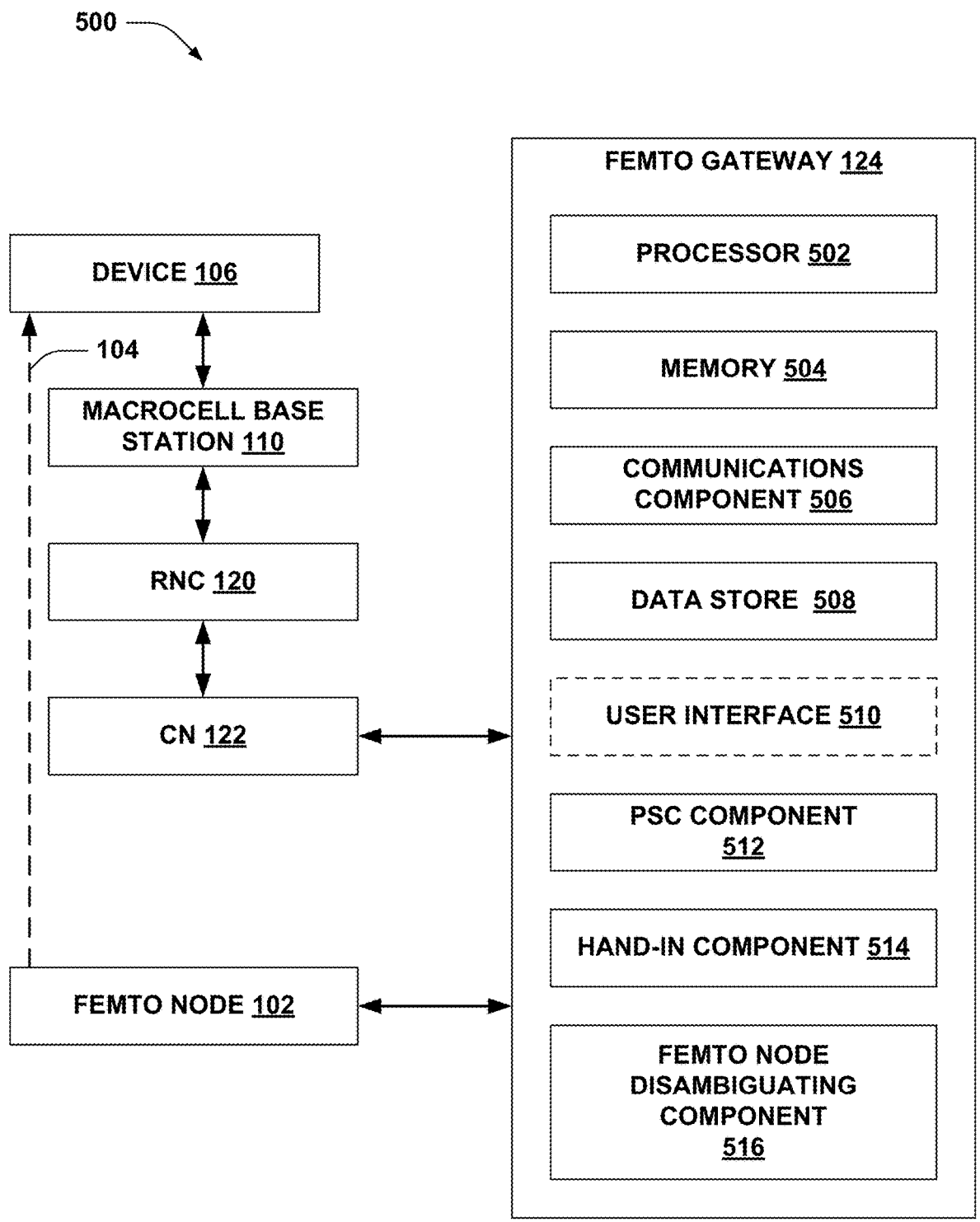
FIG. 5 is a block diagram of an example system for disambiguating a femto node to receive a handover request message.

Turning to FIG. 5, a wireless communication system 500 is illustrated for causing a device to perform active hand-in to a femto node. System 500 includes a femto node 102 that can communicate one or more beacons 104 for causing one or more devices, such as device 106 to hand-in communications to the femto node 102. Device 106 can communicate with macrocell base station 110 that provides access to a CN 122 (e.g., via RNC 120). System 500 also includes a femto gateway 124 that manages one or more parameters of the femto node 102 and one or more other femto nodes (not shown). Femto gateway 124 can include a processor 502, which can be similar to processor 202, a memory 504, which can be similar to memory 204 a communications component 506, which can be similar to communications component 206 provided for establishing and maintaining communications with one or more other components of system 500, such as femto node 102, CN 122, and/or the like, a data store 508, which can be similar to data store 208, and/or an optional user interface component 510, which can be similar to user interface component 210.

Additionally, femto gateway 124 can include a PSC component 512 for managing one or more PSCs and/or other parameters (e.g., chip-level timing, frame timing, transmit/receive timing, cell identity, etc., as described above) of one or more femto nodes, a hand-in component 514 for facilitating hand-in of a device to the identified femto node, and a femto node disambiguating component 516 for identifying a femto node based on one or more PSCs or other identifiers.

According to an example, hand-in component 514 can obtain a handover message from RNC 120 via CN 122 that identifies one or more parameters of a femto node 102 to which device 106 is to be handed-in. For example, the handover message can include an identifier of the femto node 102, which can be a cell identifier, a PSC of a transmitted beacon 104, a PSC of a pilot signal transmitted by femto node 102, a CSG identifier, etc., as described. Moreover, the handover message can include other parameters regarding the femto node 102, such as layer-2 information, timing information, and/or the like. The handover message can include a RANAP relocation request or similar message. Femto node disambiguating component 516 can identify the femto node 102 based on the identifier or other parameters, as described, and hand-in component 514 can forward the handover message or a different handover message (e.g., RANAP relocation response message) thereto to facilitate hand-in of device 106. In this example, as described, femto node 102 can prepare a command to switch device 106 to an operating frequency of femto node 102, and can provide the command to femto gateway 124 for communicating to RNC 120.

In one example, PSC component 512 can assign or otherwise receive an indication of at least one PSC utilized by femto node 102 to transmit a beacon 104. Thus, PSC component 512 can store a mapping of PSC to cell identifier such that femto node disambiguating component 516 can subsequently identify femto node 102 based on a PSC reported for beacon 104. In another example PSC component 512 can assign or otherwise receive an indication of a PSC used by femto node 102 for transmitting a pilot signal in an operating frequency of femto node 102. Thus, PSC component 512 can store a cell identity that corresponds to a combination of the PSCs (e.g., a Cartesian product thereof) for subsequently identifying femto node 102 based on reported PSCs. Moreover, PSC component 512 can store other observed or received information regarding femto node 102 and/or other femto nodes, such as chip-level timing, frame timing, transmit/receive timing, subframe offset, cell identifiers, etc. In one example, PSC component 512 can communicate such mappings to one or more other nodes, such as RNC 120 for disambiguating femto nodes from reported PSCs or other parameters.

Where the identifier received in the handover message (e.g., the identifier and/or other information reported by the device 106) does not uniquely match a femto node, femto node disambiguating component 516 can utilize additional information to identify a femto node to which device 106 is to be handed-in. In one example, as described above and further herein, femto node disambiguating component 516 can apply one or more filters to disambiguate the target femto node identified by device 106. For example, femto node disambiguating component 516 can apply a source filter to identify macrocell base station 110, a related cell, RNC 120, etc. This allows the femto node disambiguating component 516 to narrow the target femto node down to one or more femto nodes that is within a threshold distance of RNC 120, for example. Other filters can include an OTD filter that compares timing difference related to one or more femto nodes to that reported by the device 106, a PSC filter that compares a PSC and operating frequency of one or more femto nodes to that reported by device 106 (e.g., in a measurement report or other reporting message), an access control filter that identifies whether the device 106 can access one or more femto nodes (e.g., where one or more of the femto nodes correlate to a restricted association, such as a closed subscriber group (CSG)), a UL RSSI filter that determines whether a noise rise experienced by one or more femto nodes (if any) corresponds to a presence of a device, an active hand-in eligibility filter that determines whether one or more femto nodes are able to accept hand-in of device 106, a timing filter that compares a timing of one or more femto nodes to that reported by the device 106, and/or the like. Where femto node disambiguating component 516 identifies a target femto node, such as femto node 102, hand-in component 514 can prepare the target femto node to receive hand-in of device 106.

Moreover, for example, femto node disambiguating component 516 can perform functions similar to femto node disambiguating component 218 described above to determine a target femto node. For example, femto node 102 can transmit a plurality of beacons 104 using different PSCs. This can include transmitting the beacons in a single transmission opportunity or varying the PSC across transmission opportunities. In either case, PSC component 512 can receive or otherwise provide the PSCs utilized by femto node 102 such that femto node disambiguating component 516 can determine whether femto node 102 is the target femto node based on PSCs received in one or more handover messages from RNC 120.

If femto node disambiguating component 516 cannot determine a single femto node 102 (or otherwise does not so determine), hand-in component 514 can communicate the handover message to multiple femto nodes, such as femto node 102, which can accept or deny the hand-in. In the instance of multiple accepting femto nodes, hand-in component 514 can communicate related handover commands to macrocell base station 110, which can further attempt to select a femto node 102 based on other information available (e.g., uplink RSSI as measured against coverage information for the femto nodes, signal timing, etc.), as described.

Hand-in component 514 can simultaneously or successively prepare the multiple femto nodes for hand-in of device 106. In an example, hand-in component 514 can specify or assume (e.g., based on a preconfiguration, design decision, or other hardcoding, one or more configured parameters, etc.) simultaneous preparation of the femto nodes 102, which can cause the femto nodes to establish the same radio resources for device 106, which can include one or more radio bearers. Thus, hand-in component 514 can forward a handover message, such as RANAP relocation request acknowledged or similar message, to the CN 122 for communicating to the device via RNC 120 that specifies the resources. In this example, device 106 can connect to one of the femto nodes over the resources. In one example, hand-in component 514 can specify the common resources to the femto nodes and/or the femto nodes can know the common resources (e.g., and can keep the resources available at least in part by reconfiguring devices following connection to the femto node). In another example, one or more femto nodes can select from a set of common resources reserved for such purposes, and indicate the selection to femto gateway 124. Hand-in component 514 can then indicate the selected resources to the other femto nodes.

In another example, hand-in component 514 can perform successive preparation of the multiple femto nodes. For example, hand-in component 514 can prepare a first femto node, and cause device 106 to attempt hand-in. If hand-in fails, which can be indicated by the RNC 120 via CN 122, hand-in component 514 can prepare a next femto node, and cause device 106 to attempt hand-in thereto, and so on.

In an example, if femto node disambiguating component 516 detects that one or more femto nodes are not disambiguated more than a threshold number of times in a time period, PSC component 512 can request that one or more of the femto nodes reconfigure one or more aspects of a transmitted beacon, such as PSC, timing, and/or the like. In one example, PSC component can specify a PSC, timing, etc., a list of PSCs, timings, etc. from which the femto node 102 can select, and/or the like. For example, PSC component 512 can select one or more PSCs, timings, etc. that are not frequently received from device 106.

Figure 6:
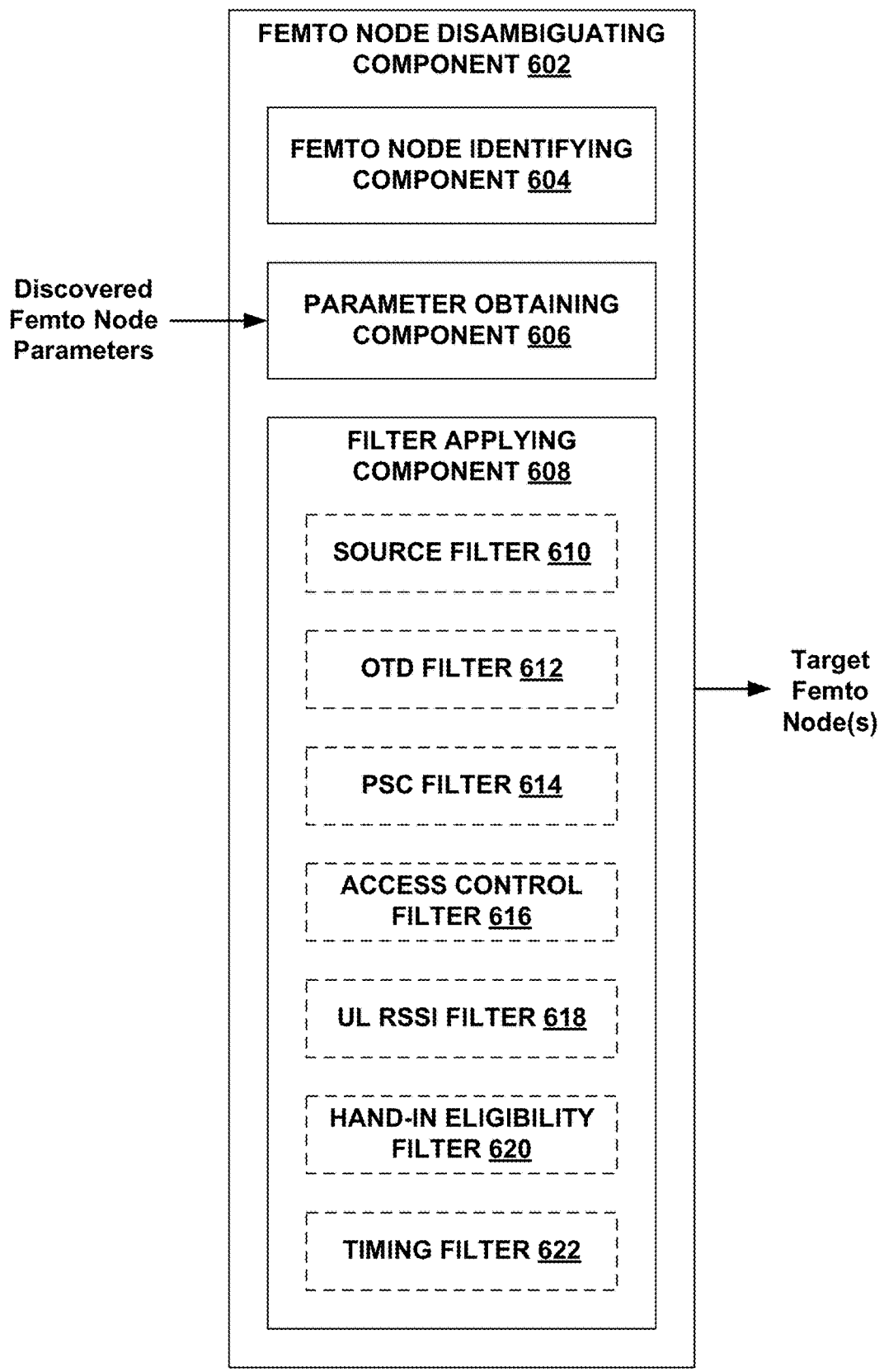
FIG. 6 is a block diagram of an example system for disambiguating a femto node as a target femto node intended by a device.

FIG. 6 depicts an example femto node disambiguating component 602 in accordance with one or more aspects described herein. For example, femto node disambiguating components 218, 414, and/or 516 can include components of femto node disambiguating component 602, as described herein, to facilitate providing at least some functionalities described in connection therewith. Femto node disambiguating component 602 can include a femto node identifying component 604 for determining one or more femto nodes (not shown) to which femto node disambiguating component 602 provides access and/or related static or semi-static parameters thereof, a parameter obtaining component 606 for receiving one or more parameters related to discovered femto nodes, and a filter applying component 608 for applying one or more filters to the femto nodes identified by femto node identifying component 604 based on the one or more parameters to determine one or more possible target femto nodes and/or whether a femto node that utilizes the femto node disambiguating component 602 is a target femto node.

For example, where femto node disambiguating component 602 is present within a femto gateway, femto node identifying component 604 can produce a list of femto nodes related to the femto gateway along with static or semi-static parameters related thereto, such as one or more PSCs utilized by the femto nodes in transmitting a beacon, a timing utilized, a timing difference with one or more reference timing sources, and/or the like. Where femto node disambiguating component 602 is present within a femto node, femto node identifying component 604 can produce the one or more static or semi-static parameters related to the femto node. In either case, parameters regarding an intended femto node can be received by parameter obtaining component 606. The parameters can be discovered parameters, such as a PSC of a beacon transmitted by the femto node, a timing of the femto node, or one or more other parameters, which can be specified by a device and received from a core network in a handover message, received from the core network in one or more other messages, etc. Where the PSC is not sufficient to identify a target femto node (e.g., more than one femto node can use the PSC), as described, femto node disambiguating component 602 can apply one or more of filters or other mechanisms described herein to attempt to disambiguate the target femto node.

In one example, parameter obtaining component 606 can obtain an identification of a source base station related to a device (e.g., in a RANAP relocation request or required message), and filter applying component 608 can apply a source filter 610 based on the source base station of the device to determine one or more possible target femto nodes within a threshold vicinity of the source base station. For example, source filter 610 can compare known locations of the femto node(s) identified by femto node identifying component 604 (e.g., based on location parameters determined by femto node identifying component 604) to a known or determined location of the source base station in determining whether the femto node(s) are within the threshold vicinity. In one example, the location of the source base station can be received by parameter obtaining component 606 in one or more network configuration messages, such as a NCL or similar message, in a message from a femto node management system that is aware of the location of the femto nodes and surrounding base stations, etc. In another example, the location of the source base station can be inferred based in part on pathloss measurements to the source base station measured by and received from the femto node(s) (e.g., using an NLM).

In any case, femto nodes within the target vicinity of the source base station can be considered possible target femto nodes. In another example, where the femto node disambiguating component 602 is utilized by a femto node, femto node disambiguating component 602 can determine that the femto node is a possible target femto node based on determining it is within a threshold vicinity of the source base station. In one example, parameter obtaining component 606 can receive the source base station identity, or a function value from which the source base station identity can be derived, in a 28-bit cell identity information element (IE) of the RANAP relocation request message. For example, a RNC, upon receiving a handover message from the device can encode the identifier of the source base station and/or other information in the cell identity IE, as described. Thus, upon receiving the RANAP relocation request message, parameter obtaining component 606 can obtain the identifier from the cell identity IE for utilization by the source filter 610. In any case, the source filter 610 can output a list of the femto node(s) within the threshold vicinity of the source base station or can output an indication of whether a corresponding femto node is within the threshold vicinity.

In another example, filter applying component 608 can apply an OTD filter 612 to the femto nodes identified by femto node identifying component 604 (and/or a femto node utilizing the femto node disambiguating component 602) to determine one or more target femto nodes based on a reported OTD of signals from the femto node(s). The OTD filter 612 can facilitate determining whether an OTD of the femto nodes (or a specific femto node) with respect to a reference base station measured by the device correlates to an actual timing difference between the femto node(s) and the reference base station.

For example, the femto node employing femto node disambiguating component 602 can measure the OTD to the reference base station (e.g., using an NLM to measure the timing of the reference base station and determining difference between the measured timing and a timing of the femto node), which can be specified to the femto node identifying component 604 for subsequent OTD comparisons. In another example, the femto node can receive a timing difference from the femto gateway and ensure the femto node maintains the timing difference with the reference base station, and/or the like. In any case, OTD filter 612 can obtain the OTD measured by the femto node or that specified by the femto gateway (e.g., from femto node identifying component 604) for comparing to the reported OTD.

Similarly, in this example, parameter obtaining component 606 can obtain an identification of the reference base station, the reported OTD, and/or the like. As described, such parameters can be obtained from a RANAP relocation request message from a CN, which can have obtained the parameters from a RANAP relocation required message from a RNC 120, which can have obtained the parameters from the device in a measurement repot or other message, etc. Where the reported OTD for one or more femto nodes is the same or at least within a threshold of the timing difference maintained by OTD filter 612, OTD filter 612 can output identifications of the femto nodes and/or a determination of whether reported OTD is such that a specific femto node may be the target femto node.

In addition, femto node identifying component 604 can maintain the timing differences between one or more femto nodes and one or more surrounding base stations. For example, where femto node disambiguating component 602 is utilized by a femto gateway, the one or more femto nodes can report timing differences with respect to the one or more surrounding base stations to the femto gateway. Femto node identifying component 604 can store the timing differences corresponding to the one or more femto nodes. The timing differences can be at least one of measured by the femto node, provided by one or more devices communicating with the femto node (e.g., based on timing obtained from the one or more base stations as part of previously communicating therewith or otherwise), provided by a femto node management system (e.g., HNB management system (HMS)) that can determine the timing difference based on information received in the CN, and/or the like. The timing difference between a femto node and a base station can correlate to a difference in timing of one or more reference points in a communication system, such as a timing of a start of a frame or subframe.

Where the femto node disambiguating component 602 is utilized by a femto node, the femto node can discern timing differences with one or more base stations by receiving signals therefrom (e.g., via NLM), by obtaining the timing difference from one or more devices (e.g., from devices camped on the one or more base station and/or following a successful RANAP relocation procedure with the devices), etc., and femto node identifying component 604 can store the timing difference for use by the OTD filter 612. In addition, femto node identifying component 604 can apply updates to the timing difference based in part on receiving a timing difference as described above, and/or on one or more corrections or compensations (e.g., for timing difference drift described in further detail below, such as linear drift), based on an external timing source, such as GPS, and/or the like. Moreover, in this example, femto node identifying component 604 can provide the timing difference to a femto gateway and/or femto node management system.

In yet another example, filter applying component 608 can apply a PSC filter 614 to the femto nodes identified by femto node identifying component 604 (and/or a femto node utilizing the femto node disambiguating component 602) to determine one or more target femto nodes based on a reported PSC and/or a frequency of beacons or other signals from the femto node(s). For example, parameter obtaining component 606 can obtain the PSC and/or operating frequency reported by a device, and determine whether the reported PSC on the reported frequency matches a PSC on a frequency utilized by one or more femto nodes (or a specific femto node) to transmit a beacon or pilot signal. Where a match is determined, PSC filter 614 can output an identification of one or more femto nodes and/or a determination that a related femto node may be the target femto node.

Where the femto node disambiguating component 602 is utilized by a femto gateway, femto node identifying component 604 can store PSCs and/or frequencies utilized by the femto nodes to transmit beacons or pilot signals. In one example, the femto gateway can assign the PSCs and/or frequencies to the femto nodes (and/or cause the femto nodes to configure or reconfigure such, as described). Where the femto node disambiguating component 602 is utilized by a femto node, femto node identifying component 604 can store PSCs and/or frequencies utilized by the femto node to transmit a beacons or pilot signals. In one example, as described, the femto node(s) can transmit multiple beacons using different PSCs and/or frequencies, and thus, the PSC filter 614 can compare multiple reported PSCs and/or frequencies to determine possible target femto node(s).

In one example, the parameter obtaining component 606 can receive the PSC and/or frequency from a measurement report transmitted by the device or a related message comprising information thereof, such as a RANAP relocation request message. For example, the PSC and/or frequency can be specified in the target cell identity IE in a RANAP relocation message. In another example, parameter obtaining component 606 can infer the frequency based in part on a source base station indicated by the device (e.g., in a target cell identifier IE). For example, the frequency of the target femto node can be the same as that of the indicated source base station. In one example, parameter obtaining component 606 can know the frequency of the source base station based in part on receiving a NCL or one or more other messages from a CN or related component (e.g., a femto node management system), based in part on detecting the source base station via NLM, and/or the like. In yet another example, parameter obtaining component 606 can obtain the frequency from a measurement configuration message provided to the device that includes frequencies over which the device is to measure (e.g., an RRC measurement configuration message), from which a camping frequency of the device can be derived (e.g., by locating a possible operating frequency absent from the list).

In an example, filter applying component 608 can apply an access control filter 616 to the femto nodes identified by femto node identifying component 604 (and/or a femto node utilizing the femto node disambiguating component 602) to determine one or more target femto nodes based on whether the device can access the femto node(s). For example, access control filter 616 can determine whether the device is a member of a CSG or other restricted association advertised by the femto node(s). In one example, femto node identifying component 604 can store CSG identifiers or other restricted association information of the one or more femto nodes, and parameter obtaining component 606 can receive CSG subscription information related to a device, an indication of whether the device is a member of the CSG, and/or the like. Based on the received parameters, access control filter 616 can output one or more of the femto nodes to which the device has access and/or a determination of whether the device can access a specific femto node.

In another example, filter applying component 608 can apply a UL RSSI filter 618 to the femto nodes identified by femto node identifying component 604 (and/or a femto node utilizing the femto node disambiguating component 602) to determine one or more target femto nodes based on whether a change in UL RSSI at the femto node can be caused by presence of the device. For example, femto node identifying component 604 can store UL RSSI related to or reported by one or more femto nodes, which can be updated according to a time schedule or other events (e.g., a detected change in UL RSSI). In this example, parameter obtaining component 606 can obtain a handover message, and filter applying component 608 can apply the UL RSSI filter 618 based on receiving the handover message to determine one or more femto nodes having a rise in UL RSSI that may be associated with presence of the device (e.g., or whether a specific femto node has a corresponding rise in UL RSSI). For example, UL RSSI filter 618 can compare an average UL RSSI of the femto node(s) with a current UL RSSI to determine whether the difference satisfies a threshold. If so, UL RSSI filter 618 can output the femto node(s) as a possible target femto node, and/or output a determination as to whether a specific femto node is a possible target femto node, as described. Further, in an example, the threshold difference in UL RSSI can be based in part on a CIO of the femto node(s).

In another example, filter applying component 608 can apply a hand-in eligibility filter 620 to the femto nodes identified by femto node identifying component 604 (and/or a femto node utilizing the femto node disambiguating component 602) to determine one or more target femto nodes based on whether the femto node(s) are hand-in eligible. For example, some femto nodes may not allow hand-in from a macrocell base station, which can be configured by a femto gateway and/or one or more components of a CN. In one example, femto nodes eligible for hand-in from macrocell base stations may operate in a hybrid or open access mode, may transmit beacons, etc., while ineligible femto nodes may not. In any case, femto node identifying component 604 can obtain parameters regarding hand-in eligibility of femto nodes from a CN component, and thus hand-in eligibility, and the hand-in eligibility filter 620 can determine whether femto node(s) can be possible target femto nodes (and/or whether a specific femto node can be a target femto node) based on the parameters.

In another example, filter applying component 608 can apply a timing filter 622 to the femto nodes identified by femto node identifying component 604 (and/or a femto node utilizing the femto node disambiguating component 602) to determine one or more target femto nodes based on one or more timing parameters thereof. For example, the timing parameters can correspond to a computed transmit/receive timing difference reported by the device. In this example, femto node identifying component 604 can store timing parameters for signals received at one or more femto node(s) from one or more base stations and/or timing of signals transmitted by the one or more femto node(s). In this example, parameter obtaining component 606 can obtain a time, $T_m$, at which a signal is received from the one or more femto node(s) at the device (e.g., in a cell synchronisation information IE). Timing filter 622 can determine whether one or more femto node(s) are possible target femto nodes, and/or whether a specific femto node is a target femto node, where $\Delta spread_{SHO} > threshold_{spread}$. In this example, $\Delta spread_{SHO} = T_m - [T_{Rx@HNB-SFN} - T_{Tx,HNB-SFN}]$ mod 256 chips. $T_{Rx@HNB,MNB-SFN}$=timing of a source base station frame (e.g., primary common control physical channel (P-CCPCH)) as received at the femto node. $T_{Tx@HNB-SFN}$= timing of femto node frame (primary common control channel (P-CCCH)) as transmitted at the femto node.

In one example, femto node identifying component 604 can adjust the $threshold_{spread}$ for a given femto node based on hardcoded, configured, or measured timing of the source base station according to the device. According to one example, $threshold_{spread} = threshold_{SHO} + threshold_{propagation}$, where $threshold_{SHO} = \max_{\{i,k\}}(T_{Tx,SFN,macro\{i\}} - T_{Tx,SFN,macro\{k\}})$. In this example, i and k can be indexed over all macrocell base stations that the device has in an active set in a current session, and $T_{Tx,SFN,macro\{x\}}$ is the P-CCPCH timing of macrocell base station x. Moreover, $threshold_{propagation} = \max_j(macro_j \rightarrow UE$ propagation delay, where j is indexed over all macrocell base stations in the active set as well. Parameter obtaining component 606 can receive such parameters from one or more devices and can accordingly adjust the threshold for the one or more femto nodes, which femto node identifying component 604 can store for subsequent use.

Moreover, for example, timing filter 622 can output one or more femto nodes as possible target femto nodes, or indicate whether a specific femto node is a target femto node, based on determining whether a frame timing offset reported by a device correlates to a timing difference of the femto node(s). For example, the device can report a connection frame number (CFN) offset, subframe number (SFN) offset, and/or the like (e.g., in an OFF IE in a Cell synchronisation information IE), which can be received at parameter obtaining component 606. Timing filter 622 can output identifiers of possible target femto nodes, and/or a determination of whether a related femto node is a possible target femto node, where the frame number offset does not correspond to a SFN of the femto node, which can be stored in the femto node identifying component 604 as related to one or more femto node(s) subtracted from the SFN of a macrocell base station.

It is to be appreciated that filter applying component 608 can apply one or more of the foregoing filters to narrow the identified femto nodes to one or more possible target femto nodes. As described, the femto node(s) output by femto node disambiguating component 602 can be prepared to receive hand-in of the device. Moreover, as described, femto nodes and femto gateways can implement other disambiguation techniques (e.g., multiple PSCs, multiple preparation, etc.) that can be used in conjunction with the one or more filters to assist in determining a target femto node intended by the device.

Figure 7:
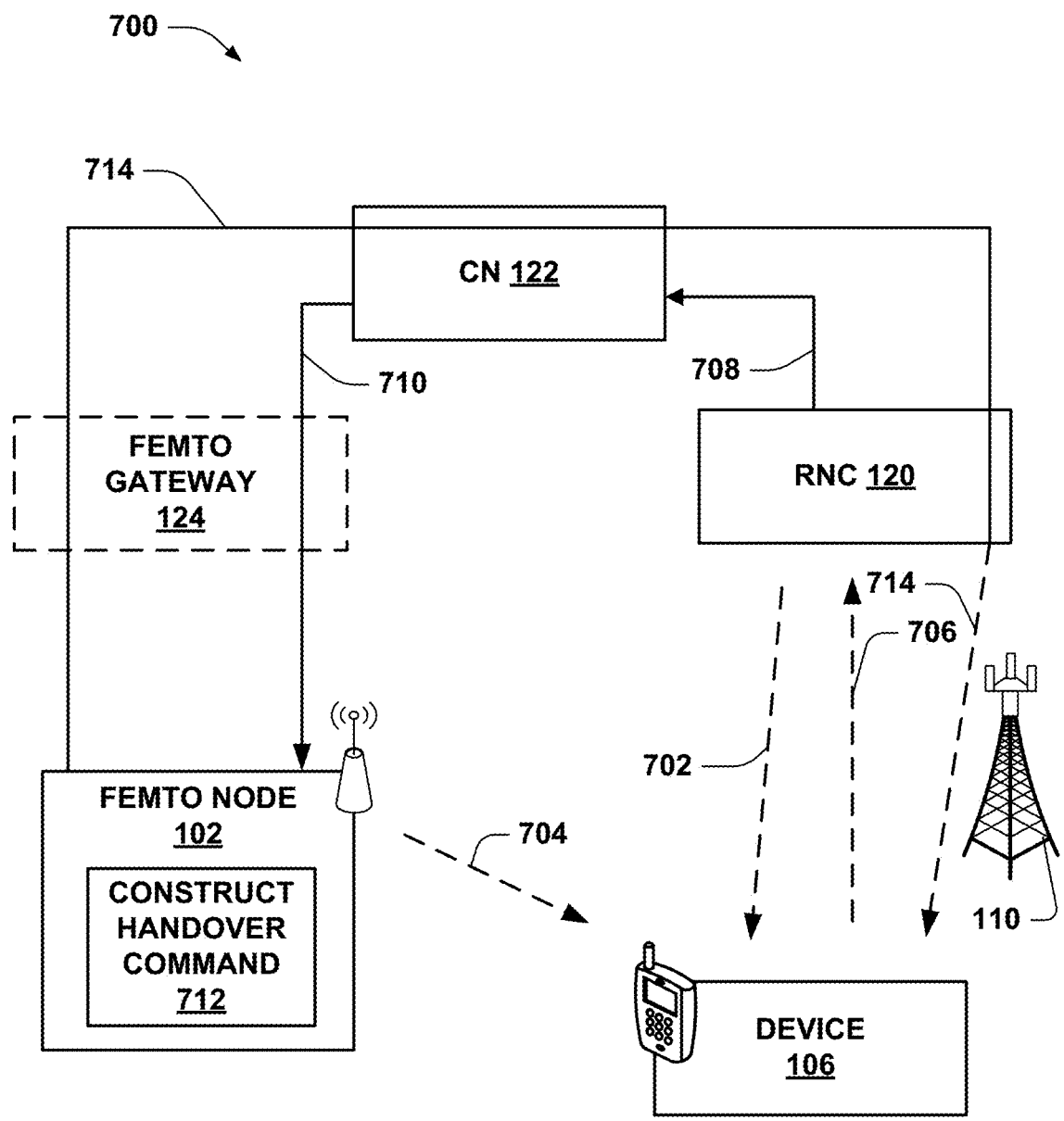
FIG. 7 is a block diagram of an example system for facilitating active hand-in of a device to a femto node for which a measured beacon is reported.

FIG. 7 illustrates an example system 700 for causing active hand-in signaling based on transmitting a beacon. System 700 includes a femto node 102, device 106, macrocell base station 110, RNC, 120, CN 122, and an optional femto gateway 124, which can communicate as described above.

In a specific example, (e.g., for devices that are pre-Release 9 of WCDMA), RNC 120 can transmit a RRC measurement control message 702 to device 106 to setup event 1a/1d for device 106 to report when encountering a PSC that may belong to a femto node, such as femto node 102. In one example, the RRC measurement control message 702 can indicate to device 106 to report a timing difference (e.g., based on SFN) between a measured femto node and one or more other base stations. Device 106 can then detect beacon 704 from femto node 102, which can be broadcast on the operating frequency of macrocell base station 110, as described. In one example, device 106 can determine femto node 102 is associated with a CSG in a list received from one or more components of CN 122. For example, device 106 can determine the CSG of femto node 102 based on determining a CSG from a PSC related to the beacon 704, a CSG identifier in the beacon 704, etc. Moreover, for example, device 106 can read a broadcast channel (BCCH) to decode a SFN.

Device 106 can generate a measurement report, which can include identifying information of femto node 102, such as a CSG identifier, PSC, etc., and/or a timing difference with respect to the macrocell base station 110 (e.g., based on SFN), for example. Device 106 can transmit the measurement report in a RRC measurement report message 706 to RNC 120 (e.g., via macrocell base station 110). In an example, an event 1a/1d can be triggered at the device 106 based on measurement of beacon 704, and device 106 can communicate the measurement report based on the event. RNC 120 can then transmit a RANAP relocation required message 708 to CN 122, which can include information received in the RRC measurement report message 706, such as PSC of the femto node 102 (e.g., or an identifier corresponding to the PSC), timing difference, etc.

In one example, RNC 120 can populate a cell identifier IE of the RANAP relocation required message with the PSC, or a value computed as a function thereof. In one specific function, fake-UC-Id can be a 28-bit integer with:

i) fake-UC-Id[28:17]=RNC-id of femto gateway 124 (12-bit, configured in RNC operation support system (OSS))

ii) fake-UC-Id[9:1]=g(PSC) (9-bit, configured in RNC OSS), where g is a one-to-one 9-bit function iii) fake-UC-Id[16:10]=0000000$_b$ In this regard, the fake-UC-Id used as the cell identifier in the RANAP relocation required message can be matched by femto gateway 124 against femto node 102 advertising characteristics encoded by the function. For example, the femto gateway 124 can match fake-UC-Id with the femto nodes whose beacons may have triggered (e.g., where the beacons include the PSC index at fake-UD-Id[9:1]).

Moreover, in one example, the RANAP relocation required message 708 can include at least a portion of the RRC measurement report message 706, which can allow femto node 102 to set an initial power for communicating with device 106 following hand-in. CN 122 can communicate a corresponding RANAP relocation request message 710 to femto node 102, optionally through femto gateway 124 which can determine femto node 102 based on information in the RANAP relocation request message 710, as described. For example, the RANAP relocation request message 710 can include parameters from the received RANAP relocation required message 708. In this example, femto node 102 can construct a handover command 712 based on the RANAP relocation request message 710, and can communicate the handover command 712 to RNC 120, as shown at 714, and back to device 106 to facilitate hand-in to femto node 102.

It is to be appreciated, as described, that femto node 102 can perform additional functions to determine whether to construct handover command 712 or to deny the RANAP relocation request from CN 122 (e.g., by sending a RANAP relocation failure or similar message). For example, upon receiving RANAP location request message 710, femto node 102 can determine whether device 106 is detected to determine whether femto node 102 is to be the target for hand-in. Where a RRC measurement report message is received in the RANAP relocation request message 710, femto node 102 can determine an OFF and timing measurement ($T_m$) reported in the cell synchronization information element of the RRC measurement report message reported for femto node 102 and/or RNC 120. For example, OFF=(SFN-CF-$N_{Tx}$) mod 256, where SFN-CFN is the observed time difference to macrocell base station 110 defined as OFF× 38400+$T_m$, and $T_m$=($T_{UETx}$-$T_0$)-$T_{RxSFN}$. For each pair of nodes for which the above is reported, femto node 102 can calculate $T_{RxSFN}$={(OFF$_{CELL1}$-OFF$_{CELL2}$)×38400+ ($T_{m,CELL1}$-$T_{m,CELL2}$)} mod (38400×256). If the computed $T_{RxSFN}$ is has a probability beyond a threshold of indicating femto node 102, in this example, femto node 102 can construct the handover command 712 to hand-in device 106 to femto node 102.

In WCDMA, a clock of femto node 102 and RNC 120 can drift apart by up to 1.34 chips per second. In addition, device 106 can receive signals from femto node 102 over multiple paths, which, in many cases, can result in delay of up to ±40 chips. Given a number of refreshes per hour performed by femto node 102 to synchronize timing, the following table displays uncertainty that a computed $T_{RxSFN}$ matches femto node 102, for example.

| Refresh rate (per hour) | Drift Uncertainty | Multi-path Uncertainty | Total Uncertainty | Discernable $\Delta T_{RxSFN}$ values (if only lower 8 bits of SFN are considered, otherwise multiply by 16) | Comments |
|---|---|---|---|---|---|
| 1 | 4825 | 40 | 4865 | 1010 | Hourly Updates |
| 2 | 2413 | 40 | 2453 | 2004 | |
| 3 | 1609 | 40 | 1649 | 2981 | |
| 4 | 1207 | 40 | 1247 | 3943 | |
| 5 | 965 | 40 | 1005 | 4888 | |
| 6 | 805 | 40 | 845 | 5819 | |
| 7 | 690 | 40 | 730 | 6735 | |
| 8 | 604 | 40 | 644 | 7636 | |
| 9 | 537 | 40 | 577 | 8523 | |
| 10 | 483 | 40 | 523 | 9397 | Updates every six minutes |
| 60 | 81 | 40 | 121 | 40598 | Updates every minute |

Thus, femto node 102 can determine whether it is the target based on the above table and whether a measured difference for $T_{RxSFN}$ is within the certainty based on the refresh rate. In another example, femto node 102 can communicate the $T_{RxSFN}$ (e.g., actual, expected, or uncertainty) to femto gateway 124 in the handover command so femto gateway 124 can determine whether femto node 102 is to be the target. If so, femto gateway 124 can forward the handover command to device 106 through the various nodes. If not, femto gateway 124 can determine if another femto node responds with similar values for determining a target femto node. In another example, where multiple handover commands are received, femto gateway 124 can select the femto node 102 with the highest probability of being the target based on a most desired value for $T_{RxSFN}$.

Moreover, for example, where device 106 measures beacon 704 during a compressed mode measurement gap along with a pilot from femto node 102 (e.g., which can be indicated in the RRC measurement report message 706 by device 106 and/or in the RANAP relocation required 708 from RNC 120), femto node 102 can match $T_m$ between the beacon 704 and pilot.

In another specific example, (e.g., for devices that are Release 9 of WCDMA), RNC 120 can configure device 106 to acquire intra-frequency system information during certain time intervals using a RRC measurement control message 702. As described, device 106 can thus detect beacon 704 and can transmit a proximity indication 706 to RNC 120 comprising a CSG identifier in beacon 704, a PSC, and/or the like. Regardless of whether proximity indication is performed, device 106, RNC 120, and CN 122 can utilize Release 9 intra-frequency procedures for hand-in, while femto node 102 uses inter-frequency procedures to cause device 106 to hand-in on the operating frequency of femto node 102 and not the frequency corresponding to beacon 704. Thus device 106 is not required to communicate in compressed mode to measure inter-frequency pilot signals of other femto nodes.

In addition, as described, femto node 102, RNC 120, and/or femto gateway 124 can be configured to disambiguate femto node 102 based in part on information received from device 106. In one example, femto node 102 and/or femto gateway 124 can apply one or more filters along with information received from the device 106 to determine whether femto node 102 is a possible target femto node. For example, the device 106 can indicate an identifier of macrocell base station 110 in a measurement report, which can be provided to CN 122, femto gateway 124, and/or femto node 102, as described. The identifier can be used with a source filter to determine whether femto node 102 is within a threshold vicinity of the macrocell base station 110 or other macrocell base stations (or related cells) that may be nearby, but not immediately neighboring femto node 102. In another example, device 106 can provide a measured timing difference between macrocell base station 110 and femto node 102, which can be used with an applied OTD filter to determine whether the maintained timing difference between the femto node 102 and macrocell base station 110 is similar to that reported by the device 106, and so on.

In other examples, femto node 102 can attempt to disambiguate itself from other femto nodes by transmitting multiple beacons 704 with different PSCs (e.g., as multiple beacons 704 in a given transmission opportunity, multiple beacons over different transmission opportunities that alternate PSCs, etc.). In either case, device 106 can report the PSCs in one or more measurement reports, as described above. Moreover, where femto gateway 124 determines that femto node 102 and at least another femto node (not shown) can be the target femto node intended by device 106, femto gateway 124 can prepare simultaneously or successively prepare the femto nodes for hand-in, as described above. Moreover, femto gateway 124 can cause one of the femto nodes to reconfigure one or more aspects of the beacon transmission to avoid future ambiguity. In addition, RNC 120 can hold resources granted to the device 106 until successful hand-in to allow device 106 to revert back to communicating with RNC 120 where hand-in fails.

In addition, combinations of the disambiguation aspects can be combined to provide enhanced disambiguation. In one example, femto node 102 and/or femto gateway 124 can apply a source and OTD filter to determine target femto nodes. In one example, this can include first determining one or more femto nodes related to a PSC specified in the RANAP relocation request message from CN 122. In any case, femto node 102 and/or femto gateway 124 can determine whether femto node 102 is a target femto node intended by device 106 based in part on determining whether femto node 102 is within a threshold vicinity of the indicated macrocell base station 110 and determining whether a timing difference between the femto node and macrocell base station 110 reported by the device is within a threshold timing difference maintained by femto node 102 or femto gateway 124. Additional filters can be applied as well, along with various other aspects, such as simultaneous preparation, femto node reconfiguration, ability to revert to macrocell base station 110, and/or the like.

In another example, femto node 102 can provide a CSG and operate in a closed access mode (e.g., providing access to member devices and not to non-member devices), while macrocell base station 110 can provide the ability to revert thereto upon hand-in failure. In this example, femto node 102 and/or femto gateway 124 can apply an access control filter and OTD filter in determining a target femto node, and/or can optionally apply a PSC filter, UL RSSI filter, hand-in eligibility filter, and/or the like. Thus, even where disambiguation results in selecting the femto node 102, though device 106 does not have access, the device 106 can revert to communicate with macrocell base station 110. In yet another example, femto node 102 can operate in a hybrid access mode, and can apply a source filter in determining the target femto node. In this example, femto node 102 and/or femto gateway 124 can optionally apply the OTD filer, PSC filter, access control filter, UL RSSI filter, and/or hand-in eligibility filter. Moreover, in this example, the femto gateway 124 can implement simultaneous preparation and femto node reconfiguration, while the macrocell base station 110 can provide the ability to revert. It is to be appreciated that the foregoing are some of substantially limitless configurations using the disambiguation aspects described herein.

Referring to FIGS. 8-16, example methodologies relating to facilitating active hand-in to femto nodes are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 8:
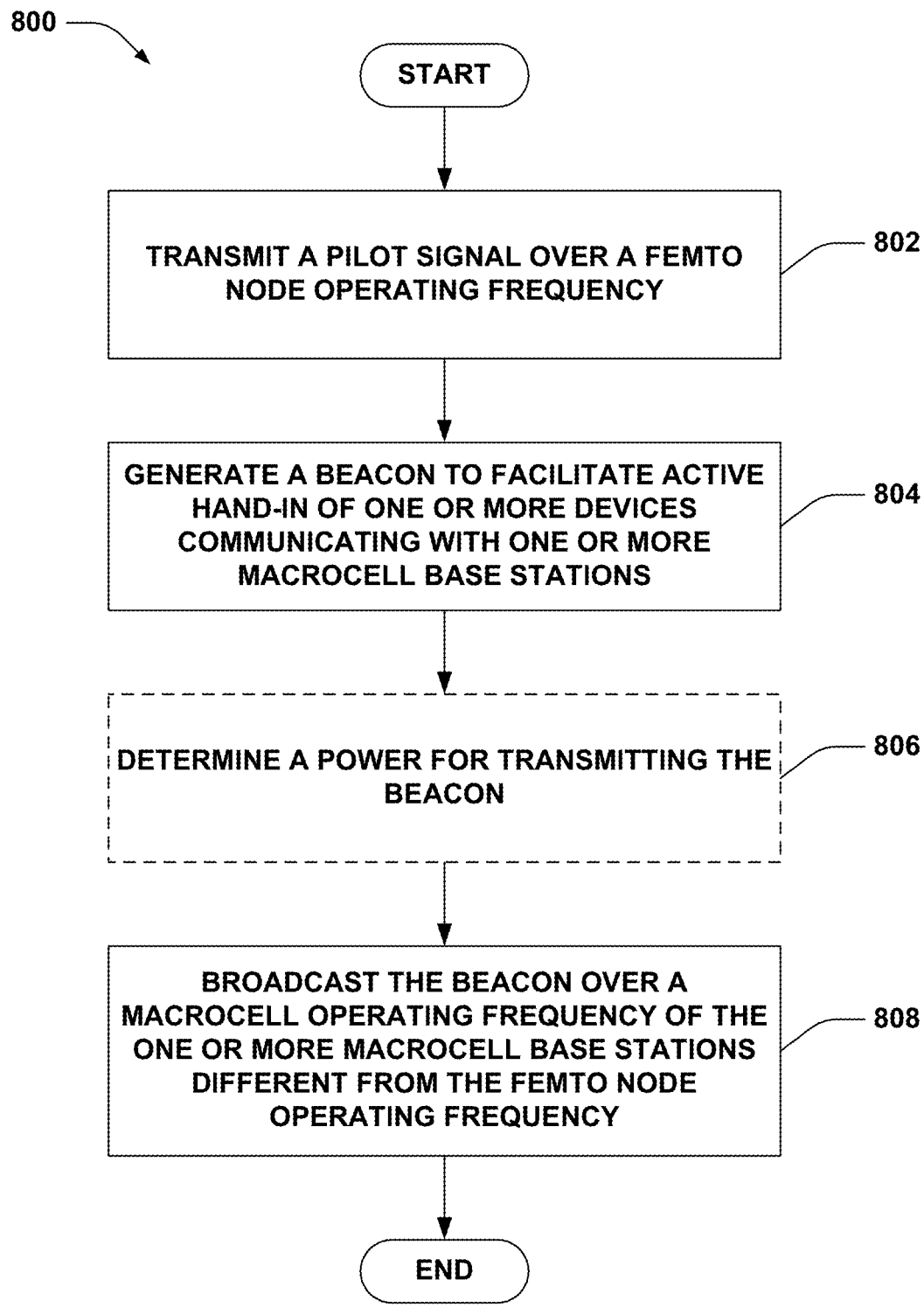
FIG. 8 is a flow chart of an aspect of an example methodology for generating a beacon for transmitting for a femto node over a macrocell operating frequency.

Referring to FIG. 8, an example methodology 800 is displayed that facilitates broadcasting a beacon to facilitate active hand-in. At 802, a pilot signal can be transmitted over a femto node operating frequency. For example, the pilot signal can include parameters for acquiring system access and/or identifying a source of the pilot signal. At 804, a beacon can be generated to facilitate active hand-in of one or more devices communicating with one or more macrocell base stations. For example, the beacon can be generated to emulate downlink transmissions by cells in a wireless network (e.g., including similar channels, etc.). In addition, in an example, the beacon can include a PSC to facilitate identifying a source of the beacon. The PSC can have been assigned by a femto gateway in one example to facilitate identifying the source of the beacon at the femto gateway or other wireless network components. Optionally, at 806, a power can be determined for transmitting the beacon. For example, the power can be an initial power, a maximum power, and/or a current power.

The power can be determined based on sensing presence or potential interference to one or more devices. For example, as described, this can be based on one or more parameters or measurements, such as a RSSI measured over the macrocell operating frequency (e.g., compared to a previous RSSI, compared to an RSSI of another frequency to detect hand-in of a device to the other frequency, and/or the like), a measured signal strength of one or more other base stations, and/or the like. At 808, the beacon can be broadcast over a macrocell operating frequency of the one or more macrocell base stations different from the femto node operating frequency. Thus, the beacon can facilitate active mode hand-in of one or more devices communicating with a macrocell over the macrocell operating frequency. Moreover, in an example, multiple beacons can be generated at 804, as described, using various PSCs over one or more frequencies. In this example, at 806, the power of one or more of the beacons can be determined or otherwise controlled to minimize interference to one or more devices.

Figure 9:
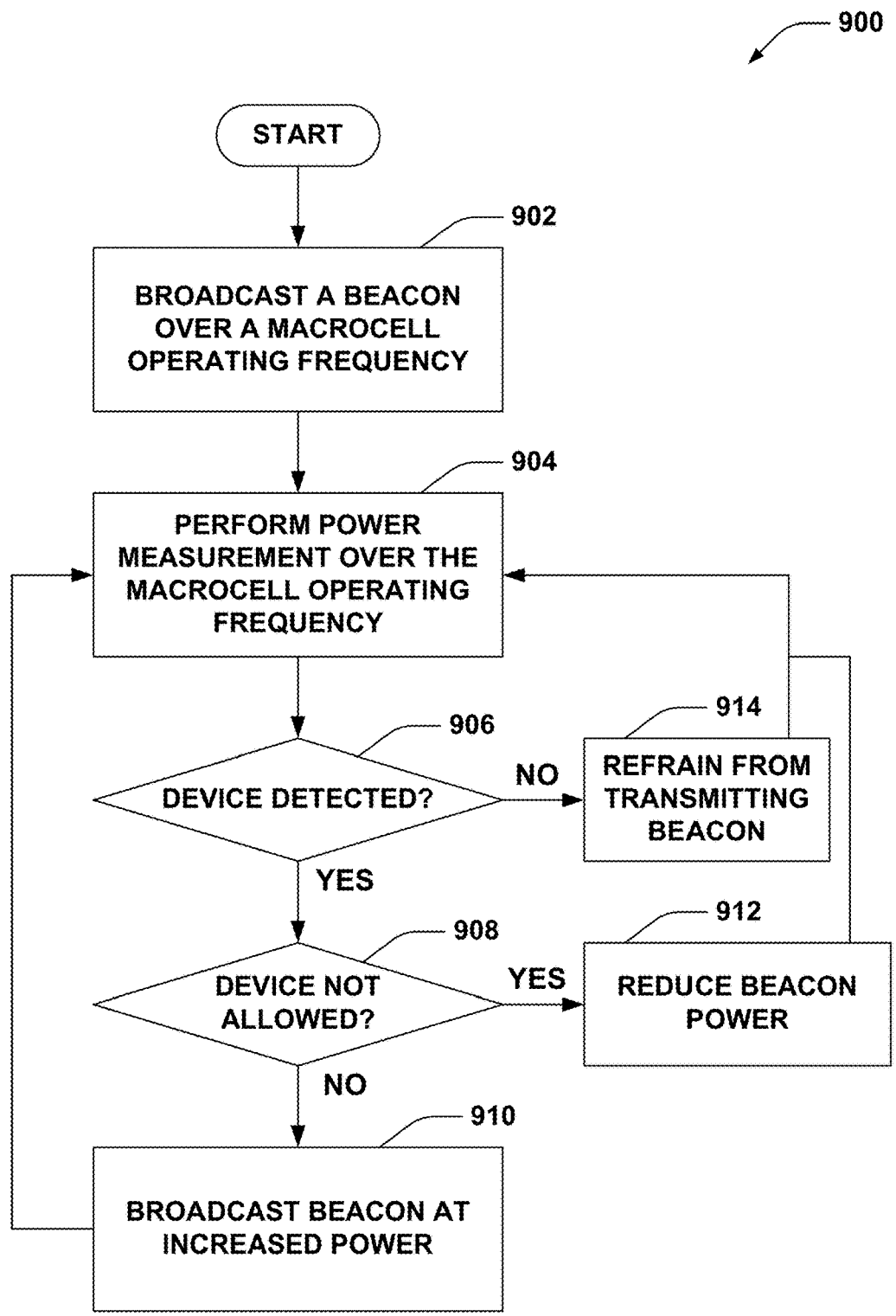
FIG. 9 is a flow chart of an aspect of an example methodology for determining whether to modify broadcasting a beacon.

Turning to FIG. 9, an example methodology 900 is displayed that facilitates determining whether to modify broadcasting a beacon. At 902, a beacon can be broadcast over a macrocell operating frequency. As described, the beacon can emulate downlink transmissions of a macrocell base station to facilitate active hand-in of one or more devices. At 904, a power measurement can be performed over the macrocell operating frequency. For example, this can be an RSSI or similar measurement. At 906, it can be determined whether a device is detected. For example, this can be inferred based in part on an increase in RSSI, as described above. If so, it can be determined whether the device is not allowed to communicate at 908. For example, this can include obtaining an indication of such for the device, attempting to authenticate the device, obtaining a whitelist of CSGs to which the device is allowed access and attempting to locate a CSG identifier in the whitelist, etc. If not (e.g., the device may be allowed to communicate), at 910, the beacon can be broadcasted at an increased power. As described, the beacon power can be increased based on a deterministic power level, stepped up until a hand-in is detected, and/or the like.

In any case, following broadcasting the beacon at the increased power, other power measurements can be performed at 904 to facilitate dynamically adjusting the beacon power. If the device is not allowed to communicate (e.g., in the CSG) at 908, beacon power can be reduced at 912. For example, the beacon power can be reduced as a function of the measured RSSI, a difference between the measured RSSI and a previous RSSI, etc. to mitigate interference to the device. In this example, additional power measurements can then be performed at 904 to facilitate dynamically adjusting the beacon power. If a device is not detected at 906, transmitting the beacon can be refrained from at 914. In this example, as well, power measurements can be performed at 904.

Figure 10:
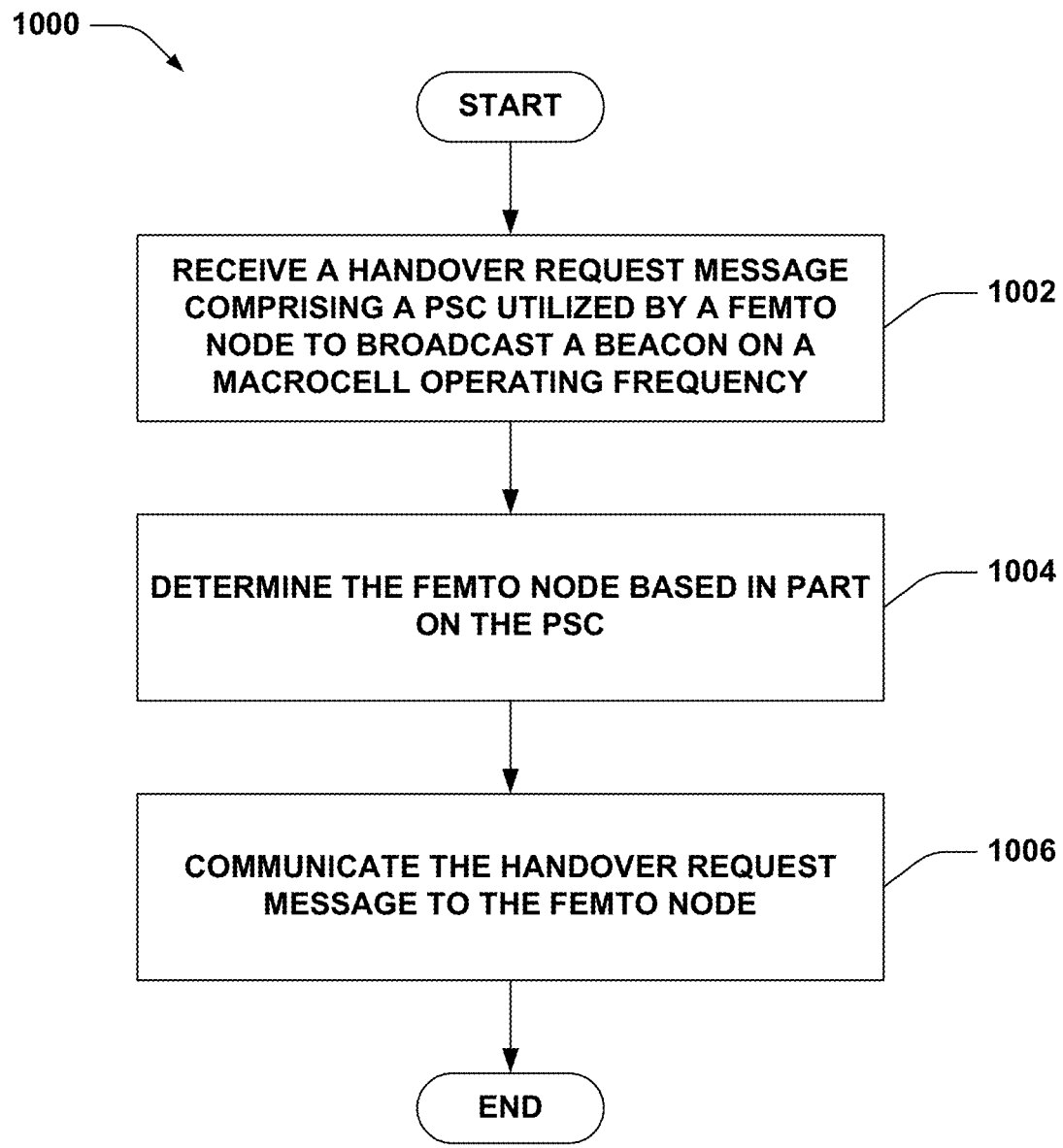
FIG. 10 is a flow chart of an aspect of an example methodology that communicates handover request messages to one or more femto nodes.

Referring to FIG. 10, an example methodology 1000 for communicating a handover request message for performing inter-frequency hand-in of a device to a femto node is illustrated. At 1002, a handover request message can be received comprising a PSC utilized by a femto node to broadcast a beacon on a macrocell operating frequency. For example, the PSC can be assigned to the femto node by a femto gateway or there can otherwise be a known association of the PSC to at least the femto node. At 1004, the femto node can be determined based in part on the PSC. Thus, for example, additional received or measured parameters can be utilized to disambiguate the femto node, such as another PSC of a related pilot signal, an observed timing difference between the femto node and one or more macrocell base stations, uplink RSSI, a reported location of a device, femto node, etc. At 1006, the handover request message can be communicated to the femto node. Thus, the femto node can prepare to receive hand-in of the device.

Figure 11:
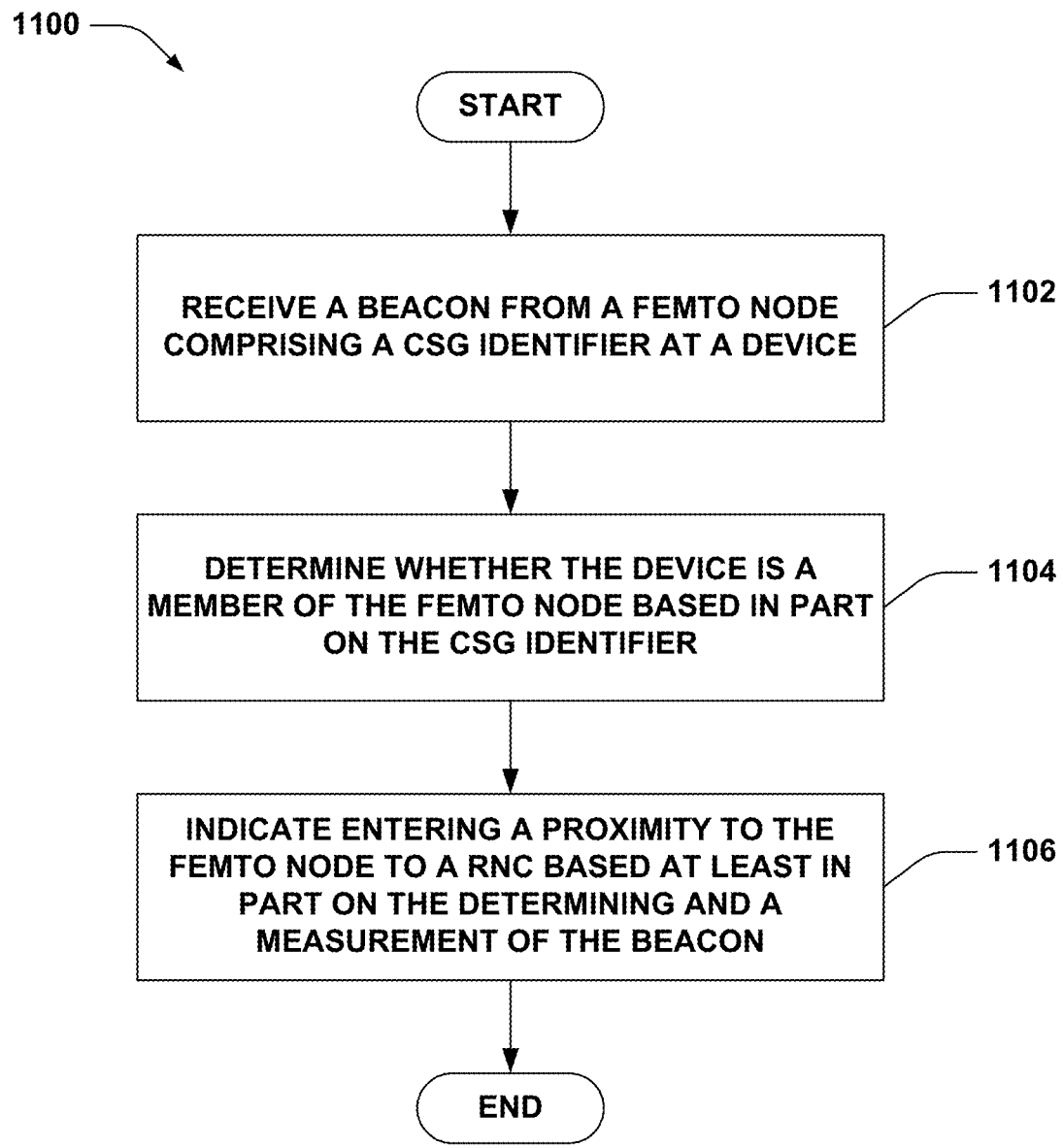
FIG. 11 is a flow chart of an aspect of an example methodology that indicates proximity to a femto node.

Turning to FIG. 11, an example methodology 1100 is depicted for indicating proximity to a femto node. At 1102, a beacon can be received from a femto node comprising a CSG identifier at a device. For example, the CSG identifier can be used to implement restricted association at the femto node, as described, to allow access to members of the CSG. At 1104, it can be determined whether the device is a member of the femto node based in part on the CSG identifier. For example, this can include comparing the CSG identifier to a whitelist of accessible CSG identifiers, determining that the femto node operates in hybrid access mode, etc. At 1106, entering a proximity to the femto node can be indicated to a RNC based at least in part on the determining and a measurement of the beacon. For example, a measurement report can be transmitted to an RNC comprising a proximity indicator (e.g., system information with a proximity indicator information element) and the measurement of the beacon (e.g., an SNR thereof). Thus, one or more measurement configuration parameters can be received for receiving signals from the femto node. For example, the parameters can correspond to operating in a compressed mode. In addition, upon receiving a beacon without the CSG identifier or not receiving the beacon, for example, exit of the proximity to the femto node can be indicated.

Figure 12:
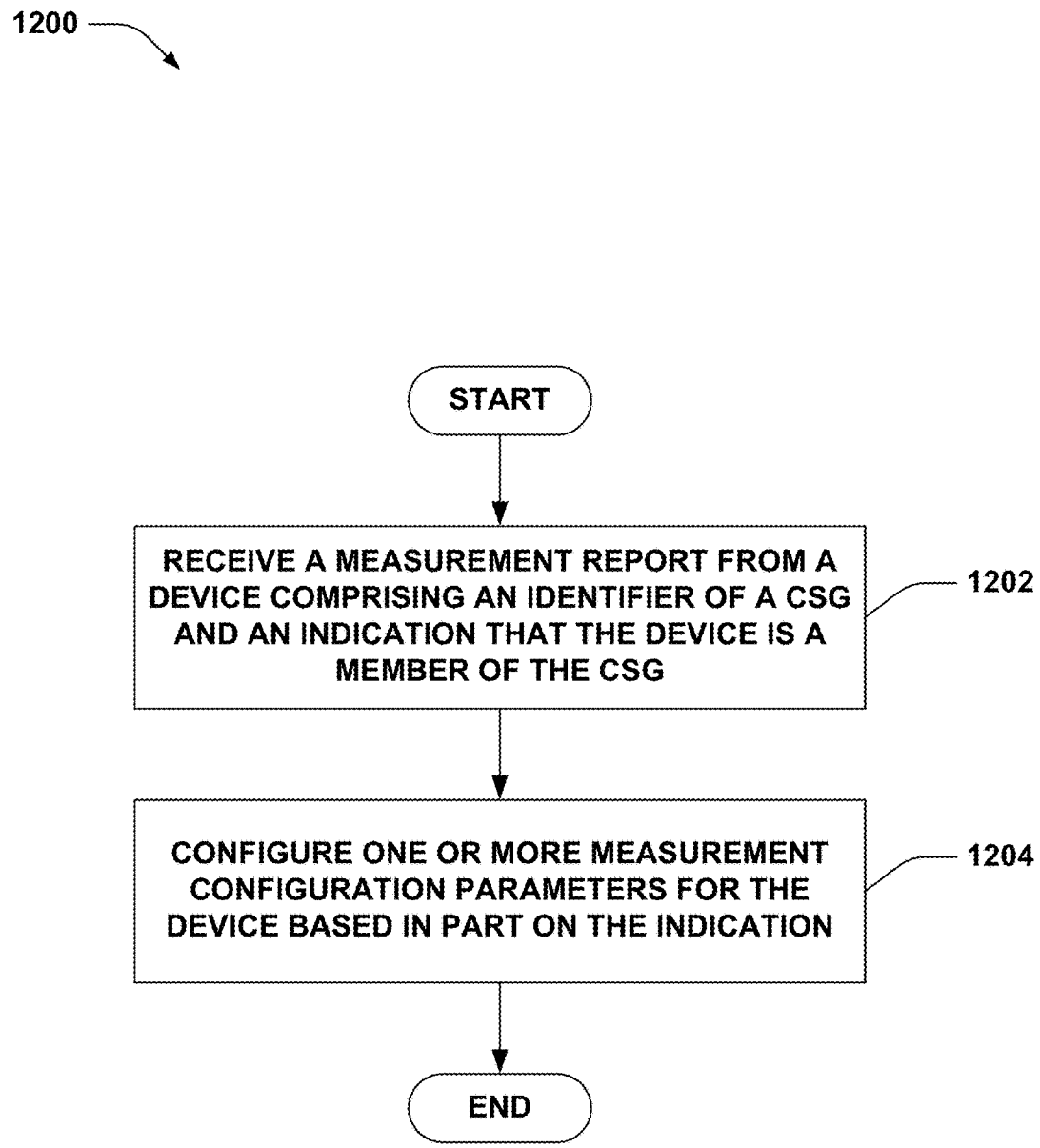
FIG. 12 is a flow chart of an aspect of an example methodology that configures measurement configuration parameters for a device based on a proximity to a femto node.

Referring to FIG. 12, an example methodology 1200 is illustrated for configuring measurement configuration parameters for a device. At 1202, a measurement report can be received from a device comprising an identifier of a CSG and an indication that the device is a member of the CSG. In one example, the identifier can be part of the measurement report. At 1204, one or more measurement configuration parameters can be configured for the device based on the indication. For example, the measurement configuration parameters can relate to operating in a compressed mode and can include time intervals over which the device can measure other base stations, for example. In addition, upon receiving a second measurement report from the device that does not include the CSG identifier, the measurement configuration parameters can be deconfigured.

Figure 13:
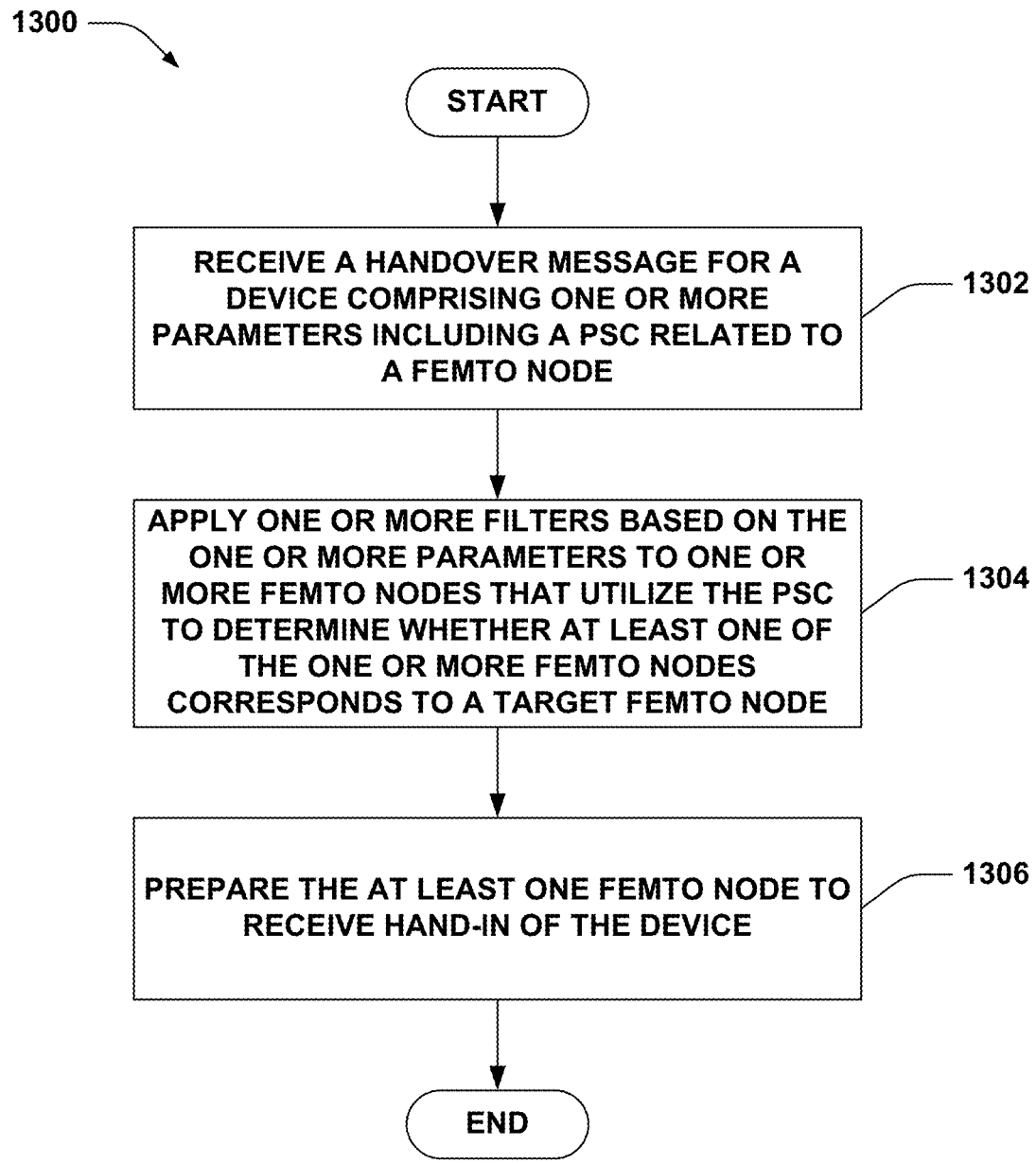
FIG. 13 is a flow chart of an aspect of an example methodology for preparing at least one femto node for hand-in of a device.

FIG. 13 illustrates an example methodology 1300 for preparing a femto node for hand-in of a device. At 1302, a handover message for a device comprising one or more parameters including a PSC related to a femto node can be received. This can include receiving the message with a source base station of the device identified in one or more IEs of the message, a timing difference between the femto node and source base station as measured by the device in one or more IEs of the message, one or more PSCs of beacons received at the device from the femto node, and/or the like. Moreover, the handover message can be based on a measurement report received from the device, which can comprise the one or more parameters and/or the parameters can be subsequently solicited from the device, as described. In one example, the handover message can be a RANAP relocation request message. In addition, as described for example, the cell identity IE in the RANAP relocation request message can be used to convey the one or more parameters.

At 1304, one or more filters can be applied to one or more femto nodes that utilize the PSC based on the one or more parameters to determine whether at least one of the one or more femto nodes corresponds to a target femto node. For example, this can include applying one or more of a source filter, an OTD filter, a PSC filter, an access control filter, a UL RSSI filter, a hand-in eligibility filter, a timing filter, and/or the like, as described, based on the one or more parameters. Thus, in one example, a source base station can be determined from the one or more parameters, and source filter can be applied to determine whether the femto node is within a threshold vicinity of the source base station.

At 1306, the at least one femto node can be prepared to receive hand-in of the device. For example, this can include establishing resources to receive the hand-in and indicating the resources to the device (e.g., in a RANAP relocation response message) via various network nodes. In another example, this can include communicating one or more handover messages, such as a RANAP relocation request message, to one or more femto nodes. In one example, where the messages are sent to a plurality of femto nodes, a set of resources can be indicated to the set of femto nodes for establishing to receive hand-in of the device. In other examples, the femto nodes can indicate the set of resources and can use common resources, which can thus be specified to the device.

Figure 14:
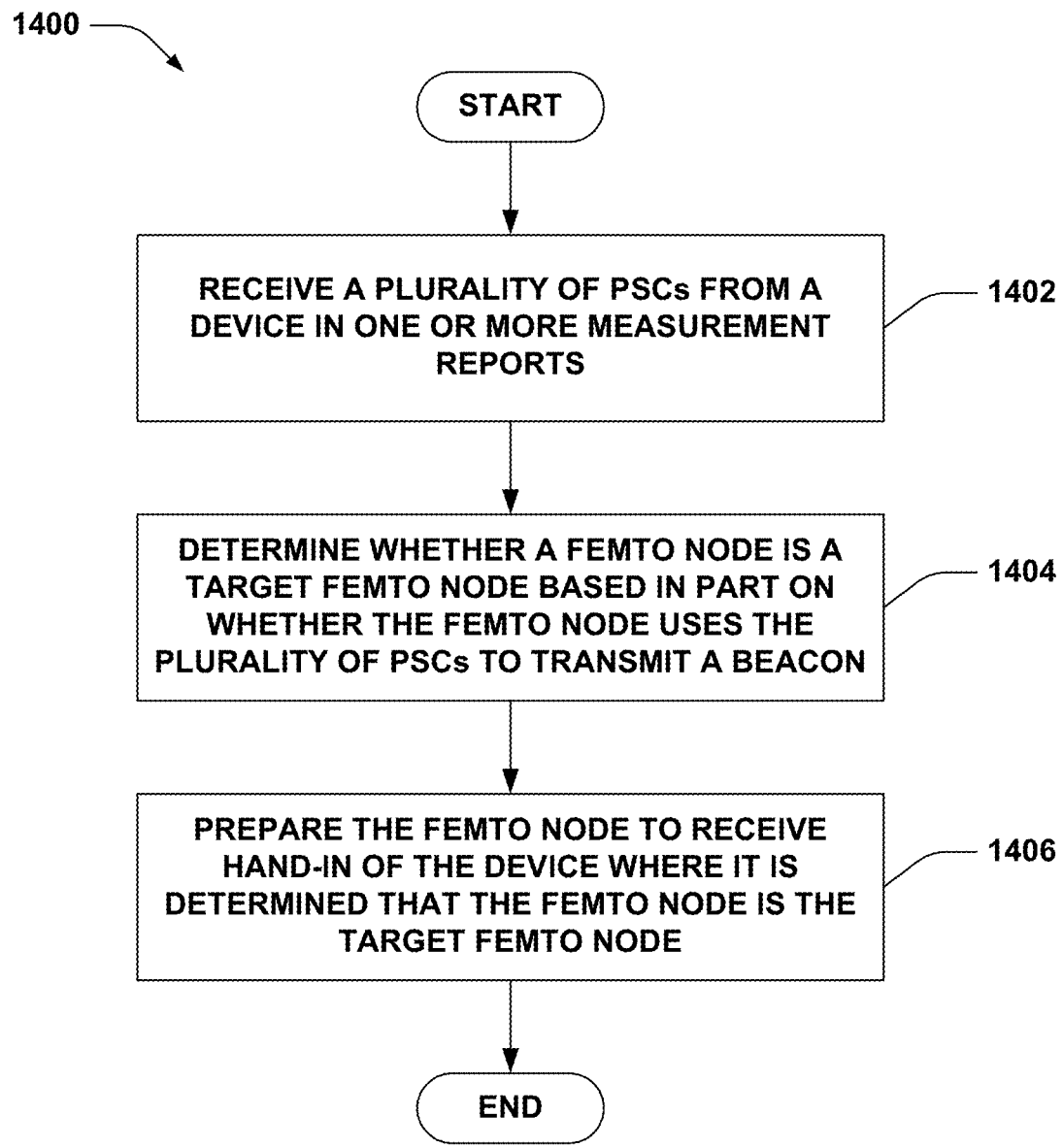
FIG. 14 is a flow chart of an aspect of an example methodology for determining whether a femto node is a target femto node.

FIG. 14 depicts an example methodology 1400 for preparing a femto node to receive hand-in of a device. At 1402, a plurality of PSCs can be received from a device in one or more measurement reports. For example, a femto node can transmit a beacon using a plurality of PSCs, as described, by transmitting multiple beacons in a given transmission opportunity, alternating PSCs over transmission opportunities, and/or the like. The plurality of PSCs can thus be received in a single measurement report or in multiple measurement reports.

At 1404, it can be determined whether a femto node is a target femto node based in part on whether the femto node uses the plurality of PSCs to transmit a beacon. For example, PSCs used by a femto node can be stored or otherwise known, such that determining whether the femto node uses the plurality of PSCs can include comparing the received PSCs to those known to be utilized by the femto node. Moreover, this can include comparing a reported timing difference at which the beacons are received to a known timing difference for transmitting the beacons to determine whether the difference is within a threshold.

At 1406, the femto node can be prepared to receive hand-in of the device where it is determined that the femto node is the target femto node. This can include establishing resources to receive the hand-in, sending one or more messages to the femto node, and/or the like, as described.

Figure 15:
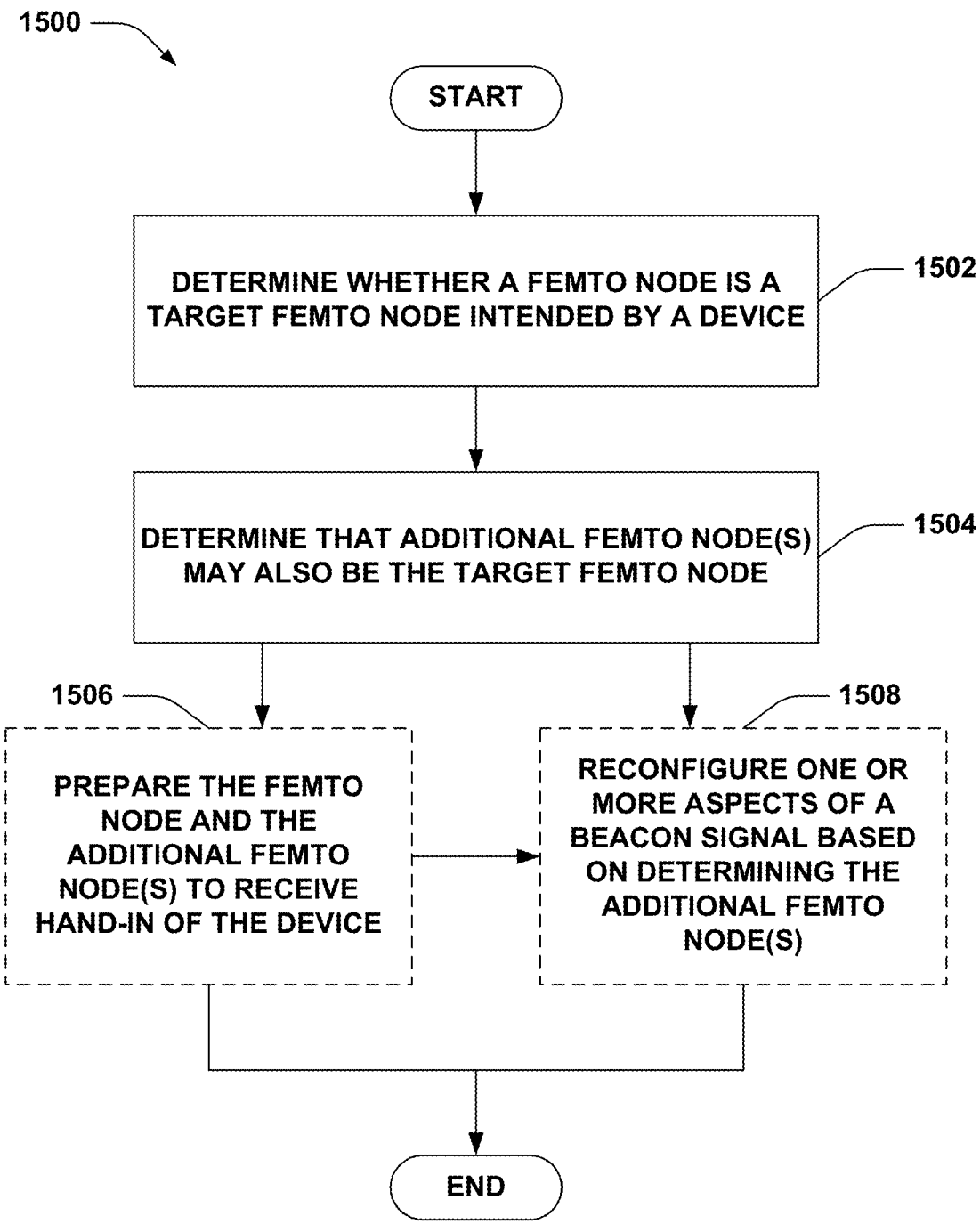
FIG. 15 is a flow chart of an aspect of an example methodology for managing multiple femto nodes determined as a target femto node.

Turning to FIG. 15, an example methodology 1500 for disambiguating multiple femto nodes to determine a target femto node is shown. At 1502, it can be determined whether a femto node is a target femto node intended by a device. For example, this can include applying one or more filters to parameters received regarding the femto node, as described, determining such based on one or more PSCs received for the femto node, and/or the like.

At 1504, it can be determined that additional femto node(s) may also be the target femto node. In one example, this can include determining additional femto nodes upon applying the one or more filters. In another example, where the methodology 1500 is performed by a femto node, this can be based on determining that the femto node is not the target femto node. In the former example, at 1506, the femto node and the additional femto node(s) can optionally be prepared to receive hand-in of the device. This can include transmitting handover messages thereto, specifying resources for receiving hand-in, and/or the like. Optionally, in either example at 1508, one or more aspects of a beacon signal can be reconfigured based on determining the additional femto node(s). This can prevent future ambiguity between the femto node and additional femto node(s), as described.

Figure 16:
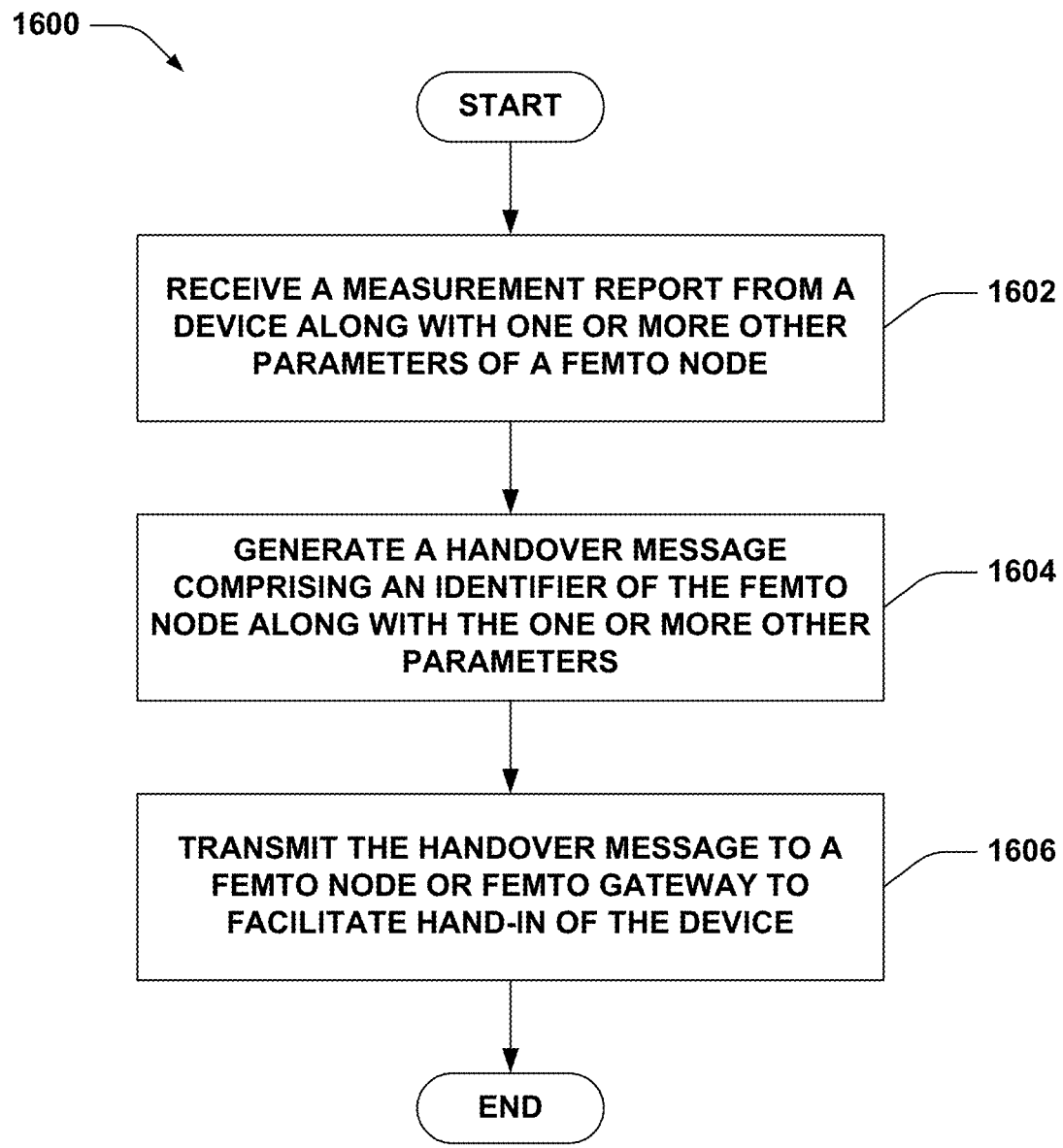
FIG. 16 is a flow chart of an aspect of an example methodology for transmitting a handover message including one or more parameters of a femto node.

Referring to FIG. 16, an example methodology 1600 is illustrated that facilitates communicating device specified parameters with a handover message to facilitate femto node disambiguation. At 1602, a measurement report can be received from a device along with one or more other parameters of a femto node. For example, this can include receiving a PSC used by the femto node, an identifier of a source base station, a measured timing difference between the femto node and the source base station, and/or the like. In one example, the one or more parameters can be provided in the measurement report or in a different solicited or unsolicited message.

At 1604, a handover message comprising an identifier of the femto node can be generated along with the one or more other parameters. For example, this can include generating a RANAP relocation required message and specifying the one or more other parameters, related parameters, and/or a function of the one or more other parameters (e.g., a hash function), in a cell identity IE.

At 1606, the handover message can be transmitted to a femto node or femto gateway to facilitate hand-in of the device. As described, the femto node or femto gateway can utilize the one or more parameters to disambiguate the femto node as a target femto node. This can include applying one or more of the described filters to the parameters, determining a plurality of PSCs reported by the device, etc.

It will be appreciated that, in accordance with one or more aspects described herein, inferences can be made regarding transmitting a beacon to facilitate inter-frequency active hand-in, determining a power for the beacon, determining whether to transmit the beacon in a given time period, determining a femto node related to a beacon, determining whether a femto node is a target femto node based on one or more filters, related parameters, etc., and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 17:
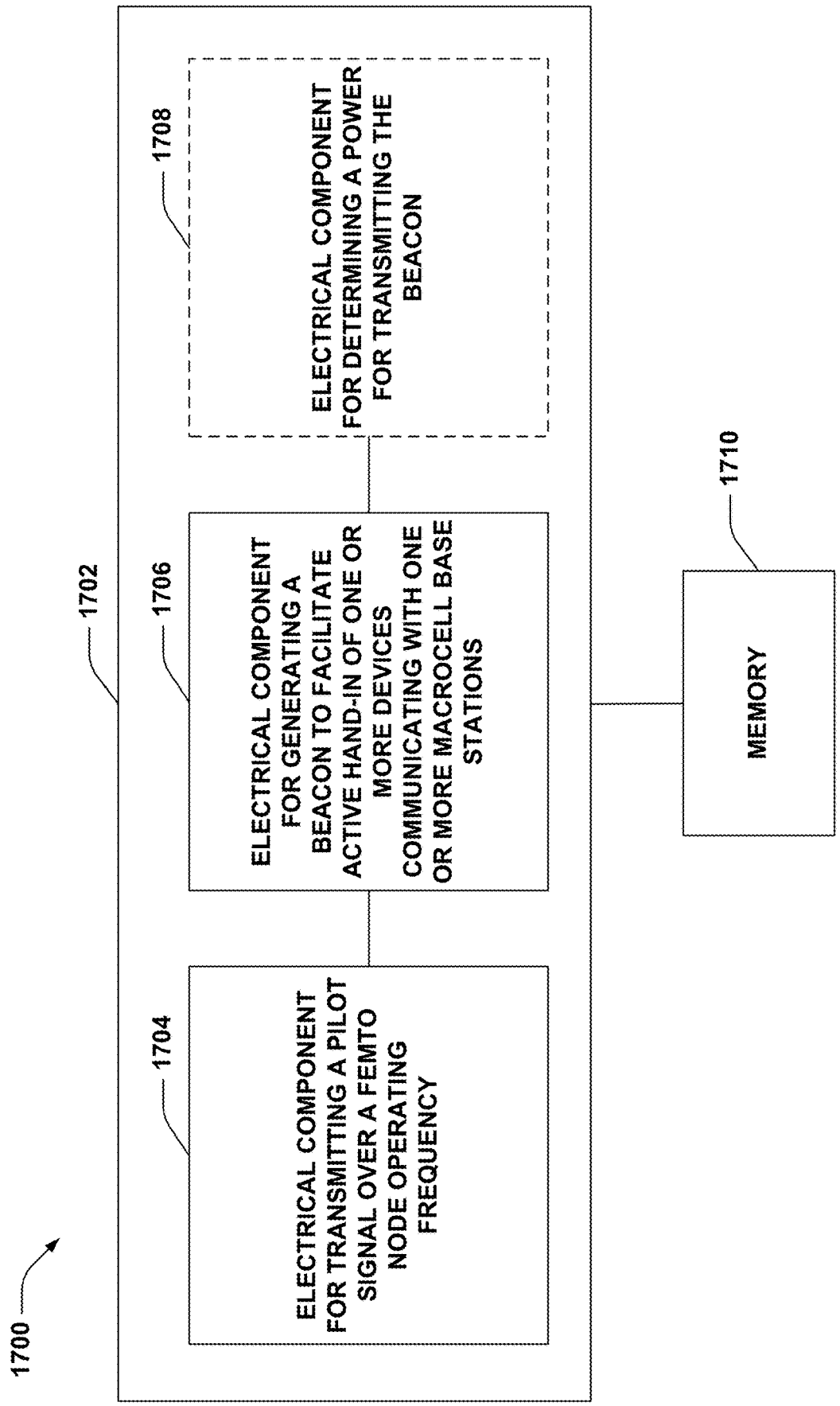
FIG. 17 is a block diagram of an example system that generates a beacon for transmitting for a femto node over a macrocell operating frequency.

With reference to FIG. 17, illustrated is a system 1700 for generating a beacon to cause active hand-in of one or more devices. For example, system 1700 can reside at least partially within a femto node. It is to be appreciated that system 1700 is represented as including functional blocks, which can be functional blocks that represent functions implemented by a processor, software, or combination thereof (e.g., firmware). System 1700 includes a logical grouping 1702 of electrical components that can act in conjunction. For instance, logical grouping 1702 can include an electrical component for transmitting a pilot signal over a femto node operating frequency 1704. In one example, a first PSC assigned from a femto gateway or otherwise received or determined can be utilized in transmitting the pilot signal.

Further, logical grouping 1702 can comprise an electrical component for generating a beacon to facilitate active hand-in of one or more devices communicating with one or more macrocell base stations 1706. Electrical component 1704, for example, can transmit the beacon over a macrocell frequency, as described. In addition, logical grouping 1702 can optionally include an electrical component for determining a power for transmitting the beacon 1708. This can be based on RSSI or other measurements, as described. For example, electrical component 1704 can include a communications component 206, as described above. In addition, for example, electrical component 1706, in an aspect, can include beacon generating component 212, as described above. Moreover, electrical component 1708 can include a beacon power determining component 216, as described.

Additionally, system 1700 can include a memory 1710 that retains instructions for executing functions associated with the electrical components 1704, 1706, and 1708. While shown as being external to memory 1710, it is to be understood that one or more of the electrical components 1704, 1706, and 1708 can exist within memory 1710. In one example, electrical components 1704, 1706, and 1708 can comprise at least one processor, or each electrical component 1704, 1706, and 1708 can be a corresponding module of at least one processor. Moreover, in an additional or alternative example, electrical components 1704, 1706, and 1708 can be a computer program product comprising a computer readable medium, where each electrical component 1704, 1706, and 1708 can be corresponding code.

Figure 18:
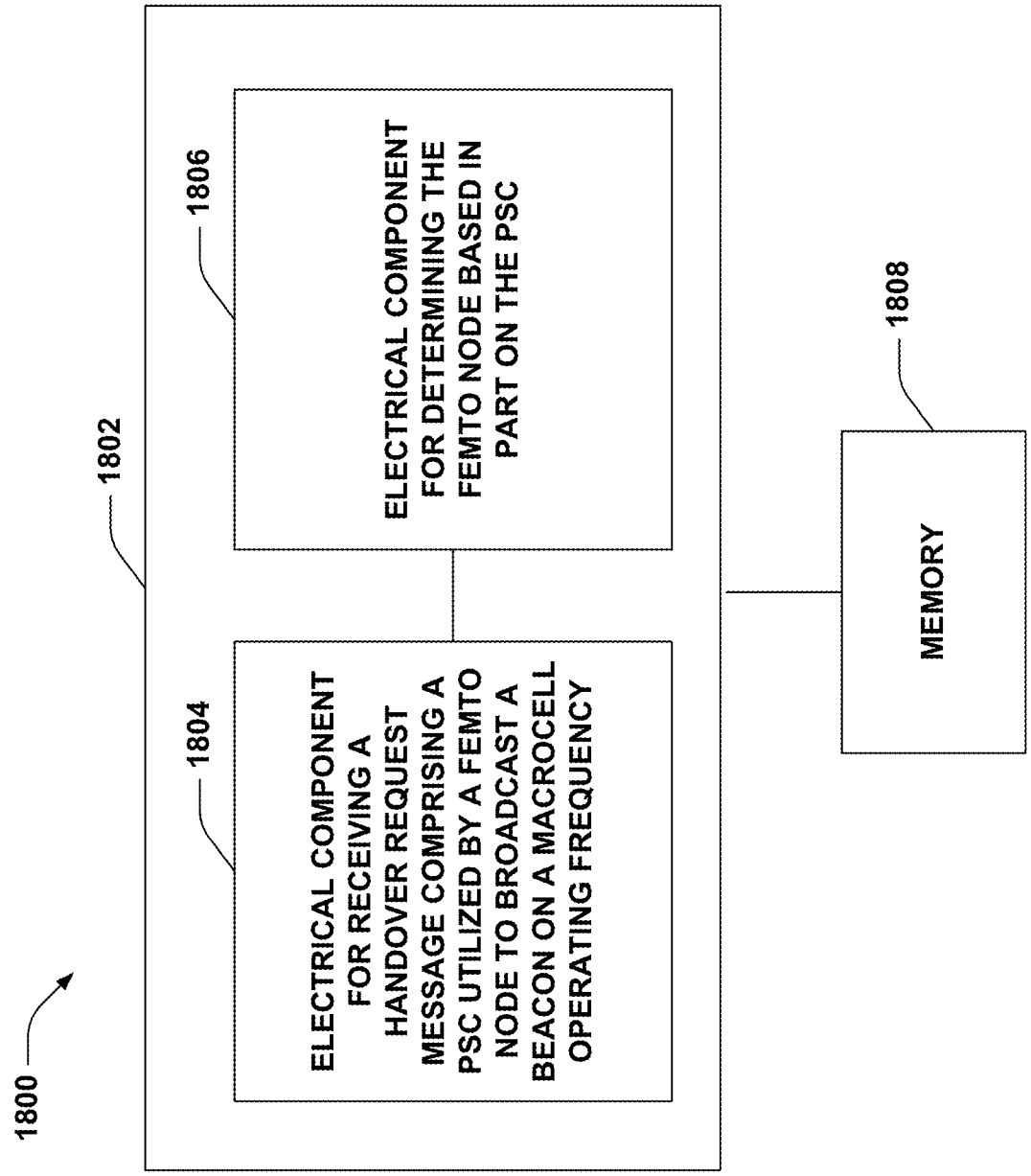
FIG. 18 is a block diagram of an example system that communicates handover request messages to one or more femto nodes.

With reference to FIG. 18, illustrated is a system 1800 for determining a femto node related to a reported measurement from a beacon thereof. For example, system 1800 can reside at least partially within a RNC, femto gateway, etc. It is to be appreciated that system 1800 is represented as including functional blocks, which can be functional blocks that represent functions implemented by a processor, software, or combination thereof (e.g., firmware). System 1800 includes a logical grouping 1802 of electrical components that can act in conjunction. For instance, logical grouping 1802 can include an electrical component for receiving a handover request message comprising a PSC utilized by a femto node to broadcast a beacon on a macrocell operating frequency 1804. In one example, system 1800 can have assigned the PSC and/or can otherwise have an association of the PSC to the femto node (e.g., in conjunction with one or more other parameters, such as a PSC for a pilot signal, a location, etc.).

Further, logical grouping 1802 can comprise an electrical component for determining the femto node based in part on the PSC 1806. Moreover, for example, electrical component 1804 can transmit the handover request message to the determined femto node. For example, electrical component 1804 can include a communications component 406 or 506, as described above. In addition, for example, electrical component 1806, in an aspect, can include a femto node disambiguating component 414 or 516, as described above.

Additionally, system 1800 can include a memory 1808 that retains instructions for executing functions associated with the electrical components 1804 and 1806. While shown as being external to memory 1808, it is to be understood that one or more of the electrical components 1804 and 1806 can exist within memory 1808. In one example, electrical components 1804 and 1806 can comprise at least one processor, or each electrical component 1804 and 1806 can be a corresponding module of at least one processor. Moreover, in an additional or alternative example, electrical components 1804 and 1806 can be a computer program product comprising a computer readable medium, where each electrical component 1804 and 1806 can be corresponding code.

Figure 19:
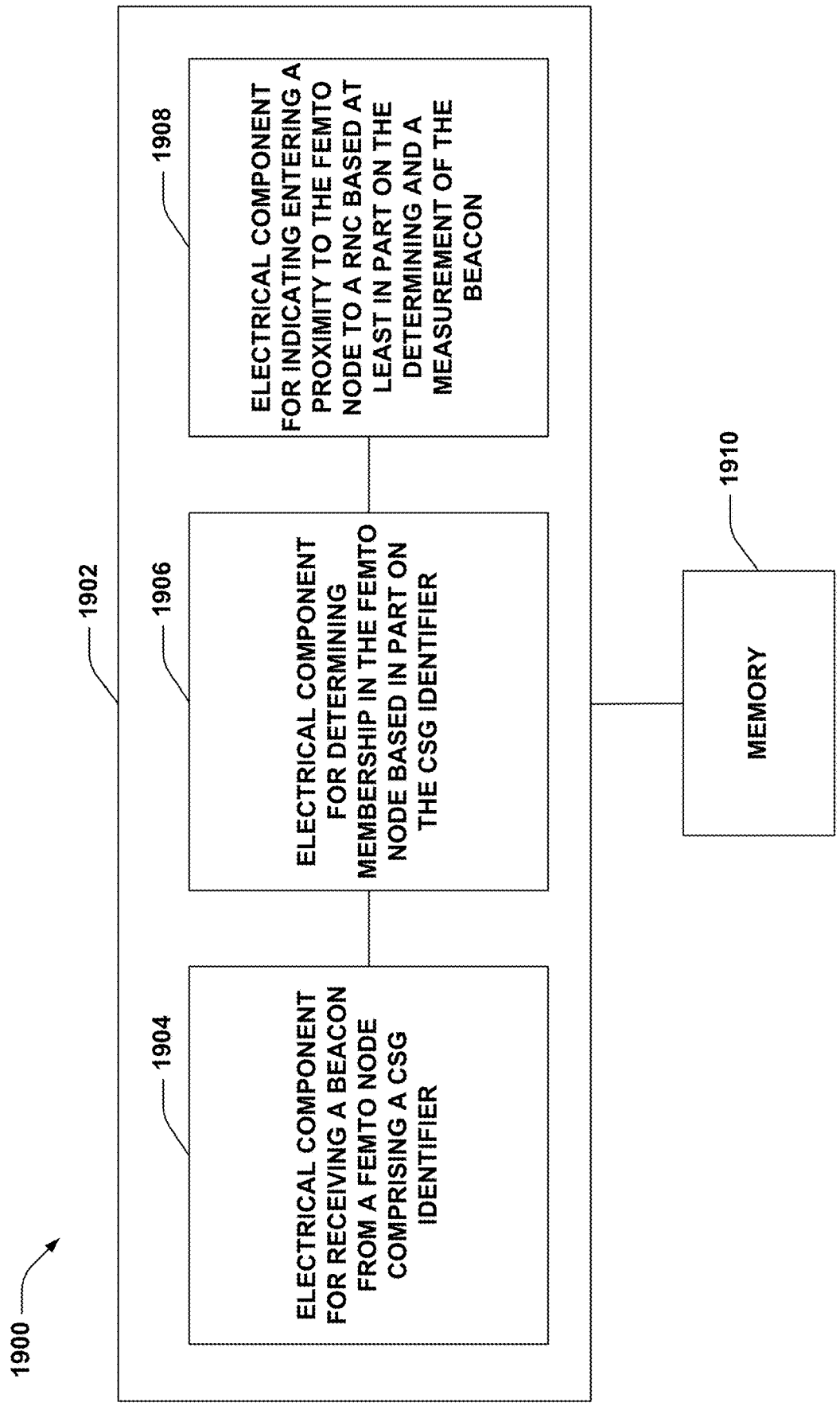
FIG. 19 is a block diagram of an example system that indicates proximity to a femto node.

With reference to FIG. 19, illustrated is a system 1900 for indicating proximity to a femto node. For example, system 1900 can reside at least partially within a device. It is to be appreciated that system 1900 is represented as including functional blocks, which can be functional blocks that represent functions implemented by a processor, software, or combination thereof (e.g., firmware). System 1900 includes a logical grouping 1902 of electrical components that can act in conjunction. For instance, logical grouping 1902 can include an electrical component for receiving a beacon from a femto node comprising a CSG identifier 1904. In one example, the beacon can be received over a macrocell frequency. Logical grouping 1902 can further include an electrical component for determining membership in the femto node based in part on the CSG identifier 1906. For example, this can include determining whether system 1900 is a member of the femto node (e.g., whether the CSG is in a whitelist of system 1900, whether the femto node operates in hybrid access mode, etc.).

Further, logical grouping 1902 can comprise an electrical component for indicating entering a proximity to the femto node to a RNC based at least in part on the determining and a measurement of the beacon 1908. In this regard, the macrocell can schedule one or more measurement configuration parameters (e.g. compressed mode parameters) to the device to allow measuring the femto node during specified time intervals. In addition, electrical component 1904 can measure the beacon in a subsequent time period, and electrical component 1906 can detect that system 1900 is leaving proximity of the femto node (e.g., based on a diminishing signal quality of the beacon), and electrical component 1908 can similarly notify the macrocell base station. For example, electrical component 1904 can include a communications component 306, and electrical component 1906 can include a proximity determining component 318, as described above. In addition, for example, electrical component 1908, in an aspect, can include a parameter communicating component 316, as described above.

Additionally, system 1900 can include a memory 1910 that retains instructions for executing functions associated with the electrical components 1904, 1906, and 1908. While shown as being external to memory 1910, it is to be understood that one or more of the electrical components 1904, 1906, and 1908 can exist within memory 1910. In one example, electrical components 1904, 1906, and 1908 can comprise at least one processor, or each electrical component 1904, 1906, and 1908 can be a corresponding module of at least one processor. Moreover, in an additional or alternative example, electrical components 1904, 1906, and 1908 can be a computer program product comprising a computer readable medium, where each electrical component 1904, 1906, and 1908 can be corresponding code.

Figure 20:
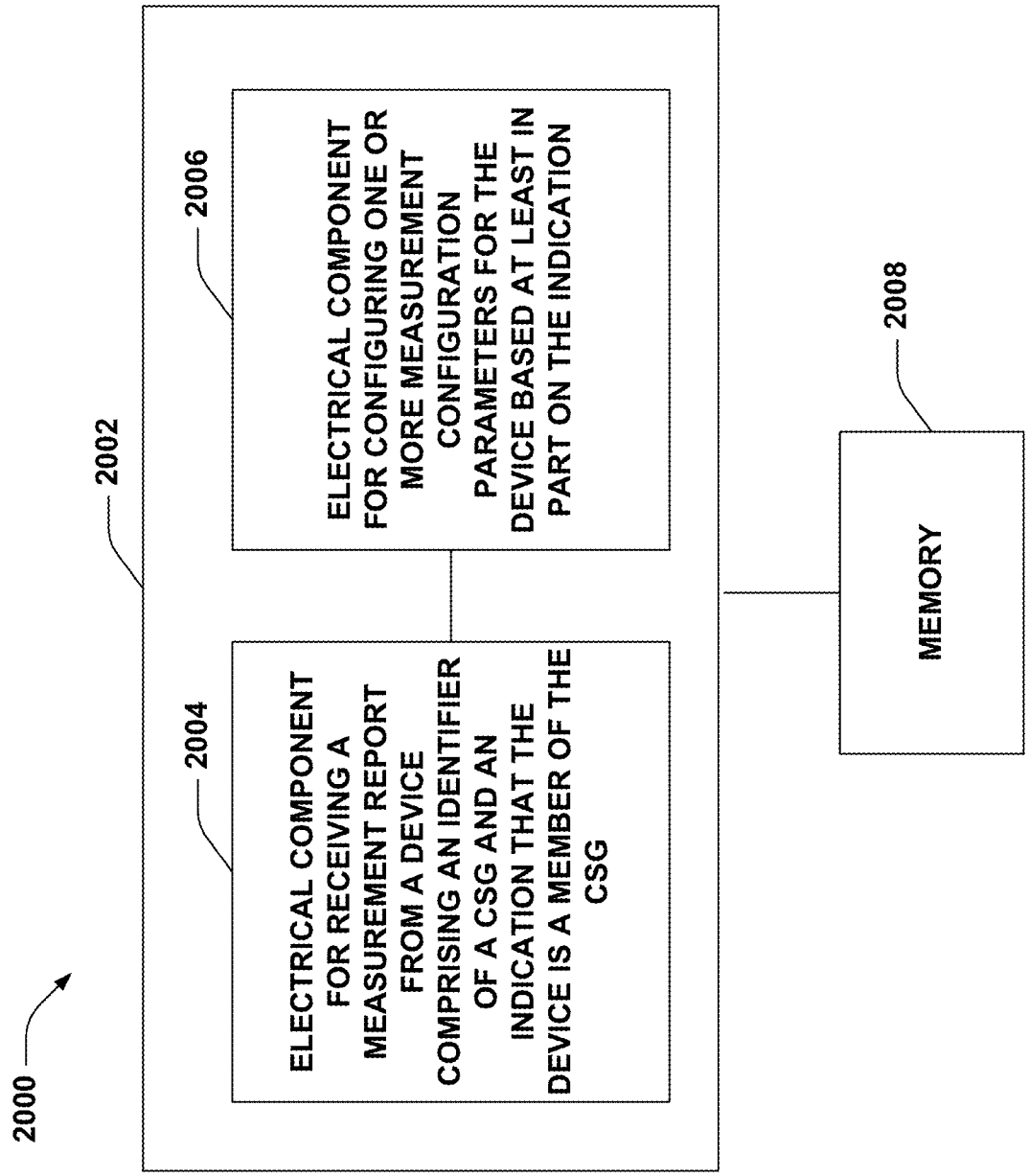
FIG. 20 is a block diagram of an example system that configures measurement configuration parameters for a device based on a proximity to a femto node.

With reference to FIG. 20, illustrated is a system 2000 for configuring a device with measurement configuration parameters. For example, system 2000 can reside at least partially within a RNC. It is to be appreciated that system 2000 is represented as including functional blocks, which can be functional blocks that represent functions implemented by a processor, software, or combination thereof (e.g., firmware). System 2000 includes a logical grouping 2002 of electrical components that can act in conjunction. For instance, logical grouping 2002 can include an electrical component for receiving a measurement report from a device comprising an identifier of a CSG and an indication that the device is a member of the CSG 2004.

Further, logical grouping 2002 can comprise an electrical component for configuring one or more measurement configuration parameters for the device based at least in part on the indication 2006. For example, the measurement configuration parameters can correspond to compressed mode parameters, such as one or more measurement gaps during which other access points can be measured. In addition, electrical component 2004 can obtain an indication that the device is leaving proximity of the femto node, or otherwise determine such based on a subsequent measurement report from the device, and electrical component 2006 can accordingly deconfigure compressed mode parameters to conserve resources at the device. For example, electrical component 2004 can include a proximity receiving component 420, as described above. In addition, for example, electrical component 2006, in an aspect, can include a hand-in component 416, as described above.

Additionally, system 2000 can include a memory 2008 that retains instructions for executing functions associated with the electrical components 2004 and 2006. While shown as being external to memory 2008, it is to be understood that one or more of the electrical components 2004 and 2006 can exist within memory 2008. In one example, electrical components 2004 and 2006 can comprise at least one processor, or each electrical component 2004 and 2006 can be a corresponding module of at least one processor. Moreover, in an additional or alternative example, electrical components 2004 and 2006 can be a computer program product comprising a computer readable medium, where each electrical component 2004 and 2006 can be corresponding code.

Figure 21:
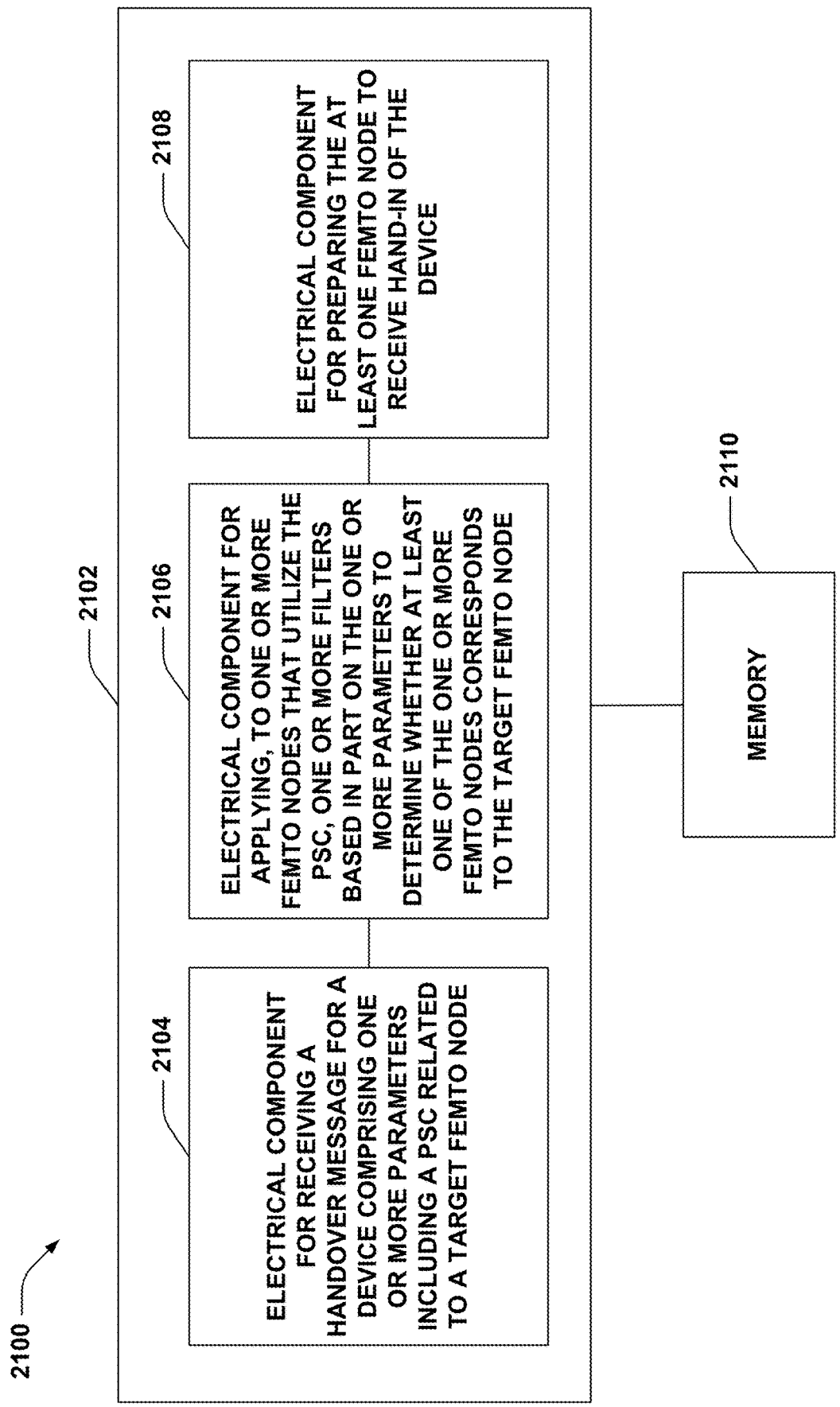
FIG. 21 is a block diagram of an example system that prepares at least one femto node for hand-in of a device.

With reference to FIG. 21, illustrated is a system 2100 for preparing one or more target femto nodes for device hand-in. For example, system 2100 can reside at least partially within a femto node or femto gateway. It is to be appreciated that system 2100 is represented as including functional blocks, which can be functional blocks that represent functions implemented by a processor, software, or combination thereof (e.g., firmware). System 2100 includes a logical grouping 2102 of electrical components that can act in conjunction. For instance, logical grouping 2102 can include an electrical component for receiving a handover message for a device comprising one or more parameters including a PSC related to a target femto node 2104. In one example, the one or more parameters can be included in a cell identity field of a handover message, as described, and can include an identifier of a source base station of the device, a measured difference in timing between the femto node and source base station, etc.

Further, logical grouping 2102 can comprise an electrical component for applying, to one or more femto nodes that utilize the PSC, one or more filters based in part on the one or more parameters to determine whether at least one of the one or more femto nodes corresponds to the target femto node 2106. For example, this can include applying a source filter, OTD filter, PSC filter, etc., as described. In addition, logical grouping 2102 can include an electrical component for preparing the at least one femto node to receive hand-in of the device 2108. This can include preparing multiple femto nodes, establishing resources for hand-in, etc. For example, electrical component 2104 can include a communications component 206, 306, 406, 506, etc., parameter obtaining component 606, and/or the like, as described above. In addition, for example, electrical component 2106, in an aspect, can include a femto node disambiguating component 218, 414, 516, 602, etc., as described above. Moreover, electrical component 2108 can include a handover management component 214, hand-in component 416 or 514, and/or the like, as described.

Additionally, system 2100 can include a memory 2110 that retains instructions for executing functions associated with the electrical components 2104, 2106, and 2108. While shown as being external to memory 2110, it is to be understood that one or more of the electrical components 2104, 2106, and 2108 can exist within memory 2110. In one example, electrical components 2104, 2106, and 2108 can comprise at least one processor, or each electrical component 2104, 2106, and 2108 can be a corresponding module of at least one processor. Moreover, in an additional or alternative example, electrical components 2104, 2106, and 2108 can be a computer program product comprising a computer readable medium, where each electrical component 2104, 2106, and 2108 can be corresponding code.

Figure 22:
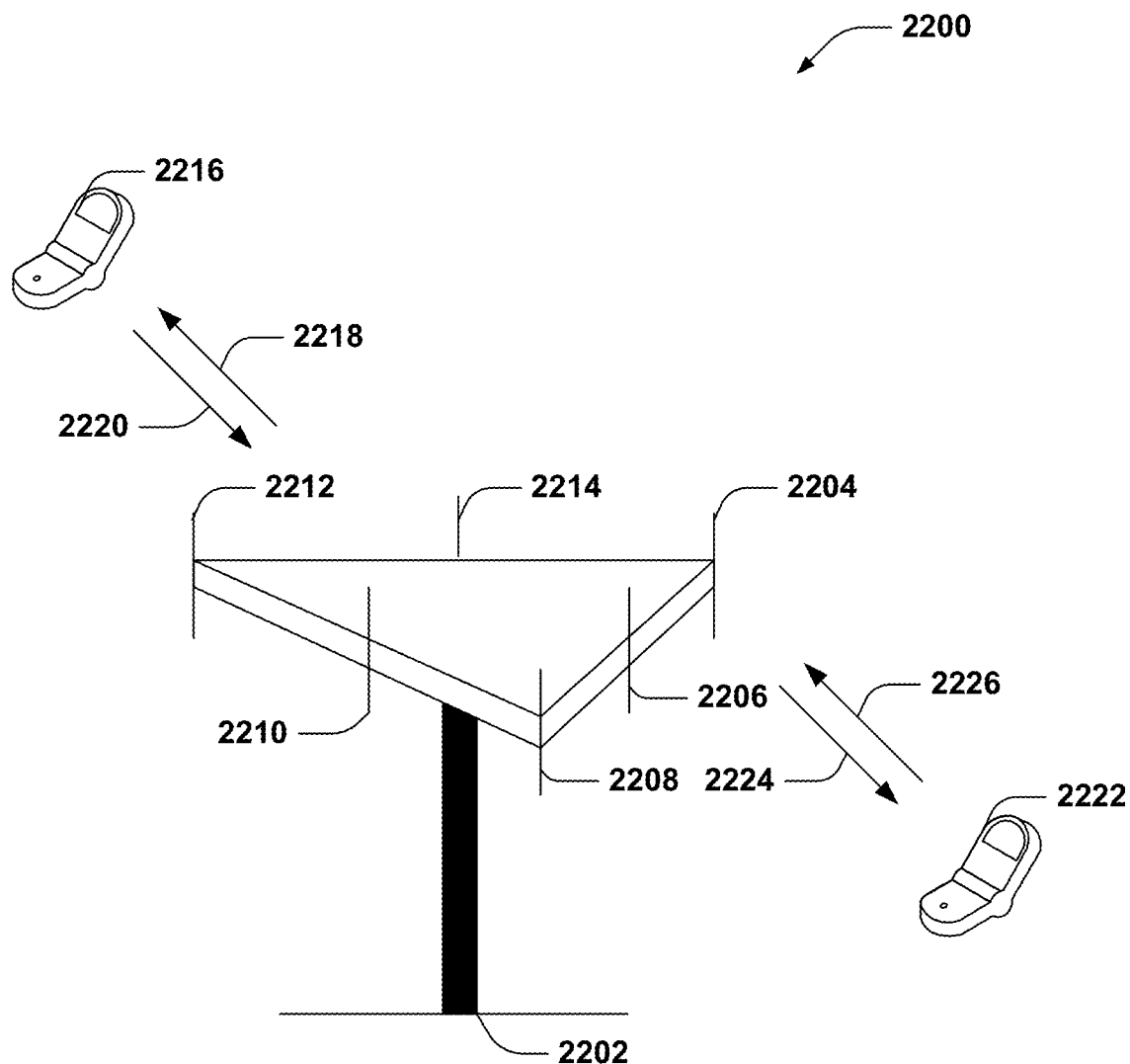
FIG. 22 is a block diagram of an example wireless communication system in accordance with various aspects set forth herein.

Referring now to FIG. 22, a wireless communication system 2200 is illustrated in accordance with various embodiments presented herein. System 2200 comprises a base station 2202 that can include multiple antenna groups. For example, one antenna group can include antennas 2204 and 2206, another group can comprise antennas 2208 and 2210, and an additional group can include antennas 2212 and 2214. Two antennas are illustrated for each antenna group; however, more or fewer antennas can be utilized for each group. Base station 2202 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 2202 can communicate with one or more mobile devices such as mobile device 2216 and mobile device 2222; however, it is to be appreciated that base station 2202 can communicate with substantially any number of mobile devices similar to mobile devices 2216 and 2222. Mobile devices 2216 and 2222 can be, for example, cellular phones, smart phones, laptops, handheld communication devices, handheld computing devices, satellite radios, global positioning systems, PDAs, and/or any other suitable device for communicating over wireless communication system 2200. As depicted, mobile device 2216 is in communication with antennas 2212 and 2214, where antennas 2212 and 2214 transmit information to mobile device 2216 over a forward link 2218 and receive information from mobile device 2216 over a reverse link 2220. Moreover, mobile device 2222 is in communication with antennas 2204 and 2206, where antennas 2204 and 2206 transmit information to mobile device 2222 over a forward link 2224 and receive information from mobile device 2222 over a reverse link 2226. In a frequency division duplex (FDD) system, forward link 2218 can utilize a different frequency band than that used by reverse link 2220, and forward link 2224 can employ a different frequency band than that employed by reverse link 2226, for example. Further, in a time division duplex (TDD) system, forward link 2218 and reverse link 2220 can utilize a common frequency band and forward link 2224 and reverse link 2226 can utilize a common frequency band.

Each group of antennas and/or the area in which they are designated to communicate can be referred to as a sector of base station 2202. For example, antenna groups can be designed to communicate to mobile devices in a sector of the areas covered by base station 2202. In communication over forward links 2218 and 2224, the transmitting antennas of base station 2202 can utilize beamforming to improve signal-to-noise ratio of forward links 2218 and 2224 for mobile devices 2216 and 2222. Also, while base station 2202 utilizes beamforming to transmit to mobile devices 2216 and 2222 scattered randomly through an associated coverage, mobile devices in neighboring cells can be subject to less interference as compared to a base station transmitting through a single antenna to all its mobile devices. Moreover, mobile devices 2216 and 2222 can communicate directly with one another using a peer-to-peer or ad hoc technology as depicted. According to an example, system 2200 can be a multiple-input multiple-output (MIMO) communication system. In addition, for example, base station 2202 can receive measurement reports from device 2216 and/or 2222 related to a beacon received from a femto node (not shown) and can disambiguate the femto node for initiating hand-in thereto.

Figure 23:
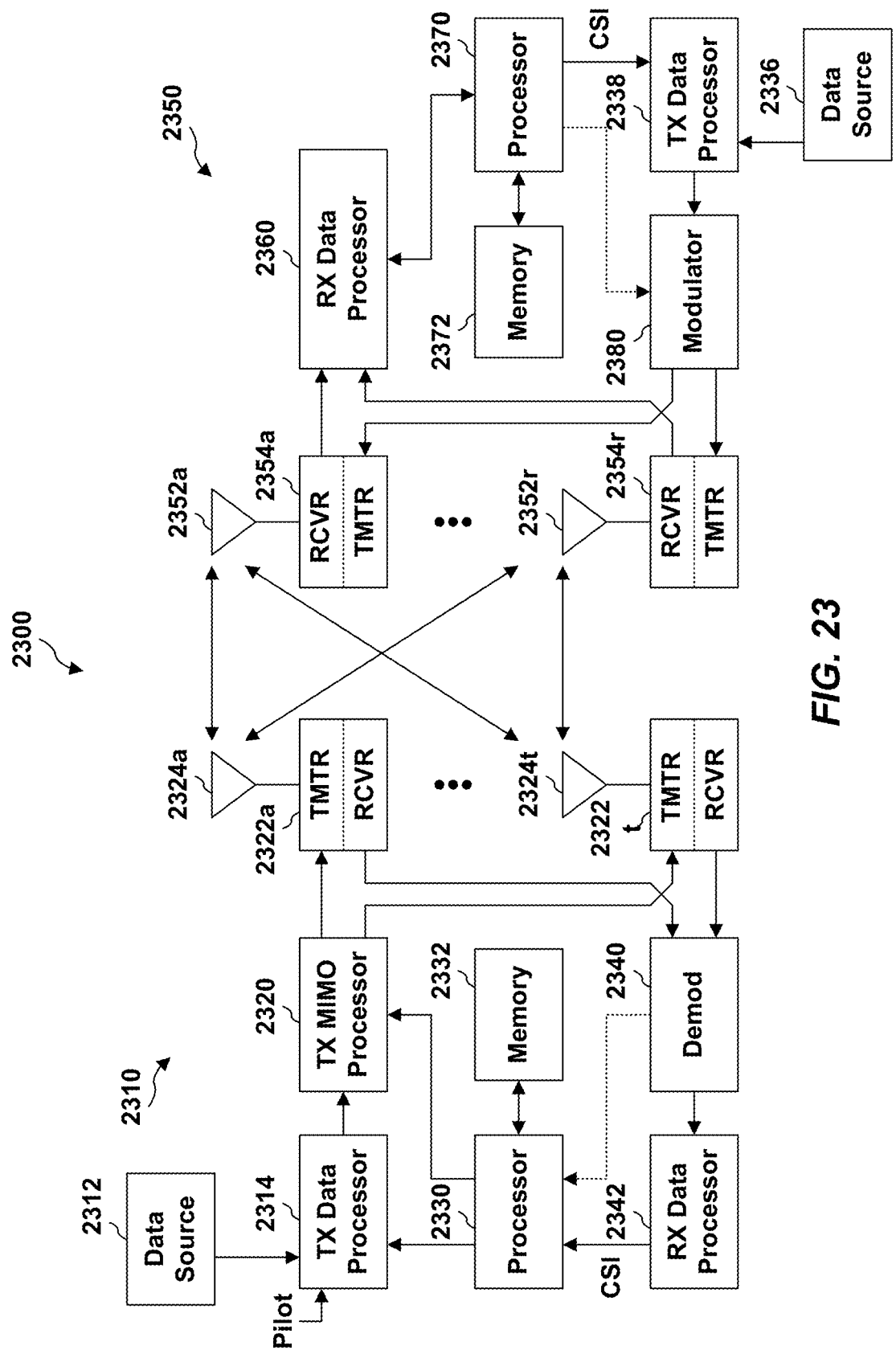
FIG. 23 is an illustration of an example wireless network environment that can be employed in conjunction with the various systems and methods described herein.

FIG. 23 shows an example wireless communication system 2300. The wireless communication system 2300 depicts one base station 2310 (e.g., which can be a macrocell base station, femto node, etc.) and one mobile device 2350 for sake of brevity. However, it is to be appreciated that system 2300 can include more than one base station and/or more than one mobile device, wherein additional base stations and/or mobile devices can be substantially similar or different from example base station 2310 and mobile device 2350 described below. In addition, it is to be appreciated that base station 2310 and/or mobile device 2350 can employ the systems (FIGS. 1-7 and 17-22) and/or methods (FIGS. 8-16) described herein to facilitate wireless communication there between. For example, components or functions of the systems and/or methods described herein can be part of a memory 2332 and/or 2372 or processors 2330 and/or 2370 described below, and/or can be executed by processors 2330 and/or 2370 to perform the disclosed functions.

At base station 2310, traffic data for a number of data streams is provided from a data source 2312 to a transmit (TX) data processor 2314. According to an example, each data stream can be transmitted over a respective antenna. TX data processor 2314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 2350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 2330.

The modulation symbols for the data streams can be provided to a TX MIMO processor 2320, which can further process the modulation symbols (e.g., for OFDM). TX MIMO processor 2320 then provides $N_T$ modulation symbol streams to $N_T$ transmitters (TMTR) 2322a through 2322t. In various embodiments, TX MIMO processor 2320 applies beamforming weights to the symbols of the data streams and to the antenna from which the symbol is being transmitted.

Each transmitter 2322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 2322a through 2322t are transmitted from $N_T$ antennas 2324a through 2324t, respectively.

At mobile device 2350, the transmitted modulated signals are received by $N_R$ antennas 2352a through 2352r and the received signal from each antenna 2352 is provided to a respective receiver (RCVR) 2354a through 2354r. Each receiver 2354 conditions (e.g., filters, amplifies, and down-converts) a respective signal, digitizes the conditioned signal to provide samples, and further processes the samples to provide a corresponding "received" symbol stream.

An RX data processor 2360 can receive and process the $N_R$ received symbol streams from $N_R$ receivers 2354 based on a particular receiver processing technique to provide $N_T$ "detected" symbol streams. RX data processor 2360 can demodulate, deinterleave, and decode each detected symbol stream to recover the traffic data for the data stream. The processing by RX data processor 2360 is complementary to that performed by TX MIMO processor 2320 and TX data processor 2314 at base station 2310.

The reverse link message can comprise various types of information regarding the communication link and/or the received data stream. The reverse link message can be processed by a TX data processor 2338, which also receives traffic data for a number of data streams from a data source 2336, modulated by a modulator 2380, conditioned by transmitters 2354a through 2354r, and transmitted back to base station 2310.

At base station 2310, the modulated signals from mobile device 2350 are received by antennas 2324, conditioned by receivers 2322, demodulated by a demodulator 2340, and processed by a RX data processor 2342 to extract the reverse link message transmitted by mobile device 2350. Further, processor 2330 can process the extracted message to determine which precoding matrix to use for determining the beamforming weights.

Processors 2330 and 2370 can direct (e.g., control, coordinate, manage, etc.) operation at base station 2310 and mobile device 2350, respectively. Respective processors 2330 and 2370 can be associated with memory 2332 and 2372 that store program codes and data. Processors 2330 and 2370 can report parameters related to a received beacon, determine a femto node related to the beacon, initiate hand-in to the femto node, disambiguate a femto node as a target femto node or otherwise, etc.

Figure 24:
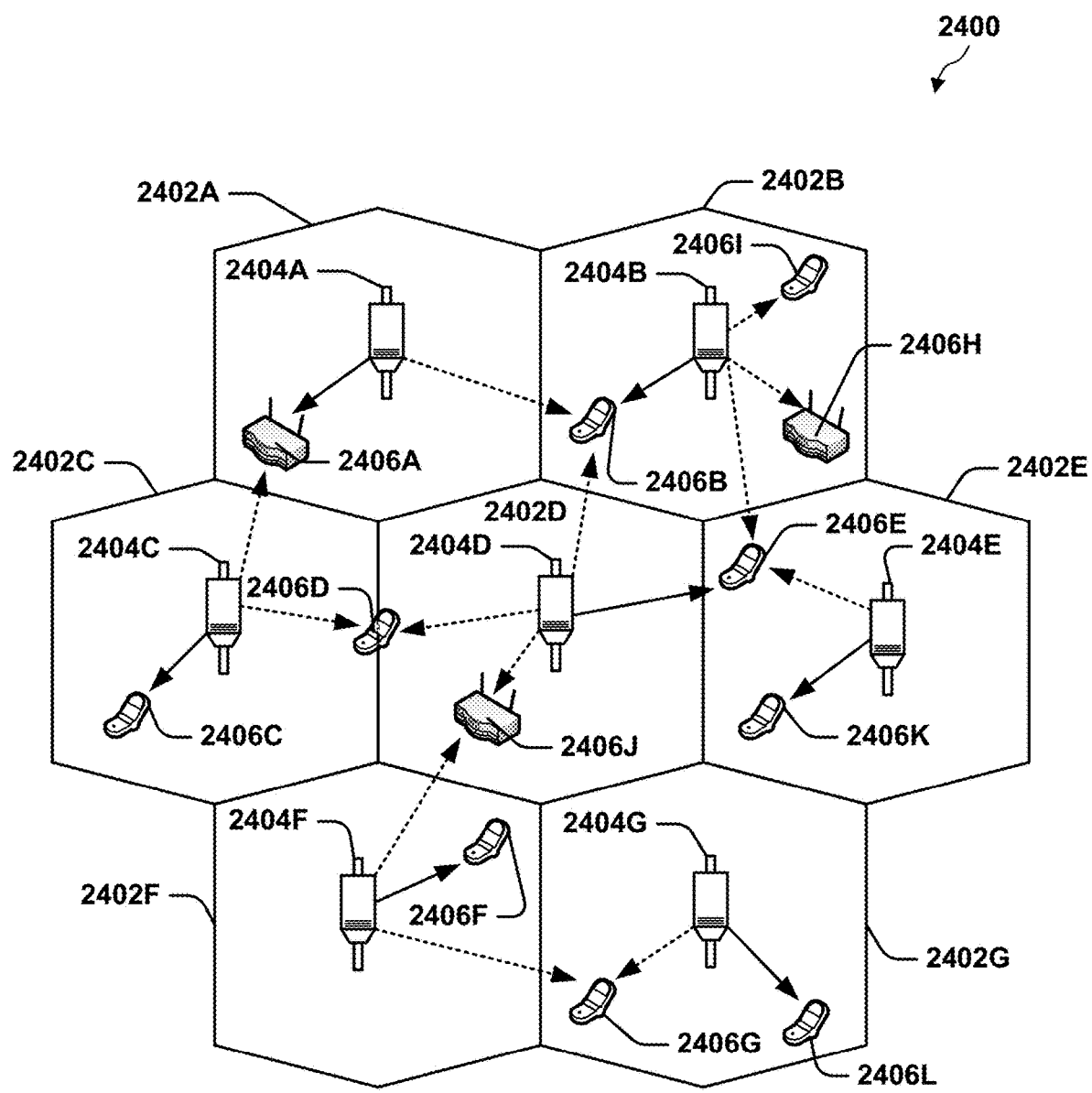
FIG. 24 illustrates an example wireless communication system, configured to support a number of devices, in which the aspects herein can be implemented.

FIG. 24 illustrates a wireless communication system 2400, configured to support a number of users, in which the teachings herein may be implemented. The system 2400 provides communication for multiple cells 2402, such as, for example, macro cells 2402A-2402G, with each cell being serviced by a corresponding access node 2404 (e.g., access nodes 2404A-2404G). As shown in FIG. 24, access terminals 2406 (e.g., access terminals 2406A-2406L) can be dispersed at various locations throughout the system over time. Each access terminal 2406 can communicate with one or more access nodes 2404 on a forward link (FL) and/or a reverse link (RL) at a given moment, depending upon whether the access terminal 2406 is active and whether it is in soft handoff, for example. The wireless communication system 2400 can provide service over a large geographic region.

Figure 25:
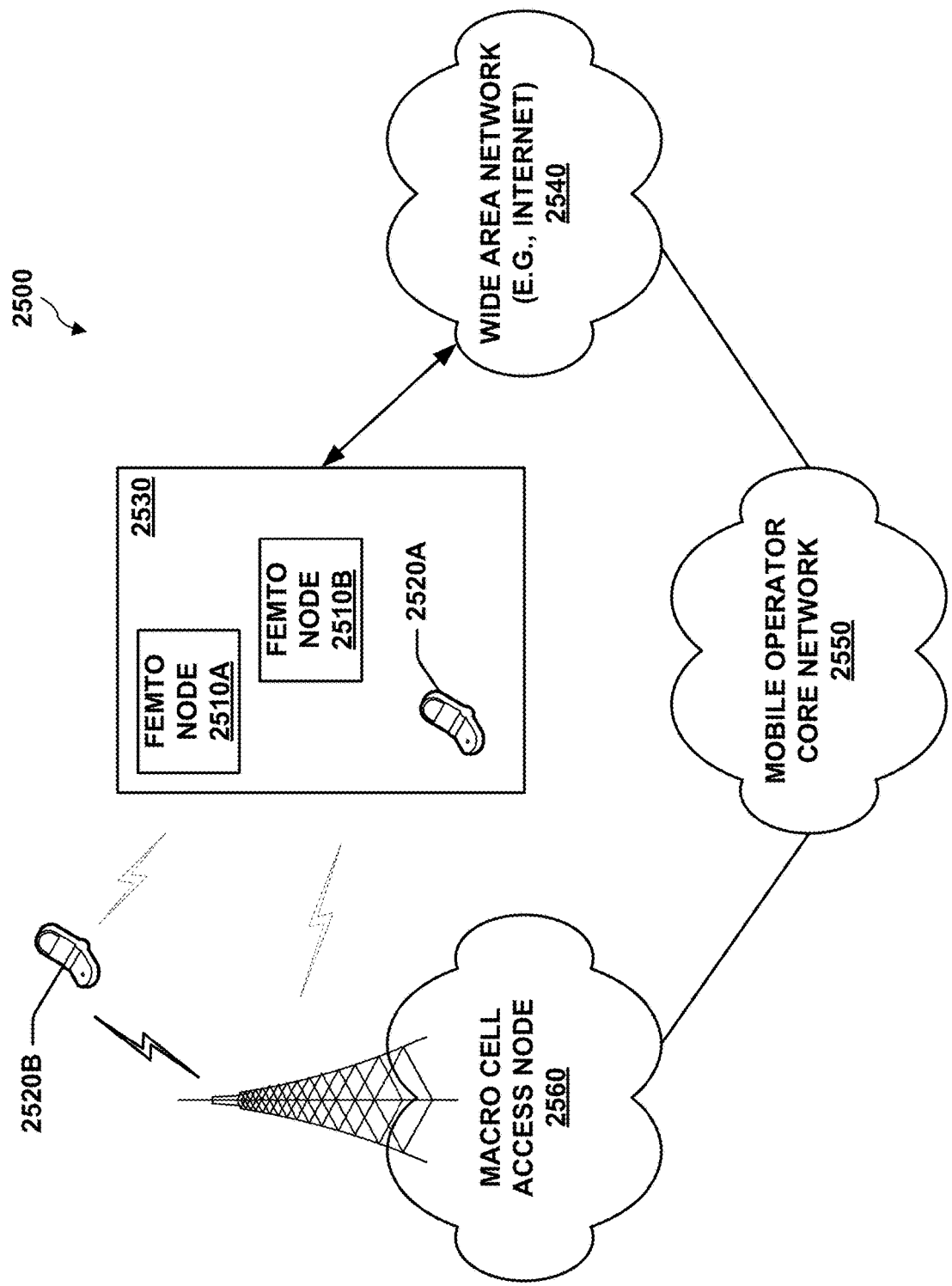
FIG. 25 is an illustration of an exemplary communication system to enable deployment of femtocells within a network environment.

FIG. 25 illustrates an exemplary communication system 2500 where one or more femto nodes are deployed within a network environment. Specifically, the system 2500 includes multiple femto nodes 2510A and 2510B (e.g., femtocell nodes or H(e)NB) installed in a relatively small scale network environment (e.g., in one or more user residences 2530). Each femto node 2510 can be coupled to a wide area network 2540 (e.g., the Internet) and a mobile operator core network 2550 via a digital subscriber line (DSL) router, a cable modem, a wireless link, or other connectivity means (not shown). As will be discussed below, each femto node 2510 can be configured to serve associated access terminals 2520 (e.g., access terminal 2520A) and, optionally, alien access terminals 2520 (e.g., access terminal 2520B). In other words, access to femto nodes 2510 can be restricted such that a given access terminal 2520 can be served by a set of designated (e.g., home) femto node(s) 2510 but may not be served by any non-designated femto nodes 2510 (e.g., a neighbor's femto node).

Figure 26:
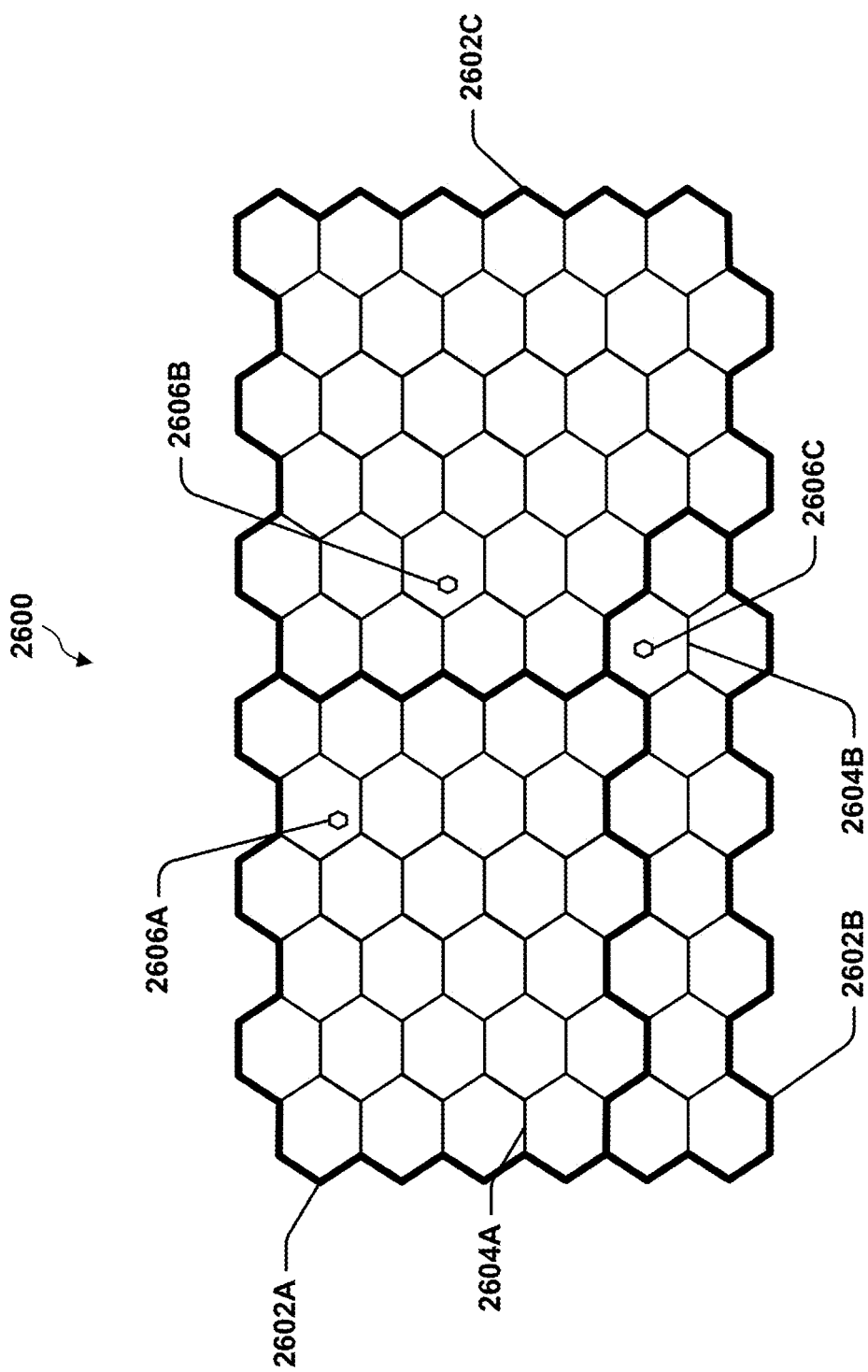
FIG. 26 illustrates an example of a coverage map having several defined tracking areas.

FIG. 26 illustrates an example of a coverage map 2600 where several tracking areas 2602 (or routing areas or location areas) are defined, each of which includes several macro coverage areas 2604. Here, areas of coverage associated with tracking areas 2602A, 2602B, and 2602C are delineated by the wide lines and the macro coverage areas 2604 are represented by the hexagons. The tracking areas 2602 also include femto coverage areas 2606. In this example, each of the femto coverage areas 2606 (e.g., femto coverage area 2606C) is depicted within a macro coverage area 2604 (e.g., macro coverage area 2604B). It should be appreciated, however, that a femto coverage area 2606 may not lie entirely within a macro coverage area 2604. In practice, a large number of femto coverage areas 2606 can be defined with a given tracking area 2602 or macro coverage area 2604. Also, one or more pico coverage areas (not shown) can be defined within a given tracking area 2602 or macro coverage area 2604.

Referring again to FIG. 25, the owner of a femto node 2510 can subscribe to mobile service, such as, for example, 3G mobile service, offered through the mobile operator core network 2550. In addition, an access terminal 2520 can be capable of operating both in macro environments and in smaller scale (e.g., residential) network environments. Thus, for example, depending on the current location of the access terminal 2520, the access terminal 2520 can be served by an access node 2560 or by any one of a set of femto nodes 2510 (e.g., the femto nodes 2510A and 2510B that reside within a corresponding user residence 2530). For example, when a subscriber is outside his home, he is served by a standard macro cell access node (e.g., node 2560) and when the subscriber is at home, he is served by a femto node (e.g., node 2510A). Here, it should be appreciated that a femto node 2510 can be backward compatible with existing access terminals 2520.

A femto node 2510 can be deployed on a single frequency or, in the alternative, on multiple frequencies. Depending on the particular configuration, the single frequency or one or more of the multiple frequencies can overlap with one or more frequencies used by a macro cell access node (e.g., node 2560). In some aspects, an access terminal 2520 can be configured to connect to a preferred femto node (e.g., the home femto node of the access terminal 2520) whenever such connectivity is possible. For example, whenever the access terminal 2520 is within the user's residence 2530, it can communicate with the home femto node 2510.

In some aspects, if the access terminal 2520 operates within the mobile operator core network 2550 but is not residing on its most preferred network (e.g., as defined in a preferred roaming list), the access terminal 2520 can continue to search for the most preferred network (e.g., femto node 2510) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 2520 can limit the search for specific band and channel. For example, the search for the most preferred system can be repeated periodically. Upon discovery of a preferred femto node, such as femto node 2510, the access terminal 2520 selects the femto node 2510 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 2510 that reside within the corresponding user residence 2530). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communications, comprising:
    receiving a handover message for a device comprising one or more parameters including a primary scrambling code (PSC) related to a target femto node;
    applying, to one or more femto nodes that utilize the PSC, one or more filters based in part on the one or more parameters to determine whether at least one femto node of the one or more femto nodes corresponds to the target femto node; and
    preparing the at least one femto node to receive hand-in of the device,
    wherein the applying the one or more filters further comprises applying an uplink (UL) received signal strength indicator (RSSI) filter to the one or more femto nodes that determines that a specific femto node is a possible target femto node in response to a rise in UL RSSI measured at the specific femto node indicating presence of the device, wherein applying the UL RSSI filter comprises:
        storing a received UL RSSI reported by the specific femto node according to a time schedule for use with the UL RSSI filter;
        comparing an average over time of the received UL RSSI for the specific femto node to a current UL RSSI for the specific femto node to determine the rise in UL RSSI measured at the specific femto node;
        setting a threshold for each specific femto node based in part on a cell individual offset of each of the one or more femto nodes; and
        determining that the rise in UL RSSI measured at the specific femto node indicates presence of the device at the specific femto node in response to determining that a difference between the current UL RSSI for the specific femto node and the average over time of the received UL RSSI for the specific femto node satisfies the threshold for the specific femto node.

2. The method of claim 1, wherein the applying the one or more filters results in determining at least two femto nodes of the one or more femto nodes correspond to the target femto node, and wherein the preparing comprises preparing the at least two femto nodes for hand-in of the device.

3. The method of claim 1, further comprising:
    receiving an indication of multiple femto node preparation from a femto gateway; and
    establishing a selection of a set of common resources for hand-in of the device.

4. The method of claim 1, wherein the preparing the at least one femto node comprises transmitting a relocation request message to the at least one femto node comprising the one or more parameters.

5. The method of claim 1, further comprising transmitting a relocation response message to one or more components of a core network comprising an indication of resources for hand-in of the device, wherein the preparing the at least one femto node comprises establishing the resources for hand-in of the device.

6. An apparatus for disambiguating a target femto node, comprising:
at least one processor configured to:
receive a handover message for a device comprising one or more parameters including a primary scrambling code (PSC) related to the target femto node;
apply, to one or more femto nodes that utilize the PSC, one or more filters based in part on the one or more parameters to determine whether at least one femto node of the one or more femto nodes corresponds to the target femto node; and
prepare the at least one femto node to receive hand-in of the device; and
a memory coupled to the at least one processor,
wherein to apply the one or more filters the at least one processor is further configured to apply an uplink (UL) received signal strength indicator (RSSI) filter to the one or more femto nodes that determines that a specific femto node is a possible target femto node in response to a rise in UL RSSI measured at the specific femto node indicating presence of the device, wherein the at least one processor is configured to apply the UL RSSI filter by:
storing a received UL RSSI reported by the specific femto node according to a time schedule for use with the UL RSSI filter;
comparing an average over time of the received UL RSSI for the specific femto node to a current UL RSSI for the specific femto node to determine the rise in UL RSSI measured at the specific femto node;
setting a threshold for each specific femto node based in part on a cell individual offset of each of the one or more femto nodes; and
determining that the rise in UL RSSI measured at the specific femto node indicates presence of the device at the specific femto node in response to determining that a difference between the current UL RSSI for the specific femto node and the average over time of the received UL RSSI for the specific femto node satisfies the threshold for the specific femto node.

7. The apparatus of claim 6, wherein the applying the one or more filters results in determining at least two femto nodes of the one or more femto nodes correspond to the target femto node, and wherein the at least one processor is configured to prepare the at least two femto nodes for hand-in of the device.

8. The apparatus of claim 6, wherein the at least one processor is configured to:
receive an indication of multiple femto node preparation from a femto gateway; and
establish a selection of a set of common resources for hand-in of the device.

9. The apparatus of claim 6, wherein the at least one processor is configured to prepare the at least one femto node by transmitting a relocation request message to the at least one femto node comprising the one or more parameters.

10. The apparatus of claim 6, wherein the at least one processor is configured to transmit a relocation response message to one or more components of a core network comprising an indication of resources for hand-in of the device, wherein the at least one processor is configured to prepare the at least one femto node by establishing the resources for hand-in of the device.

11. An apparatus for disambiguating a target femto node, comprising:
means for receiving a handover message for a device comprising one or more parameters including a primary scrambling code (PSC) related to the target femto node;
means for applying, to one or more femto nodes that utilize the PSC, one or more filters based in part on the one or more parameters to determine whether at least one femto node of the one or more femto nodes corresponds to the target femto node; and
means for preparing the at least one femto node to receive hand-in of the device,
wherein the means for applying is further configured to apply an uplink (UL) received signal strength indicator (RSSI) filter to the one or more femto nodes that determines that a specific femto node is a possible target femto node in response to a rise in UL RSSI measured at the specific femto node indicating presence of the device, wherein the means for applying is configured to apply the UL RSSI filter by:
storing a received UL RSSI reported by the specific femto node according to a time schedule for use with the UL RSSI filter;
comparing an average over time of the received UL RSSI for the specific femto node to a current UL RSSI for the specific femto node to determine the rise in UL RSSI measured at the specific femto node;
setting a threshold for each specific femto node based in part on a cell individual offset of each of the one or more femto nodes; and
determining that the rise in UL RSSI measured at the specific femto node indicates presence of the device at the specific femto node in response to determining that a difference between the current UL RSSI for the specific femto node and the average over time of the received UL RSSI for the specific femto node satisfies the threshold for the specific femto node.

12. The apparatus of claim 11, wherein the applying the one or more filters results in determining at least two femto nodes of the one or more femto nodes correspond to the target femto node, and wherein the means for preparing is configured to prepare the at least two femto nodes for hand-in of the device.

13. The apparatus of claim 11, wherein the means for preparing is configured to prepare the at least one femto node by transmitting a relocation request message to the at least one femto node comprising the one or more parameters.

14. A non-transitory computer-readable medium storing computer executable code for disambiguating a target femto node, comprising:
code for causing at least one computer to receive a handover message for a device comprising one or more parameters including a primary scrambling code (PSC) related to the target femto node;
code for causing the at least one computer to apply, to one or more femto nodes that utilize the PSC, one or more filters based in part on the one or more parameters to determine whether at least one femto node of the one or more femto nodes corresponds to the target femto node; and
code for causing the at least one computer to prepare the at least one femto node to receive hand-in of the device,
wherein the code for causing the at least one computer to apply the one or more filters further comprises code for causing the at least one computer to apply an uplink (UL) received signal strength indicator (RSSI) filter to the one or more femto nodes that determines that a specific femto node is a possible target femto node in response to a rise in UL RSSI measured at the specific femto node indicating presence of the device, wherein the code for applying the UL RSSI filter comprises:

code for storing a received UL RSSI reported by the specific femto node according to a time schedule for use with the UL RSSI filter;

code for comparing an average over time of the received UL RSSI for the specific femto node to a current UL RSSI for the specific femto node to determine the rise in UL RSSI measured at the specific femto node;

code for setting a threshold for each specific femto node based in part on a cell individual offset of each of the one or more femto nodes; and code for determining that the rise in UL RSSI measured at the specific femto node indicates presence of the device at the specific femto node in response to determining that a difference between the current UL RSSI for the specific femto node and the average over time of the received UL RSSI for the specific femto node satisfies the threshold for the specific femto node.

* * * * *